United States Patent [19]

Yamashita et al.

[11] Patent Number: 4,743,523

[45] Date of Patent: May 10, 1988

[54] PHOTOSENSITIVE MEMBER FOR ELECTROPHOTOGRAPHY

[75] Inventors: Masataka Yamashita, Kawasaki; Takao Takiguchi, Tokyo; Shoji Umehara, Fuchu; Masakazu Matsumoto, Yokohama; Shozo Ishikawa, Yokohama, all of Japan

[73] Assignee: Canon Kabushiki Kaisha, Tokyo, Japan

[21] Appl. No.: 844,887

[22] Filed: Mar. 27, 1986

[30] Foreign Application Priority Data

| Apr. 2, 1985 [JP] | Japan | 60-69721 |
| Apr. 2, 1985 [JP] | Japan | 60-69722 |
| Apr. 26, 1985 [JP] | Japan | 60-690452 |
| May 1, 1985 [JP] | Japan | 60-92286 |
| May 15, 1985 [JP] | Japan | 60-101513 |
| May 24, 1985 [JP] | Japan | 60-110097 |

[51] Int. Cl.$^4$ ............ G03G 5/06; G03G 5/14
[52] U.S. Cl. .................... 430/59; 430/58; 430/70; 430/71; 430/72; 430/73; 430/74; 430/75; 430/76; 430/77; 430/78; 534/809; 534/811; 534/689; 534/691; 534/754; 534/755; 534/757; 534/830; 534/832
[58] Field of Search ............ 430/58, 59, 70, 71, 430/72, 73, 74, 75, 76, 77, 78

[56] References Cited

U.S. PATENT DOCUMENTS 4,279,981   7/1981   Ohta et al. ............ 430/58 X
4,582,771   4/1986   Ohta .................. 430/59 X Primary Examiner—Roland E. Martin
Attorney, Agent, or Firm—Fitzpatrick, Cella, Harper & Scinto

[57] ABSTRACT

A photosensitive member for electrophotography comprising a photosensitive layer containing an azo pigment selected from those represented by the following formulas (1)–(6):

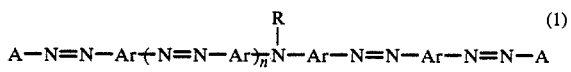

(1)

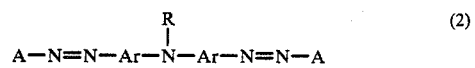

(2)

$$A-N=N-Ar-CH=CH-Ar- \quad (3)$$

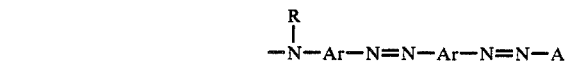

(4)

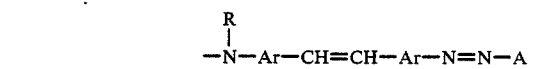

(5)

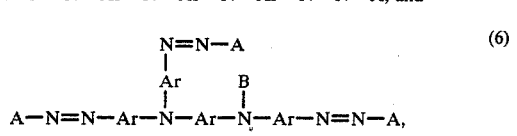

(6)

wherein R is an alkyl, aralkyl, aryl, or acyl each capable of having a substituent; Ar is an arylene or heterocyclic group each capable of having a substituent; Ar is a coupler residue group having a phenolic OH group; B is hydrogen, nitroso, or an alkyl, aralkyl, aryl or acyl group capable of having a substituent; and n is 0 or 1.

17 Claims, No Drawings

1

PHOTOSENSITIVE MEMBER FOR ELECTROPHOTOGRAPHY

FIELD OF THE INVENTION AND RELATED ART

The present invention relates to a photosensitive member for electrophotography and particularly to a photosensitive member for electrophotography having a photosensitive layer containing a specific azo pigment.

There has heretofore been known photosensitive members for electrophotography using as a photosensitive element an inorganic photoconductor such as selenium, cadmium sulfide, or zinc oxide.

On the other hand, there have also been developed a large number of organic photoconductors since it has been discovered that specific classes of organic compounds exhibit photoconductivity. For example, there are known a large number of organic photoconductors including organic photoconductive polymers such as poly-N-vinylcarbazole and polyvinylanthracene; low-molecular weight organic photoconductors such as carbazole, anthracene, pyrazolines, oxadiazoles, hydrazones, and polyarylalkanes; and organic pigments and dyes such as phthalocyanine pigments, azo pigments, cyanine dyes, polycyclic quinone pigments, perylene pigments, indigo dyes, thioindigo dyes and squaric acid methine dyes.

Especially, as organic pigments or dyes having photoconductivity which can easily be synthesized compared with inorganic materials and can be flexibly selected so as to show photoconductivity in a desired wavelength region, a large number of organic pigments or dyes have been proposed. For example, it has been proposed to use a disazo pigment showing photoconductivity as a charge generating material in a photosensitive layer which has been functionally separated into a charge generation layer and a charge transportation layer as disclosed by U.S. Pat. Nos. 4,123,270, 4,247,614, 4,251,613, 4,251,614, 4,256,821, 4,260,672, 4,268,596, 4,278,747, and 4,293,628.

A photosensitive member for electrophotography using such an organic photoconductor may be produced easily by coating through appropriate selection of a binder therefor, thereby promoting high productivity at a low cost. Further, the photosensitive wavelength region can be arbitrarily controlled by selecting an organic pigment adapted therefor. However, such a photosensitive member is rather inferior with respect of sensitivity and durability, so that very few have been adopted for practical use.

SUMMARY OF THE INVENTION

An object of the present invention is to provide a new photosensitive member for electrophotography.

Another object of the present invention is to provide a photosensitive member for electrophotography having excellent sensitivity and durability for practical use.

A further object of the present invention is to provide a photosensitive member for electrophotography capable of providing good, stable images on repetitive image formation, i.e., a photosensitive member which exhibits excellent in image stability.

The photosensitive member for electrophotography according to the present invention comprises a photosensitive layer containing a pigment selected from azo pigments represented by the following formulas (1)–(6):

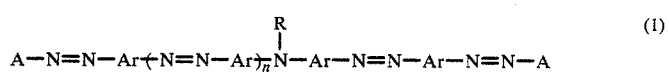

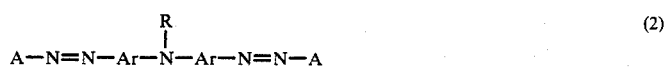

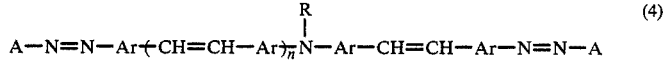

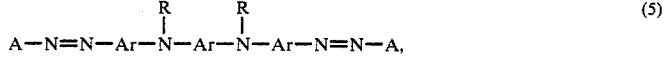

wherein R is an alkyl, aralkyl, aryl, or acyl, each capable of having a substituent, Ar is an arylene or heterocyclic group, each capable of having a substituent; A is a coupler residue group having a phenolic OH group; B is hydrogen, nitroso, or an alkyl, aralkyl, aryl or acyl group capable of having a substituent; and n is 0 or 1. Each of the R, Ar and A may be the same or different when they are in a plurality in a formula.

More specifically, as for R in the above formulas, examples of the alkyl group include methyl, ethyl, propyl, and butyl; examples of the aralkyl group include benzyl, phenethyl, and naphthylmethyl; examples of the aryl group include phenyl, diphenyl, and naphthyl; and examples of the acyl group include acetyl, propionyl, butyryl and benzoyl. Examples of the substituent attachable to the R group includes hydroxyl, halogen (chloro, bromo, iodo, etc.), alkyl (methyl, ethyl, propyl, butyl, etc.), alkoxy (such as methoxy, ethoxy, propoxy or butoxy), aryloxy (such as phenyloxy), substituted amino (such as dimethylamino, diethylamino, dibenzylamino, pyrrolidino, piperidino, or morpholino), nitro, cyano, and acyl (such as acetyl, or benzoyl).

As for Ar in the above formulas, examples of the arylene group include phenylene, biphenylene, naphthylene, and anthrylene, examples of the heterocyclic group include divalent groups such as benzoxazole, benzothiazole, pyridine, quinoline, thiophene and carbazole. These groups can further have a substituted as described above.

As for B in the above formula (6), examples of the alkyl group include methyl, ethyl, propyl, and butyl; examples of the aralkyl group include benzyl, phenethyl, and naphthylmethyl; examples of the aryl group include phenyl, diphenyl, and naphthyl; and examples of the acryl group include acetyl, propionyl, butyryl, and benzoyl. Examples of the substituent attachable to the R group includes hydroxyl, halogen (chloro, bromo, iodo, etc.), alkyl (methyl, ethyl, propyl, butyl, etc.), alkoxy (such as methoxy, ethoxy, propoxy, or butoxy), aryloxy (such as phenyloxy), substituted amino (such as dimethylamino, diethylamino, dibenzylamino, pyrrolidino, piperidino, or morpholino), nitro, cyano and acyl (such as acetyl, or benzoyl).

Further as an example of the aryl group having a substituent for B, there are included those represented by the formula —Ar—N=N—A, wherein Ar and A have the same meanings as defined above.

Examples of the coupler residue group having a phenolic OH group for A in the above formulas include those represented by the following formulas (7)–(13);

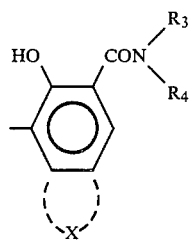
(7)

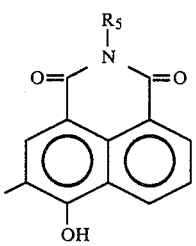
(8)

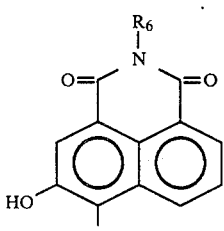
(9)

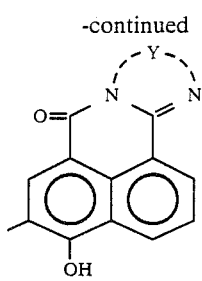
(10)

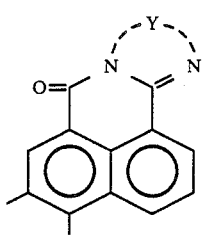
(11)

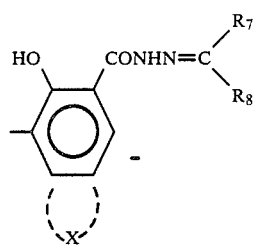
(12)

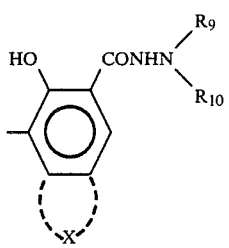
(13)

In the above formulas (7)–(13), X is a residue group forming a polycyclic aromatic or heterocyclic ring through condensation with a benzene ring; $R_3$ and $R_4$ are respectively hydrogen, an alkyl, aralkyl, aryl or heterocyclic group capable of having a substituent or may be such groups as to form a cyclic amino group in combination with each other and, a nitrogen atom; $R_5$ and $R_6$ are respectively an alkyl, aralkyl or aryl group capable of having a substituent; Y is a divalent aromatic group or a nitrogen-containing divalent hetercyclic group; $R_7$ and $R_8$ are respectively an aryl or heterocyclic group capable of having a substituent; $R_9$ and $R_{10}$ are respectively hydrogen, an alkyl, aralkyl, aryl or heterocyclic group capable of having a substituent.

Examples of the polycyclic aromatic ring for X include naphthalene, anthracene, carbazole, benzcarbazole, dibenzofuran, benzonaphthofuran, and diphenylenesulfide. These groups can further have a substituent as described above. The ring formed by condensation with the X is preferably a naphthalene, anthracene or benzcarbazole ring.

As for $R_3$ and $R_4$, examples of the alkyl group include methyl, ethyl, propyl, and butyl; examples of the aralkyl group include benzyl, phenethyl; and naphthylmethyl; and examples of the aryl group include phenyl, diphenyl, naphthyl, and anthryl. Especially, a compound having an $R_3$ of hydrogen and an $R_4$ of a phenyl group having at the ortho-position an electron attractive group such as halogen, nitro, cyano and trifluoromethyl, is preferred from the viewpoint of electrophotographic characteristics. The compound can further have a substituent.

Examples of the heterocyclic group include carbazole, dibenzofuran, benzimidazolone, benzthiazole, thiazole, and pyridine.

Examples of $R_5$ and $R_6$ may be the same as those of $R_3$ and $R_4$ and can also have a substituent as described above. Further, the groups $R_3$–$R_6$ can have another substituent such as an alkoxyl group including methoxy, ethoxy and propoxy group; a halogen including fluoro, chloro, bromo and iodo; nitro, cyano, and a substituted amino group including dimethylamino, diethylamino, dibenzylamino and diphenylamino.

As for Y, examples of the divalent aromatic hydrocarbon group include a monocyclic aromatic hydrocarbon group such as o-phenylene; and a condensed polycylic aromatic hydrocarbon group such as o-naphthylene, peri-naphthylene, 1,2-anthrylene, and 9,10-phenanthrylene.

Examples of the groups forming a divalent heterocyclic group in combination with a nitrogen atom include a 5- or 6-membered heterocyclic divalent group, such as 3,4-pyrazole-di-yl group, 2,3-pyridine-di-yl group, 4,5-pyrimidine-di-yl group, 6,7-imidazole-di-yl group, 5,6-benzimidazole-di-yl group, and 6,7-quinoline-di-yl group.

As for $R_7$ and $R_8$, examples of the aryl group and the heterocyclic group include phenyl, naphthyl, anthryl, and pyrenyl; and pyridyl, thienyl, furyl and carbazolyl. These groups can have a substituent as described above.

As for $R_7$ and $R_8$, examples of the substituent attachable to the aryl or heterocyclic group include halogen such as chlorine, bromine, and iodine; alkyls such as methyl, ethyl, propyl and butyl; alkoxyls such as methoxyl, ethoxyl, propoxyl, and butoxyl; and nitro, cyano; substituted amino groups such as dimethylamino, diethylamino, dipropylamino, dibenzylamino, diphenylamino, morpholino, pyperidino, and pyrrolidino. Further, the groups $R_7$ and $R_8$ are residues forming a 5- or 6-membered ring in combination with a central carbon atom. The 5- or 6-membered ring can further constitute a condensed aromatic ring. Examples of such a structure include cyclopentylidene, cyclohexylidene, 9-fluorenylidene, and 9-xanthenylidene.

Examples of the groups $R_9$ and $R_{10}$ in the formula (8) include; alkyls such as methyl, ethyl, propyl, and butyl; aralkyls such as benzyl, phenethyl, and naphthylmethyl; aryls such as phenyl, naphthyl, anthryl, and diphenyl; and heterocyclic groups such as carbazole, dibenzofuran, benzimidazolone, benzthiazole, thiazole, and pyridine. The groups can have a substituent for hydrogen.

Examples of such a substituent attachable to the alkyls, aralkyls, aryls and heterocyclic groups represent by $R_9$ and $R_{10}$ include; halogens such as fluorine, chlorine, bromine and iodine; alkyls such as methyl, ethyl, propyl, and butyl; alkoxyls such as methoxyl, ethoxyl, propoxyl, and butoxyl; nitro, cyano; and substituted amino groups such as dimethylamino, dibenzylamino, diphenylamino, morpholino, pyperidino, and pyrrolidino.

While not restricted by any theory, in the present invention, by introducing a group R of an alkyl, aralkyl, aryl or acyl group to be attached to the nitrogen atom in the diarylamine base structure forming disazo pigments as shown by the formulas (1)-(6), the polarity of the pigment is changed to improve either one or both of carrier production efficiency and carrier transportation characteristic, so that the photosensitive member can have an improved sensitivity and the potential stability during repetitive image formation. Because of the thus attained high sensitivity, the photosensitive member can be suitably applied to a high speed copying machine, a laser beam printer, an LED printer, a liquid crystal printer, etc. Further, as a stable potential is assured regardless of a history of the photosensitive member, beautiful images can be attained.

Representative examples of the diazo pigments represented by the formulas (1)-(6) as described above are shown at the end of this specification.

These azo pigments may be used singly or in combination of two or more species.

These pigments may be example be produced easily in the following manner.

Thus, a diamine represented by the following formula is subjected to a diazotization in a conventional manner:

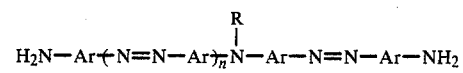

(Ar, R and n have the same meanings as defined above.) Then, the product is reacted with a corresponding coupler to cause a coupling in an aqueous system in the presence of an alkali.

Alternatively, a polyazonium salt of a diamine represent by the above formula is once formed into a corresponding borofluoride salt or zinc chloride double salt, which is then isolated. The product is reacted with a coupler in the presence of an alkali in an appropriate solvent such as N,N-dimethylformamide (DMF) or dimethylsulfoxide.

Some representative examples of synthesis of azo pigments to be used in the present invention will be set forth hereinbelow.

SYNTHESIS EXAMPLE 1

(Synthesis of trisazo-pigment No. 6-1 appearing at the end)

Into 2 l-beaker was placed 1.2 l of DMF, and 16.1 g (0.061 mol) of Naphthol AS (3-hydroxy-2-naphthoic acid anilide and 14.9 g (0.029 mol) of the compound represented by the following formula were dissolved:

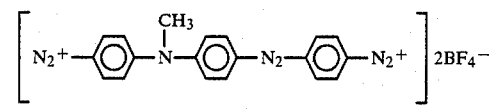

While the solution was held at 6°–10° C., 22.9 g (0.29 mol) of pyridine was added thereto in 30 minutes under stirring. Then, the mixture was stirred for 2 hours at room temperature and further left standing overnight.

The reaction liquid was subjected to filtration, followed by respectively four times of stirring and filtration with 400 ml of DMF at room temperature. Further, four times of stirring and filtration with 400 ml of DMF were repeated and two times of stirring and filtration were repeated, respectively at room temperature, followed by drying with a blowing drier to obtain 22.9 g (yield: 91%) of the objective pigment was obtained. It showed a melting point of above 250° C., and the following results of elementary analysis were obtained.

|   | Calculated(%) | Measured(%) |
|---|---|---|
| C | 73.50 | 73.45 |
| H | 4.55 | 4.40 |
| N | 14.56 | 14.58 |

SYNTHESIS EXAMPLE 2

(Synthesis of disazo pigment No. 2-1 shown at the end)

Into 500 ml-beaker were added 80 ml of water, 16.6 ml (0.19 mol) of conc. hydrochloric acid, and 5.37 g (0.029 mol) of the following compound:

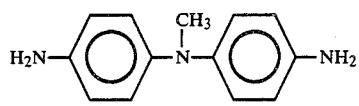

The mixture was stirred while being cooled on an icewater bath to keep the liquid temperature at 3° C. Then, a solution of 4.2 g (0.061 mol) of sodium nitrite in 7 ml of water was added dropwise in 10 minutes to the above mixture while controlling the temperature in the range of 3°-10° C. After the addition, the mixture was stirred further for 30 min. at the same temperature. Carbon was added to the reaction mixture, followed by filtration to obtain a tetrazotized liquid.

Separately, 700 ml of water was added into a 2 l-beaker, 21 g (0.53 mol) of caustic soda was dissolved, and then 16.1 g (0.061 mol) of Naphthol AS (3-hydroxy-2-naphthoic acid anilide) was added and dissolved.

The thus obtained coupler solution was cooled to 6° C., and the above obtained tetrazotized solution was added dropwise in 30 minutes while controlling the liquid temperature at 6°-10° C. Then, the mixture was stirred for 2 hours at room temperature and left standing overnight. The reaction mixture was subjected to filtration, followed by washing with water and filtration to obtain a water paste containing 20.8 g of a crude pigment in terms of solid content. Then, 4 times of stirring and filtration was conducted with 400 ml of N,N-dimethylformamide, followed by 2 times of stirring and filtration with 400 ml of methyl ethyl ketones. The filtered product was dried under vacuum at room temperature to obtain 19.2 g of the purified pigment. Yield: 87%, M.P. (melting point): >250° C.

| Elementary analysis: | | |
|---|---|---|
|   | Calculated(%) | Measured(%) |
| C | 74.09 | 74.05 |
| H | 4.64 | 4.61 |
| N | 12.87 | 12.85 |

SYNTHESIS EXAMPLE 3

(Synthesis of disazo pigment No. 3-1 at the end)

Into 500 ml-beaker were added 80 ml of water, 16.6 ml (0.19 mol) of conc. hydrochloric acid, and 12.17 g (0.029 mol) of the following compound:

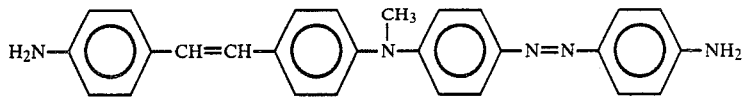

The mixture was stirred while being cooled on an icewater bath to keep the liquid temperature at 3° C. Then, a solution of 4.2 g (0.061 mol) of sodium nitride in 7 ml of water was added dropwise in 10 min. to the above mixture while controlling the temperature in the range of 3°-10° C. After the addition, the mixture was stirred further for 30 min. at the same temperature. Carbon was added to the reaction mixture, followed by filtration to obtain a tetrazotized liquid.

Seprately, 700 ml of water was added into a 2 l-beaker, 21 g (0.53 mol) of caustic soda was dissolved, and then 16.1 g (0.061 mol) of Naphthol AS (3-hydroxy-2-naphthoic acid anilide) was added and dissolved.

The thus obtained coupler solution was cooled to 6° C., and the above obtained tetrazotized solution was added dropwise in 30 min. while controlling the liquid temperature at 6°-10° C. Then, the mixture was stirred for 2 hours at room temperature and left standing overnight. The reaction mixture was subjected to filtration, followed by washing with water and filtration to obtain a water paste containing 25.8 g of a crude pigment in terms of solid content. Then, 4 times of stirring and filtration was conducted with 400 ml of N,N-dimethylformamide, followed by 2 times of stirring and filtration with 400 ml of methyl ethyl ketone. The filtered product was dried uner vacuum at room temperature to obtain 24.2 g of the purified pigment. Yield: 86.1%, M.P. (melting point): >250° C.

| Elementary analysis: | | |
|---|---|---|
|   | Calculated(%) | Measured(%) |
| C | 75.60 | 75.70 |
| H | 4.78 | 4.69 |
| N | 13.01 | 13.10 |

SYNTHESIS EXAMPLE 4.

(Synthesis of disazo pigment No. 4-1 at the end)

Into 500 ml-beaker were added 80 ml of water, 16.6 ml (0.19 mol) of conc. hydrochloric acid, and 9.15 g (0.029 mol) of the following compound:

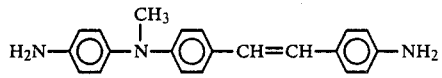

The mixture was stirred while being cooled on an icewater bath to keep the liquid temperature at 3° C. Then, a solution of 4.2 g (0.061 mol) of sodium nitrite in 7 ml of water was added dropwise in 10 min. to the above mixture while controlling the temperature in the range of 3°-10° C. After the addition, the mixture was stirred further for 30 min. at the same temperature. Carbon was added to the reaction mixture, followed by filtration to obtain a tetrazotized liquid.

Separately, 700 ml of water was added into a 2 l-beaker, 21 g (0.53 mol) of caustic soda was dissolved, and then 16.1 g (0.061 mol) of Naphthol AS (3-hydroxy-2-naphthoic acid anilide) was added and dissolved.

The thus obtained coupler solution was cooled to 6° C., and the above obtained tetrazotized solution was added dropwise in 30 minutes while controlling the liquid temperature at 6°–10° C. Then, the mixture was stirred for 2 hours at room temperature and left standing overnight. The reaction mixture was subjected to filtration, followed by washing with water and filtration to obtain a water paste containing 23.3 g of a crude pigment in terms of solid content. Then, 4 times of stirring and filtration was conducted with 400 ml of N,N-dimethylformamide, followed by 2 times of stirring and filtration with 400 ml of methyl ethyl ketone. The filtered product was dried under vacuum at room temperature to obtain 21.2 g of the purified pigment. Yield: 84.6%, M.P. (melting point): >250° C.

| | Elementary analysis: | |
|---|---|---|
| | Calculated(%) | Measured(%) |
| C | 76.37 | 76.50 |
| H | 4.78 | 4.70 |
| N | 11.34 | 11.39 |

SYNTHESIS EXAMPLE 5

(Synthesis of disazo pigment No. 5-1 at the end)

Into 500 ml-beaker were added 80 ml of water, 16.6 ml (0.19 mol) of conc. hydrochloric acid, and 9.22 g (0.029 mol) of the following compound:

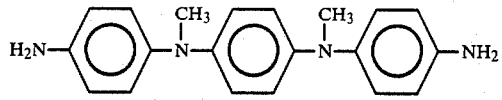

The mixture was stirred while being cooled on an ice-water bath to keep the liquid temperature at 3° C. Then, a solution of 4.2 g (0.061 mol) of sodium nitrite in 7 ml of water was added dropwise in 10 minutes to the above mixture while controlling the temperature in the range of 3°–10° C. After the addition, the mixture was stirred further for 30 minutes at the same temperature. Carbon was added to the reaction mixture, followed by filtration to obtain a tetrazotized liquid.

Separately, 700 ml of water was added into a 2 l-beaker, 21 g (0.53 mol) of caustic soda was dissolved, and then 16.1 g (0.061 mol) of Naphthol AS (3-hydroxy-2-naphthoic acid anilide) was added and dissolved.

The thus obtained coupler solution was cooled to 6° C., and the above obtained tetrazotized solution was added dropwise in 30 minutes while controlling the liquid temperature at 6°–10° C. Then, the mixture was stirred for 2 hours at room temperature and left standing overnight. The reaction mixture was subjected to filtration, followed by washing with water and filtration to obtain a water paste containing 23.2 g of a crude pigment in terms of solid content. Then, 4 times of stirring and filtration was conducted with 400 ml of N,N-dimethylformamide, followed by 2 times of stirring and filtration with 400 ml of methyl ethyl ketone. The filtered produce was dried under vacuum at room temperature to obtain 21.9 g of the purified pigment. Yield: 88%, M.P. (melting point): >250° C.

| | Elementary analysis: | |
|---|---|---|
| | Calculated(%) | Measured(%) |
| C | 74.89 | 74.85 |
| H | 4.90 | 4.87 |
| N | 12.94 | 12.90 |

SYNTHESIS EXAMPLE 6-1

(Synthesis of disazo pigment No. 6-1 at the end)

Into 500 ml-beaker were added 80 ml of water, 16.6 ml (0.19 mol) of conc. hydrochloric acid, and 7.64 g (0.019 mol) of the following compound:

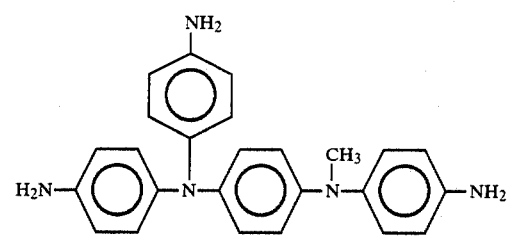

The mixture was stirred while being cooled on an ice-water bath to keep the liquid temperature at 3° C. Then, a solution of 4.2 g (0.061 mol) of sodium nitrite in 7 ml of water was added dropwise in 10 min. to the above mixture while controlling the temperature in the range of 3°–10° C. After the addition, the mixture was stirred further for 30 minutes at the same temperature. Carbon was added to the reaction mixture, followed by filtration to obtain a tetrazotized liquid.

Separately, 700 ml of water was added into a 2 l-beaker, 21 g (0.53 mol) of caustic soda was dissolved, and then 16.1 g (0.061 mol) of Naphthol AS (3-hydroxy-2-naphthoic acid anilide) was added and dissolved.

The thus obtained coupler solution was cooled to 6° C., and the above obtained tetrazotized solution was added dropwise in 30 minutes while controlling the liquid temperature at 6°–10° C. Then, the mixture was stirred for 2 hours at room temperature and left standing overnight. The reaction mixture was subjected to filtration, followed by washing with water and filtration to obtain a water paste containing 21.2 g of a crude pigment in terms of solid content. Then, 4 times of stirring and filtration was conducted with 400 ml of N,N-dimethylformamide, followed by 2 times of stirring and filtration with 400 ml of methyl ethyl ketone. The filtered product was dried under vacuum at room temperature to obtain 19.7 g of the purified pigment. Yield: 85%, M.P. (melting point): >250° C.

| | Elementary analysis: | |
|---|---|---|
| | Calculated(%) | Measured(%) |
| C | 74.93 | 74.90 |
| H | 4.52 | 4.53 |
| N | 12.65 | 12.58 |

SYNTHESIS EXAMPLE 6-2

(Synthesis of disazo-pigment No. 6-43 at the end)

Into 500 ml-beaker were added 120 ml of water, 24.9 ml (0.29 mol) of conc. hydrochloric acid, and 10.4 g (0.022 mol) of the following compound:

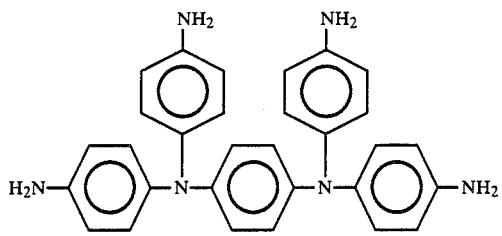

The mixture was stirred while being cooled on an ice-water bath to keep the liquid temperature at 3° C. Then, a solution of 6.4 g (0.093 mol) of sodium nitrite in 7 ml of water was added dropwise in 10 minutes to the above mixture while controlling the temperature in the range of 3°-20° C. After the addition, the mixture was stirred further for 30 minutes at the same temperature. Carbon was added to the reaction mixture, followed by filtration.

To the filtrate was added a solution of 38.2 g (0.35 mol) of sodium fluoroborate in 65 ml of water to form a precipitate. The precipitate was filtered out, washed with water and then again subjected to filtration. The precipitate was sufficiently pressed on the filter to obtain octazonium trifluoroborate in a wet state.

Then, 180 ml of DMF was placed in a 2 l-beaker, and 24.5 g (0.093 mol) of 3-hydroxy-2-naphthoic acid anilide as a coupler and the above obtained octazonium salt were dissolved. Then, the mixture was then cooled to 7° C.

While the mixture solution was stirred and held at a temperature of 5°-10° C., 61.7 g (0.61 mol) of triethylamine was added therein dropwise in 30 minutes. After the addition, the mixture was further stirred for 2 hours and then left standing overnight at room temperature, followed by filtration.

The thus obtained pigment was subjected to three times of washing with 1 liter of water and filtration, followed by 4 times of stirring and filtration with 600 ml of DMF, and then 2 times of stirring and filtration. The thus obtained paste-like product was dried under blowing at room temperature to obtain 27.5 g (yield: 82.1%) of the pigment. M.P.: >250° C.

| | Elementary analysis: | |
|---|---|---|
| | Calculated(%) | Measured(%) |
| C | 77.37 | 77.32 |
| H | 5.00 | 4.96 |
| N | 9.21 | 9.15 |

While methods for synthesizing typical pigments have been described hereinabove, other pigments may be synthesized in a similar manner. However, if a coupler having a poor solubility in an alkaline aqueous solution or a coupler liable to be hydrolyzed such as those shown by the above mentioned formula (12) is used for coupling, it is desirable to dissolve the coupler in a solvent such as DMF and DMAc, and react the coupler with a tetrazonium salt while suppressing the hydrolysis of the coupler or a reaction solvent by using an organic base such as sodium acetate, pyridine, trimethylamine or triethylamine.

In a preferred embodiment according to the present invention, the above described azo pigment may be used as a charge generating substance in a photosensitive member for electrophotography having a photosensitive layer which has been functionally separated into a charge generation layer and a charge transportation layer. The charge generation layer should preferably contain an azo pigment as much as possible in order to obtain a sufficient absorbance, and be formed as a thin layer of, e.g., 5 μm or less, preferably 0.01 μm to 1 μm in thickness so as to prevent generated charge carriers from being trapped in the charge generation layer. This originates from necessary conditions that the most part of incident light is absorbed by the charge generation layer to generate many charge carriers, and that the generated charge carriers are effectively injected into the charge transportation layer without being deactivated through recombination or trapping in the charge generation layer.

The charge generation layer may be producted by dispersing the azo pigment in an appropriate binder and coating the dispersion onto a substrate, or alternatively forming a vapor deposition film of the azo pigment on a substrate by means of a vapor deposition apparatus.

The binder for forming the charge generation layer by coating may be selected from a wide variety of insulating resins or alternatively from organic photoconductive polymers such as poly-N-vinylcarbazole, polyvinylanthracene, and polyvinylpyrene. Preferred examples of the insulating resin include polyvinyl butyral, polyarylates (e.g., polycondensation product between bisphenol A and phthalic acid), polycarbonate (e.g., bisphenol A, Z-type), polyester, phenoxy resin, polyvinyl acetate, acrylic resin, polyacrylamide resin, polyamide, polyvinylpyridine, cellulose resin, urethane resin, epoxy resin, casein, polyvinyl alcohol, and polyvinylpyrrolidone. The resin content in the charge generation layer should preferably be 80 wt.% or less, more preferably 40 wt.% or less.

A solvent may be used to dissolve the above mentioned resin. The solvent to be used varies depending on a particular resin used and should preferably be selected from ones which do not dissolve the charge transportation layer as described below or an undercoat layer, if any. Examples of the organic solvent to be used include: alcohols such as methanol, ethanol, and isopropanol; ketones such as acetone, methyl ethyl ketone, and cyclohexanone; amides such as N,N-dimethylformamide, and N,N-dimethylacetoamide; sulfoxides such as dimethyl sulfoxide; ethers such as tetrahydrofuran, dioxane, and ethylene glycol monomethyl ether; esters such as methyl acetate, and ethyl acetate; aliphatic hydrocarbon halides such as chloroform, methylene chloride, dichloroethylene, carbon tetrachloride, and trichloroethylene; and aromatics such as benzene, toluene, xylene, ligrosin, monochlorobenzene, and dichlorobenzene.

The coating can be effected by various coating methods such as dip coating, spray coating, bead coating, wire bar coating, blade coating, roller coating, and curtain flow coating. The drying should preferably be conducted in the sequence of natural drying at room temperature and then heat drying. The heat drying may be conducted for a time in the range of 5 minutes to 2 hours at a temperature of 30° C. to 200° C. under quienscent condition or under blowing.

The charge transportation layer is electrically connected with the above mentioned charge generation layer and has functions of receiving charge carriers injected from the charge generation layer in the presence of an electric field and transporting the charge carriers to the surface. The charge transportation layer can be disposed in laminated form either below or above the charge generation layer.

In a case where the charge transportation layer is formed above the charge generation layer, the substance transporting charge carriers in the charge generation layer (hereinafter simply referred to "charge transporting substance") should be substantially non-sensitive to a wavelength region of electromagnetic wave to which the charge generation layer is sensitive. This is to avoid a lowering in sensitivity because of a possible filter effect of the charge transportation layer. Herein, the term "electromagnetic wave" is used to include "light" in a broader sense inclusive of $\gamma$-rays, X-rays, ultraviolet rays, visible radiation, near infrared radiation, infrared rays, and far infrared radiation.

The charge transporting substance includes an electron transporting substance and a hole transporting substance. Examples of the electron transporting substance include an electron attractive substance such as chloroanil, bromoanil, tetracyanoethylene, tetracyanoquinodimethane, fluorenones such as 2,4,7-trinitro-9-fluorenone, 2,4,5,7-tetranitro-9-fluorenone, and 2,4,7-trinitro-9-dicyanomethylenefluorenone, 2,4,5,7-tetranitroxanthone, and 2,4,8-trinitrothioxanthone, and a substance obtained by converting such an electron attractive substance into a polymer form.

Examples of the hole transporting substance include pyrene; carbazoles such as N-ethylcarbazole, N-isopropylcarbazole, N-methyl-N-phenylhydrazino-3-methylidene-9-ethylcarbazole, and N,N-diphenylhydrazino-3-methylidene-9-ethylcarbazole; N,N-diphenylhydrazino-3-methylidene-10-ethylphenothiazine, N,N-diphenylhydrazino-3-methylidene-10-ethylphenoxazine; hydrazones such as p-diethylaminobenzaldehyde-N,N-diphenylhydrazone, p-diethylaminobenzaldehyde-N,$\alpha$-naphthyl-N-phenylhydrazone, p-pyrrolidinobenzaldehyde-N,N-diphenylhydrazone, 1,3,3-trimethylindolenine-$\omega$-aldehyde-N,N-diphenylhydrazone, and p-diethylbenzaldehyde-3-methylbenzothiazolinone-2-hydrazone; 2,5-bis(p-diethylaminophenyl)-1,3,4-oxadiazole; pyrazolines such as 1-phenyl-3-(p-diethylaminostyryl)-5-(p-diethylaminophenyl)pyrazoline, 1-[quinolyl(2)]-3-(p-diethylaminostyryl)-5-(p-diethylaminostyryl)-5-(p-diethylaminophenyl)pyrazoline, 1-[pyridyl(2)]-3-(p-diethylaminostyryl)-5-(p-diethylaminophenyl)pyrazoline, 1-[6-methoxy-pyridyl(2)]-3-(p-diethylaminostyryl)-5-(p-diethylaminophenyl)pyrazoline and 1-[pyridyl(3)]-3-(p-diethylaminostyryl)-5-(p-diethylaminophenyl)pyrazoline; polyarylalkanes such as 1-[L-pydi(4-N,N-dimethylamino-2-methylphenyl)]ethane; triphenylamine, stilbene derivatives, aromatic polycyclic compounds having a styryl group, heterocyclic compounds, poly-N-vinylcarbazole, polyvinylpyrene, polyvinylanthracene, polyvinylacridine, poly-9-vinylphenylanthracene, pyrene-formaldehyde resin, and ethylcarbazole-formaldehyde resin.

In addition to the above mentioned organic charge transporting substances, inorganic substances such as selenium, selenium-tellurium, amorphous silicon, and cadmium sulfide.

These charge transporting substances may be used singly or as a mixture of two or more species.

When, the charge transporting substance does not have a film-formability, it is formed into a film by using an appropriate binder. Examples of the binder to be used for this purpose include: acrylic resin, polyarylate, polyester, polycarbonate (biphenol A, Z-type), polystyrene, acrylonitrile-styrene copolymer, acrylonitrile-butadiene copolymer, polyvinylbutyral, polyvinyl formal, polysulfone, polyacrylamide, polyamide, and chlorinated rubber, and organic photoconductive polymers such as poly-N-vinylcarbazole, polyvinylanthracene, and polyvinylpyrene.

The charge transportation layer has an upper limit for transporting charge carriers and should not be formed in an unnecessarily large thickness. The thickness is generally from 5 to 30 $\mu$m, but is preferably within the range of 8 to 20 $\mu$m. In order to provide the charge transportation layer by coating, the coating methods described above with reference to the charge transportation layer may be used at an appropriate selection.

A photosensitive layer comprising a laminated structure of the charge generation layer and the charge transportation layer may be formed on a substrate having an electroconductive layer. The substrate having a conductive layer may be a substrate which per se has an electroconductivity such as that of aluminum, aluminum alloy, copper, zinc, stainless steel, vanadium, molybdenum, chromium, titanium, nickel, indium, gold, and platinum; alternatively, a substrate of a plastic (such as polyethylene, polypropylene, polyvinyl chloride, polyethylene terephthalate, acrylic resin, or polyethylene fluoride) coated with, e.g., a vapor-deposited layer of aluminum, aluminum alloy, indium oxide, thin oxide, or indium oxide-tin oxide, a plastic substrate coated with a mixture of an electroconductive powder such as carbon black or silver powder and an appropriate binder; a plastic or paper substrate impregnated with an electroconductive powder; or a substrate comprising an electroconductive polymer.

Between the electroconductive layer and the photosensitive layer, there may be formed an undercoat layer having a barrier function and an adhesive function. The undercoat layer may be formed, e.g., casein, polyvinyl alcohol, nitrocellulose, ethyleneacrylic acid copolymer, polyamide (nylon 6, nylon 66, nylon 610, copolymer nylon, alkoxymethylated nylon) polyurethane, gelatine, or aluminum oxide.

The thickness of the undercoat layer should preferably be 0.1 to 5 $\mu$m, particularly 0.5 to 3 $\mu$m.

In a case where the electroconductive layer, the charge generation layer and the charge transportation layer are laminated in this order, if the charge transporting substance comprises an electron transporting substance, it is necessary to positively charge the surface of the charge transportation layer. On exposure to light after the charging, at the exposed part, electrons generated in the charge generation layer are injected to the charge transportation layer and then reach the surface to neutralize the positive charge thereon. The resultant decrease in surface potential creates an electrostatic contrast from the non-exposed portion. If the thus obtained electrostatic latent image is developed by a negatively charged toner, a visible toner image is obtained. The toner image can be directly fixed, or may be transferred onto a paper or a plastic film and then fixed thereon.

Alternatively, the electrostatic latent image can be transferred onto an insulating layer of a transfer paper, developed and then fixed thereon. The developer, the developing method and the fixing method may be any of known ones and are not restricted to particular ones.

On the other hand, if the charge transporting substance is a hole transporting substance, it is necessary to negatively charge the surface of the charge transportation layer. On light-exposure after the charging, at the exposed part, holes generated in the charge generation layer are injected to the charge transportation layer and then reach the surface to neutralize the negative charge thereon. The resultant decrease in surface potential creates an electrostatic contrast from the non-exposed part. For development, a positively charged toner is required in contrast to the case where an electron transporting substance is used.

In another embodiment according to the present invention, a photosensitive member for electrophotography may be formed by incorporating the above-mentioned azo pigment in the same layer as the charge transporting substance. In this case, instead of or in addition to the charge transporting substance as described above, a charge-transfer complex comprising poly-N-vinylcarbazole and trinitrofluorenone may be used.

A photosensitive member for electrophotography according to this embodiment may be formed by dispersing the azo pigment and the charge-transfer complex in a solution of polyester in tetrahydrofuran and applying the resultant coating liquid to form a film.

In any of the photosensitive members, the pigment to be used comprises at least one azo pigment selected from those represented by the formulas (1) to (6). The azo pigment may be either amorphous or crystalline.

Two or more of the azo pigments may be used in combination, as desired, for the purpose of increasing the sensitivity of the photosensitive member through combination of pigments having different light absorption characteristics or obtaining a panchromatic photosensitive member. Alternatively, it is also possible to use the azo pigment according to the present invention in combination with another charge generating substance selected from known dyes and pigments.

The photosensitive member for electrophotography according to the present invention may be used not only for electrophotographic copying machines but also in the fields related to electrophotography such as laser printers, CRT printers, LED printers, liquid crystal printers, and laser plate-making.

The present invention will be explained more specifically with reference to examples.

EXAMPLES 1-1 TO 1-40

An ammoniacal aqueous solution of casein (casein: 11.2 g, 28% aqueous solution of ammonia: 1 g, and water: 222 ml) was applied onto an aluminum plate by means of wire bar so as to provide a 1.0 μ-thick dry film, and then dried.

Separately, 5 g of a trisazo pigment (pigment No. 1-1 at the end) was added to a solution of 2 g of a butyral resin (a butyral degree: 63 mol%) in 95 ml of ethanol and was dispersed for 2 hours by means of a sand mill. The thus obtained dispersion was applied onto the casein layer as obtained above by a wire bar so as to provide a 0.5 μ-thick dry film and then dried to form a charge generation layer.

Then, 5 g of a hydrazone compound having the formula:

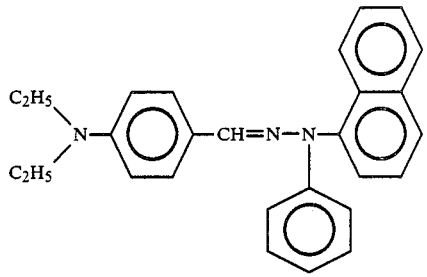

and 5 g of polymethylmethacrylate ($\overline{Mn}$ (number-average molecular weight): 100,000) were dissolved in 70 ml of benzene, and then mixture was applied onto the charge generation layer by a wire bar so as to provide a 12 μ-thick dry film and dried to form a charge transportation layer, whereby a photosensitive member was prepared.

Photosensitive members according to Examples 1-2 to 1-40 were prepared in the same manner as described above except that the trisazo pigment No. 1-1 was replaced by azo pigments shown in Table 1-1 (selected from those shown at the end of this specification).

The thus obtained photosensitive member were respectively corona-charged statically at −5 kV by means of an electrostatic copying paper tester Model SP-428 mfd. by Kawaguchi Denki K.K., stored for 1 second in a dark place, and then exposed to light at an illumination intensity of 2 lux, whereby the charging characteristics were measured.

The charging characteristics were evaluated by measuring a surface potential ($V_0$) and an exposure quantity $E_{\frac{1}{2}}$ (lux.sec) required for decreasing the potential after 1 second of storage in the dark to ½nd thereof.

The results are shown in the following Table 1-1.

TABLE 1-1

| Example | Azo pigment No. | $V_0 (-V)$ | $E_{\frac{1}{2}}$ (lux · sec) |
| --- | --- | --- | --- |
| 1-1 | 1-1 | 580 | 3.3 |
| 1-2 | 1-2 | 600 | 1.8 |
| 1-3 | 1-3 | 560 | 3.8 |
| 1-4 | 1-4 | 580 | 2.5 |
| 1-5 | 1-5 | 600 | 1.8 |
| 1-6 | 1-7 | 570 | 3.7 |
| 1-7 | 1-11 | 600 | 2.0 |
| 1-8 | 1-12 | 610 | 2.3 |
| 1-9 | 1-14 | 600 | 4.2 |
| 1-10 | 1-15 | 590 | 3.9 |
| 1-11 | 1-17 | 610 | 3.2 |
| 1-12 | 1-20 | 620 | 3.8 |
| 1-13 | 1-21 | 570 | 3.0 |
| 1-14 | 1-22 | 610 | 1.9 |
| 1-15 | 1-23 | 590 | 2.0 |
| 1-16 | 1-24 | 590 | 3.4 |
| 1-17 | 1-27 | 600 | 2.9 |
| 1-18 | 1-30 | 570 | 3.8 |
| 1-19 | 1-32 | 610 | 4.1 |
| 1-20 | 1-34 | 580 | 3.6 |
| 1-21 | 1-35 | 570 | 1.8 |
| 1-22 | 1-37 | 570 | 2.4 |
| 1-23 | 1-38 | 580 | 1.8 |
| 1-24 | 1-40 | 620 | 3.8 |
| 1-25 | 1-42 | 590 | 4.0 |
| 1-26 | 1-43 | 590 | 2.8 |
| 1-27 | 1-44 | 610 | 3.2 |
| 1-28 | 1-45 | 619 | 3.8 |
| 1-29 | 1-49 | 570 | 3.0 |

TABLE 1-1-continued

| Example | Azo pigment No. | $V_0 (-V)$ | $E_{\frac{1}{2}}$ (lux · sec) |
|---|---|---|---|
| 1-30 | 1-59 | 610 | 3.6 |
| 1-31 | 1-51 | 610 | 4.3 |
| 1-32 | 1-53 | 570 | 1.9 |
| 1-33 | 1-54 | 590 | 2.0 |
| 1-34 | 1-55 | 600 | 3.8 |
| 1-35 | 1-56 | 610 | 3.3 |
| 1-36 | 1-58 | 605 | 2.3 |
| 1-37 | 1-60 | 610 | 1.8 |
| 1-38 | 1-63 | 590 | 3.0 |
| 1-39 | 1-65 | 595 | 2.5 |
| 1-40 | 1-66 | 605 | 3.1 |

EXAMPLES 1-41 TO 1-45

The photosensitive members obtained in Examples 1-1, 1-21, 1-27, 1-29 and 1-33 were used for measurement of light part potential and dark part potential or repetitive use. More specifically, each photosensitive member was applied onto a cylinder of an electrophotographic copying machine provided with a conona charger of −5.6 kV, an exposure optical system, a developing device, a transfer charger, a discharging exposure optical system and a cleaner. The copying apparatus had a structure and function of providing an image on a transfer paper upon rotation of the cylinder. The copying operation was repeated by using the copying apparatus with initially set light part potential ($V_L$) and dark part potential ($V_D$) of around −600 and −100 V, respectively, and the light part potential and dark part potential after 1000 times of copying operation were measured. The results are shown in the following Table 1-2.

TABLE 1-2

| Example No. | Photosensitive member Example No. | Initial stage | | After 5000 times of copying | |
|---|---|---|---|---|---|
| | | $V_D(V)$ | $V_L(V)$ | $V_D(V)$ | $V_L(V)$ |
| 1-41 | 1-1 | −600 | −100 | −620 | −110 |
| 1-42 | 1-21 | −610 | −110 | −640 | −125 |
| 1-43 | 1-27 | −600 | −100 | −620 | −115 |
| 1-44 | 1-29 | −590 | −100 | −610 | −120 |
| 1-45 | 1-33 | −600 | −90 | −630 | −110 |

EXAMPLE 1-46

On the charge generation layer prepared in Example 1-1 was applied a coating solution prepared by dissolving 5 g of 2,4,7-trinitro-9-fluorenone and poly-4,4'-dioxydiphenyl-2,2'-propanecarbonate in 70 ml of tetrahydrofuran so as to provide a dry coating rate of 10 g/m², followed by drying.

The charging characteristics of the thus prepared photosensitive member were measured in the same manner as in Example 1-1 except that the charging polarity was made ⊕. The following results were obtained:

$V_0$: ⊕580 volt
$E_{\frac{1}{2}}$: 4.9 lux.sec

EXAMPLE 1-47

A polyethylene terephthalate film coated with a vapor-deposited aluminum layer was provided, and a 0.5 μ-thick polyvinyl alcohol film was formed on the aluminum layer.

Then, the dispersion of the trisazo pigment used in Example 1-1 was applied on the above formed polyvinyl alcohol film by means of a wire bar so as to provide a 0.5 μ-thick dry film, followed by drying to form a charge generation layer.

Then, a coating liquid prepared by dissolving 5 g of a pyrazoline compound represented by the formula:

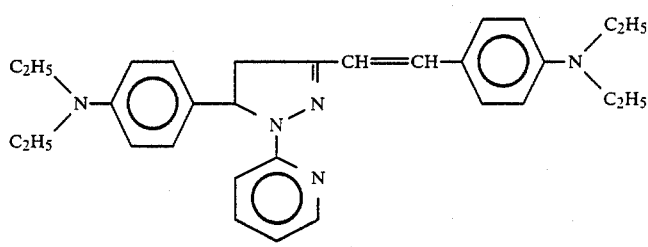

and 5 g of a polyarylate resin (polycondensation product of bisphenol A and terephthalic acid-isophthalic acid) is 70 ml of tetrahydrofuran on the charge generation layer so as to provide a 10-thick dry film, followed by drying to form a charge transportation layer.

The charging characteristics and durability characteristics of the thus prepared photosensitive member were measured in the same manner as in Examples 1-1 and 1-41, whereby the following results were obtained:

Initial characteristics
$V_0$: ⊖630 volt
$E_{\frac{1}{2}}$: 3.0 lux.sec
Durability characteristics

| Initial stage | | After 5000 sheets of copying | |
|---|---|---|---|
| $V_D$ | $V_L$ | $V_D$ | $V_L$ |
| −600 V | −100 V | −620 V | −120 V |

The above results show that the photosensitive member according to the present invention has a good sensitivity as well as an excellent potential stability on repectivie use.

EXAMPLE 1-48

On a 100 μ-thick aluminum plate was applied an ammoniacal aqueous solution of casein, followed by drying to form a 0.5 μ-thick undercoat layer.

Then, 5 g of 2,4,7-trinitro-9-fluorenone and 5 g of poly-N-vinylcarbazole ($\overline{Mn}$=300,000) were dissolved in 70 ml of tetrahydrofuran to form a charge-transfer complex liquid. The charge-transfer complex liquid and 1 g of azo pigment No. 1-26 shown at the end were added to and dispersed in a solution of 5 g of a polyester resin (Bylon, mfd. by Toyobo K.K.) in 70 ml of tetrahydrofuran. The dispersion was applied on the undercoat layer so as to provide a 12 μ-thick dry film, followed by drying.

The charging characteristics and durability characteristics of the thus prepared photosensitive member were measure in the same manner as in Examples 1-1 and 1-41 except that the charging polarity was made ⊕, whereby the following results were obtained:

Initial characteristics:
$V_0$: ⊕600 volt
$E_{\frac{1}{2}}$: 5.1 lux.sec

Durability characteristics:

| Initial stage | | after 5000 sheets of copying | |
|---|---|---|---|
| $V_D$ | $V_L$ | $V_D$ | $V_L$ |
| −590 V | +90 V | +620 V | +115 V |

EXAMPLE 1-49

On the casein layer of the aluminum plate coated with the casein layer prepared in Example 1-1, the charge transportation layer and charge generation laye which were the same as those in Example 1-1 were successively formed in this order, i.e., in the reverse order with that of Example 1-1, whereby a photosensitive member was obtained.

The charging characteristics of the thus prepared photosensitive member were measured in the same manner as in Example 1-1, except that the charging polarity was made ⊕, whereby the following results were obtained:

$V_0$: ⊕560 V
$E_{\frac{1}{2}}$: 4.2 lux.sec

EXAMPLES 2-1 TO 2-40

Photosensitive members according to these Examples were prepared in the same manner as in Example 1-1 except that the azo pigment No. 1-1 was respectively replaced by azo pigments shown in Table 2-1 (selected from the compounds shown at the end of this specification).

The charging characteristics of the thus prepared photosensitive members were measured in the same manner as in Example 1-1. The results are inclusively shown in the following Table 2-1.

TABLE 2-1

| Example | Azo pigment No. | $V_0$ (−V) | $E_{\frac{1}{2}}$ (lux · sec) |
|---|---|---|---|
| 2-1 | 2-1 | 560 | 4.0 |
| 2-2 | 2-2 | 600 | 3.2 |
| 2-3 | 2-3 | 580 | 2.9 |
| 2-4 | 2-4 | 570 | 3.0 |
| 2-5 | 2-5 | 600 | 2.6 |
| 2-6 | 2-6 | 580 | 2.8 |
| 2-7 | 2-7 | 600 | 2.4 |
| 2-8 | 2-8 | 610 | 3.3 |
| 2-9 | 2-9 | 600 | 2.6 |
| 2-10 | 2-10 | 620 | 2.6 |
| 2-11 | 2-11 | 610 | 2.7 |
| 2-12 | 2-13 | 590 | 2.9 |
| 2-13 | 2-16 | 590 | 4.3 |
| 2-14 | 2-20 | 610 | 4.1 |
| 2-15 | 2-21 | 570 | 3.2 |
| 2-16 | 2-22 | 570 | 2.9 |
| 2-17 | 2-28 | 600 | 2.6 |
| 2-18 | 2-29 | 590 | 2.4 |
| 2-19 | 2-32 | 570 | 3.8 |
| 2-20 | 2-35 | 580 | 3.2 |
| 2-21 | 2-38 | 610 | 3.8 |
| 2-22 | 2-40 | 620 | 3.6 |
| 2-23 | 2-41 | 580 | 3.6 |

TABLE 2-1-continued

| Example | Azo pigment No. | $V_0$ (−V) | $E_{\frac{1}{2}}$ (lux · sec) |
|---|---|---|---|
| 2-24 | 2-44 | 570 | 2.9 |
| 2-25 | 2-45 | 610 | 2.0 |
| 2-26 | 2-46 | 590 | 2.0 |
| 2-27 | 2-47 | 590 | 1.8 |
| 2-28 | 2-48 | 610 | 1.8 |
| 2-29 | 2-49 | 570 | 2.2 |
| 2-30 | 2-50 | 610 | 2.4 |
| 2-31 | 2-52 | 590 | 2.4 |
| 2-32 | 2-54 | 580 | 4.3 |
| 2-33 | 2-57 | 610 | 2.6 |
| 2-34 | 2-58 | 610 | 1.8 |
| 2-35 | 2-59 | 600 | 1.8 |
| 2-36 | 2-64 | 580 | 2.4 |
| 2-37 | 2-66 | 575 | 1.7 |
| 2-38 | 2-67 | 590 | 2.0 |
| 2-39 | 2-69 | 600 | 2.8 |
| 2-40 | 2-71 | 610 | 2.5 |

EXAMPLES 2-41 TO 2-45

The durability characteristics, i.e., the light path potential and dark part potential on repetitive use, of the photosensitive members obtained in Examples 2-1, 2-3, 2-4, 2-17 and 2-19 were measured in the same manner as in Example 1-41. The results are shown in the following Table 2-2.

TABLE 2-2

| Example No. | Photosensitive member Example No. | Initial stage | | After 5000 times of copying | |
|---|---|---|---|---|---|
| | | $V_D$(V) | $V_L$(V) | $V_D$(V) | $V_L$(V) |
| 2-41 | 2-1 | −600 | −100 | −620 | −120 |
| 2-42 | 2-3 | −590 | −100 | −630 | −120 |
| 2-43 | 2-4 | −590 | −110 | −630 | −130 |
| 2-44 | 2-17 | −600 | −90 | −610 | −110 |
| 2-45 | 2-19 | −610 | −100 | −620 | −130 |

EXAMPLE 2-46

On the charge generation layer prepared in Example 2-1 was applied a coating solution prepared by dissolving 5 g of 2,4,7-trinitro-9-fluorenone and poly-4,4′-dioxydiphenyl-2,2′-propanecarbonate in 70 ml of tetrahydrofuran so as to provide a dry coating rate of 10 g/m², followed by drying.

The charging characteristics of the thus prevented photosensitive member were measured in the same manner as in Example 1-1 except that the charging polarity was made ⊕. The following results were obtained:

$V_0$: ⊕560 volt
$E_{\frac{1}{2}}$: 5.8 lux.sec

EXAMPLE 2-47

A polyethylene terephthalate film coated with a vapor-deposited aluminum layer was provided, and a 0.5 μ-thick polyvinyl alcohol film was formed on the aluminum layer.

Then, the dispersion of the azo pigment used in Example 2-1 was applied on the above formed polyvinyl alcohol film by means of a wire bar so as to provide a 0.5 μ-thick dry film, followed by drying to form a charge generation layer.

Then, a coating liquid prepared by dissolving 5 g of a pyrazoline compound represented by the formula:

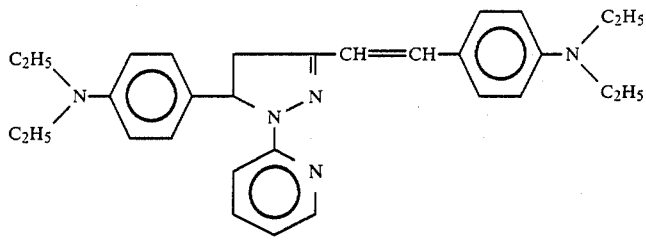

and 5 g pf a polyacrylate resin (polycondensation product of biphenyl A and terephthalic acid-isophthalic acid) in 70 ml of tetrahydrofuran on the charge generation layer so as to provide a 10 μ-thick dry film, followed by drying to form a charge transportation layer.

The charging characteristics and durability characteristics of the thus prepared photosensitive member were measured in the same manner as in Example 1-1 and 1-41, whereby the following results were obtained:

Initial characteristics:
$V_0$: ⊖590 volt
$E_{\frac{1}{2}}$: 4.5 lux.sec
Durability characteristics:

| Initial stage | | After 5000 sheets of copying | |
|---|---|---|---|
| $V_D$ | $V_L$ | $V_D$ | $V_L$ |
| −600 V | −100 V | −610 V | −120 V |

The above results show that the photosensitive member according to the present invention has a good sensitivity as well as an excellent potential stability on repetitive use.

EXAMPLE 2-48

On a 100 μ-thick aluminum plate was applied an ammoniacal aqueous solution of casein, followed by drying to form a 0.5 μ-thick undercoat layer.

Then, 5 g of 2,4,7-trinitro-9-fluorenone and 5 g of poly-N-vinylcarbazole ($\overline{Mn}$=300,000) were dissolved in 70 ml of tetrahydrofuran to form a charge-transfer complex liquid. The charge-transfer complex liquid and 1 g of azo pigment No. 2-26 shown at the end were added to and dispersed in a solution of 5 g of a polyester resin (Bylon, mfd. by Toyobo K.K.) in 70 ml of tetrahydrofuran. The dispersion was applied on the undercoat layer so as to provide a 12 μ-thick dry film, followed by drying.

The charging characteristics and durability characteristics of the thus prepared photosensitive member were measure in the same manner as in Example 1-1 and 1-41 except that the charging polarity was made ⊕, whereby the following results were obtained:

Initial characteristics:
$V_0$: ⊕580 volt
$E_{\frac{1}{2}}$: 5.3 lux.sec
Durability characteristics:

| Initial stage | | After 5000 sheets of copying | |
|---|---|---|---|
| $V_D$ | $V_L$ | $V_D$ | $V_L$ |
| +610 V | +105 V | +625 V | +120 V |

EXAMPLE 2-49

On the casein layer of the aluminum plate coated with the casein layer prepared in Example 2-1, the charge transportation layer and charge generation layer which were the same as those in Example 2-1, were successively formed in this order, i.e., in the reverse order with that of Example 2-1, whereby a photosensitive member was obtained.

The charging characteristics of the thus prepared photosensitive member were measured in the same manner as in Example 1-1, except that the charging polarity was made ⊕, whereby the following results were obtained:

$V_0$: ⊕580 volt
$E_{\frac{1}{2}}$: 4.8 lux.sec

EXAMPLES 3-1 TO 3-40

Photosensitive members according to these Examples were prepared in the same manner as in Example 1-1 except that the azo pigment No. 1-1 was respectively replaced by azo pigments shown in Table 3-1 (selected from the compounds shown at the end of this specification).

The charging characteristics of the thus prepared photosensitive members were measured in the same manner as in Example 1-1. The results are inclusively shown in the following Table 3-1.

TABLE 3-1

| Example | Azo pigment No. | $V_0$ (−V) | $E_{\frac{1}{2}}$ (lux · sec) |
|---|---|---|---|
| 3-1 | 3-1 | 570 | 3.7 |
| 3-2 | 3-2 | 605 | 2.9 |
| 3-3 | 3-3 | 590 | 2.5 |
| 3-4 | 3-4 | 590 | 2.8 |
| 3-5 | 3-5 | 605 | 2.4 |
| 3-6 | 3-6 | 595 | 2.9 |
| 3-7 | 3-7 | 615 | 2.0 |
| 3-8 | 3-8 | 615 | 2.4 |
| 3-9 | 3-9 | 620 | 2.3 |
| 3-10 | 3-10 | 620 | 2.6 |
| 3-11 | 3-11 | 620 | 2.3 |
| 3-12 | 3-13 | 610 | 3.1 |
| 3-13 | 3-16 | 610 | 4.0 |
| 3-14 | 3-20 | 620 | 4.0 |
| 3-15 | 3-21 | 590 | 3.5 |
| 3-16 | 3-22 | 590 | 2.6 |
| 3-17 | 3-28 | 615 | 2.2 |
| 3-18 | 3-29 | 610 | 2.0 |
| 3-19 | 3-32 | 590 | 3.5 |
| 3-20 | 3-35 | 590 | 2.9 |
| 3-21 | 3-38 | 620 | 3.0 |
| 3-22 | 3-40 | 615 | 3.3 |
| 3-23 | 3-41 | 600 | 3.3 |
| 3-24 | 3-44 | 590 | 2.6 |
| 3-25 | 3-45 | 620 | 1.7 |
| 3-26 | 3-46 | 610 | 1.9 |
| 3-27 | 3-47 | 605 | 1.8 |
| 3-28 | 3-48 | 620 | 1.9 |
| 3-29 | 3-49 | 590 | 2.0 |
| 3-30 | 3-50 | 620 | 2.1 |
| 3-31 | 3-52 | 610 | 2.1 |

TABLE 3-1-continued

| Example | Azo pigment No. | $V_0$ (−V) | $E_{1/2}$ (lux · sec) |
|---|---|---|---|
| 3-32 | 3-54 | 600 | 4.0 |
| 3-33 | 3-57 | 610 | 2.3 |
| 3-34 | 3-58 | 620 | 1.6 |
| 3-35 | 3-59 | 610 | 2.0 |
| 3-36 | 3-64 | 600 | 2.1 |
| 3-37 | 3-66 | 590 | 1.5 |
| 3-38 | 3-67 | 610 | 1.7 |
| 3-39 | 3-69 | 620 | 2.7 |
| 3-40 | 3-71 | 615 | 2.2 |

EXAMPLES 3-41 TO 3-45

The durability characteristics, i.e., the light part potential and dark part potential or repetitive use, of the photosensitive members obtained in Examples 3-1, 3-3, 3-4, 3-17 and 3-19 were measured in the same manner as in Example 1-41. The results are shown in the following Table 3-2.

TABLE 3-2

| Example No. | Photosensitive member Example No. | Initial stage | | After 5000 times of copying | |
|---|---|---|---|---|---|
| | | $V_D$ (V) | $V_L$ (V) | $V_D$ (V) | $V_L$ (V) |
| 3-41 | 3-1 | −600 | −100 | −620 | −120 |
| 3-42 | 3-3 | −590 | −100 | −630 | −120 |
| 3-43 | 3-4 | −590 | −110 | −630 | −130 |
| 3-44 | 3-17 | −600 | −90 | −610 | −110 |
| 3-45 | 3-19 | −610 | −100 | −620 | −130 |

EXAMPLE 3-46

On the charge generation layer prepared in Example 3-1 was applied a coating solution prepared by dissolving 5 g of 2,4,7-trinitro-9-fluorenone and poly-4,4′-dioxydiphenyl-2,2′-propanecarbonate in 70 ml of tetrahydrofuran so as to provide a dry coating rate of 10 g/m², followed by drying.

The charging characteristics of the thus prepared photosensitive member were measured in the same manner as in Example 1-1 except that the charging polarity was made ⊕. The following results were obtained:
$V_0$: ⊕580 volt
$E_{1/2}$: 5.1 lux.sec

EXAMPLE 3-47

A polyethylene terephthalate film coated with a vapor-deposited aluminum layer was provided, and a 0.5 μ-thick polyvinyl alcohol film was formed on the aluminum layer.

Then, the dispersion of the azo pigment used in Example 3-1 was applied on the above formed polyvinyl alcohol film by means of a wire bar so as to provide a 0.5 μ-thick dry film, followed by drying to form a charge generation layer.

Then, a coating liquid prepared by dissolving 5 g of a pyrazoline compound represented by the formula:

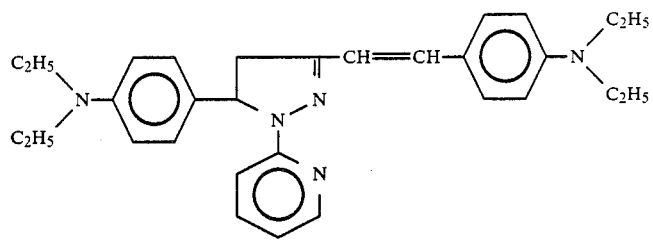

and 5 g of a polyarylate resin (polycondensation product of bisphenol A and terephthalic acid-isophthalic acid) in 70 ml of tetrahydrofuran on the charge generation layer so as to provide a 10 μ-thick dry film, followed by drying to form a charge transportation layer.

The charging characteristics and durability characteristics of the thus prepared photosensitive member were measured in the same manner as in Examples 1-1 and 1-41, whereby the following results were obtained:
Initial characteristics:
$V_0$: ⊖580 volt
$E_{1/2}$: 4.3 lux.sec
Durability characteristics:

| Initial stage | | After 5000 sheets of copying | |
|---|---|---|---|
| $V_D$ | $V_L$ | $V_D$ | $V_L$ |
| −600 V | −100 V | −620 V | −120 V |

The above results show that the photosensitive member according to the present invention has a good sensitivity as well as an excellent potential stability on repetitive use.

EXAMPLE 3-48

On a 100 μ-thick aluminum plate was applied an ammoniacal aqueous solution of casein, followed by drying to form a 0.5 μ-thick undercoat layer.

Then, 5 g of 2,4,7-trinitro-9-fluorenone and 5 g of poly-N-vinylcarbazole ($\overline{Mn}$=300,000) were dissolved in 70 ml of tetrahydrofuran to form a charge-transfer complex liquid. The charge-transfer complex liquid and 1 g of azo pigment No. 3-26 shown at the end were added to and dispersed in a solution of 5 g of a polyester resin (Bylon, mfd. by Toyobo K.K.) in 70 ml of tetrahydrofuran. The dispersion was applied on the undercoat layer so as to provide a 12 μ-thick dry film, followed by drying.

The charging characteristics and durability characteristics of the thus prepared photosensitive member were measure in the same manner as in Example 1-1 and 1-41 except that the charging polarity was made ⊕, whereby the following results were obtained:
Initial characteristics:
$V_0$: ⊕590 volt
$E_{1/2}$: 4.9 lux.sec
Durability characteristics:

| Initial stage | | After 5000 sheets of copying | |
|---|---|---|---|
| $V_D$ | $V_L$ | $V_D$ | $V_L$ |
| +610 V | +100 V | +640 V | +135 V |

EXAMPLE 3-49

On the casein layer of the aluminum plate coated with the casein layer prepared in Example 3-1, the charge transportation layer and charge generation layer which were the same as those in Example 3-1 were successively formed in this order, i.e., in the reverse order with that of Example 3-1, whereby a photosensitive member was obtained.

The charging characteristics of the thus prepared photosensitive member were measured in the same manner as in Example 1-1, except that the charging polarity was made ⊕, whereby the following results were obtained:

$V_0$: ⊕590 volt
E1/2: 4.4 lux.sec

EXAMPLES 4-1 TO 4-40

Photosensitive members according to these Examples were prepared in the same manner as in Example 1-1 except that the azo pigment No. 1-1 was respectively replaced by azo pigments shown in Table 4-1 (selected from the compounds shown at the end of this specification).

The charging characteristics of the thus prepared photosensitive members were measured in the same manner as in Example 1-1. The results are inclusively shown in the following Table 4-1.

TABLE 4-1

| Example | Azo pigment No. | $V_0$ (−V) | $E_{\frac{1}{2}}$ (lux · sec) |
|---|---|---|---|
| 4-1 | 4-1 | 580 | 3.8 |
| 4-2 | 4-2 | 620 | 3.0 |
| 4-3 | 4-3 | 600 | 2.7 |
| 4-4 | 4-4 | 590 | 2.3 |
| 4-5 | 4-5 | 610 | 2.4 |
| 4-6 | 4-6 | 600 | 2.6 |
| 4-7 | 4-7 | 610 | 2.0 |
| 4-8 | 4-8 | 620 | 3.1 |
| 4-9 | 4-9 | 570 | 2.4 |
| 4-10 | 4-10 | 620 | 2.4 |
| 4-11 | 4-11 | 620 | 2.5 |
| 4-12 | 4-13 | 605 | 2.5 |
| 4-13 | 4-16 | 605 | 4.1 |
| 4-14 | 4-20 | 615 | 3.9 |
| 4-15 | 4-21 | 590 | 3.0 |
| 4-16 | 4-22 | 590 | 2.5 |
| 4-17 | 4-28 | 615 | 2.5 |
| 4-18 | 4-29 | 600 | 1.9 |
| 4-19 | 4-32 | 590 | 3.6 |
| 4-20 | 4-35 | 595 | 3.0 |
| 4-21 | 4-38 | 615 | 3.3 |
| 4-22 | 4-40 | 625 | 3.4 |
| 4-23 | 4-41 | 600 | 3.4 |
| 4-24 | 4-44 | 590 | 2.7 |
| 4-25 | 4-45 | 615 | 1.8 |
| 4-26 | 4-46 | 610 | 1.8 |
| 4-27 | 4-47 | 605 | 1.9 |
| 4-28 | 4-48 | 620 | 1.8 |
| 4-29 | 4-49 | 590 | 2.0 |
| 4-30 | 4-50 | 610 | 2.3 |
| 4-31 | 4-52 | 610 | 2.0 |

TABLE 4-1-continued

| Example | Azo pigment No. | $V_0$ (−V) | $E_{\frac{1}{2}}$ (lux · sec) |
|---|---|---|---|
| 4-32 | 4-53 | 600 | 3.2 |
| 4-33 | 4-57 | 610 | 2.2 |
| 4-34 | 4-58 | 615 | 1.6 |
| 4-35 | 4-59 | 620 | 1.7 |
| 4-36 | 4-64 | 600 | 2.2 |
| 4-37 | 4-66 | 590 | 1.6 |
| 4-38 | 4-67 | 605 | 2.0 |
| 4-39 | 4-69 | 615 | 2.7 |
| 4-40 | 4-71 | 620 | 2.1 |

EXAMPLES 4-41 TO 4-45

The durability characteristics, i.e., the light part potential and dark part potential or repetitive use, of the photosensitive members obtained in Examples 3-1, 3-3, 3-4, 3-17 and 3-19 were measured in the same manner as in Example 1-41. The results are shown in the following Table 4-2.

TABLE 4-2

| Example No. | Photosensitive member Example No. | Initial stage | | after 5000 times of copying | |
|---|---|---|---|---|---|
| | | $V_D$ (V) | $V_L$ (V) | $V_D$ (V) | $V_L$ (V) |
| 4-41 | 4-1 | −605 | −100 | −620 | −120 |
| 4-42 | 4-3 | −595 | −100 | −625 | −120 |
| 4-43 | 4-4 | −590 | −105 | −620 | −130 |
| 4-44 | 4-17 | −610 | −95 | −630 | −115 |
| 4-45 | 4-19 | −605 | −100 | −625 | −125 |

EXAMPLE 4-46

On the charge generation layer prepared in Example 4-1 was applied a coating solution prepared by dissolving 5 g of 2,4,7-trinitro-9-fluorenone and poly-4,4'-dioxydiphenyl-2,2'-propanecarbonate in 70 ml of tetrahydrofuran so as to provide a dry coating rate of 10 g/m², followed by drying.

The charging characteristics of the thus prepared photosensitive member were measured in the same manner as in Example 1-1 except that the charging polarity was made ⊕. The following results were obtained:

$V_0$: ⊕580 volt
E1/2: 5.4 lux.sec

EXAMPLE 4-47

A polyethylene terephthalate film coated with a vapor-deposited aluminum layer was provided, and a 0.5 μ-thick polyvinyl alcohol film was formed on the aluminum layer.

Then, the dispersion of the azo pigment used in Example 4-1 was applied on the above formed polyvinyl alcohol film by means of a wire bar so as to provide a 0.5 μ-thick dry film, followed by drying to form a charge generation layer.

Then, a coating liquid prepared by dissolving 5 g of pyrazoline compound represented by the formula:

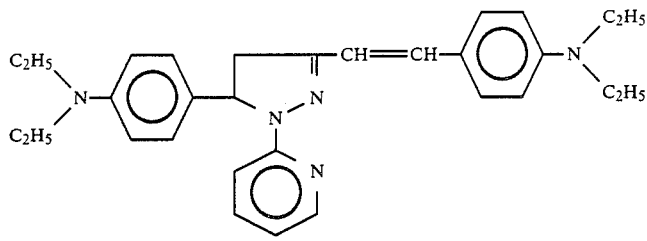

and 5 g of a polyarylate resin (polycondensation product of biphenol A and terephthalic acid-isophthalic acid) in 70 ml of tetrahydrofuran on the charge generation layer so as to provide a 10 μ-thick dry film, followed by drying to form a charge transportation layer.

The charging characteristics and durability characteristics of the thus prepared photosensitive member were measured in the same manner as in Examples 1-1 and 1-41, whereby the following results were obtained:

Initial characteristics:
$V_0$: ⊖605 volt
E1/2: 4.3 lux.sec
Durability characteristics

| Initial stage | | After 5000 sheets of copying | |
|---|---|---|---|
| $V_D$ | $V_L$ | $V_D$ | $V_L$ |
| −600 V | −100 V | −615 V | −125 V |

The above results show that the photosensitive member according to the present invention has a good sensitivity as well as an excellent potential stability on repetitive use.

EXAMPLE 4-48

On a 100 μ-thick aluminum plate was applied an ammoniacal aqueous solution of casein, followed by drying to form a 0.5 μ-thick undercoat layer.

Then, 5 g of 2,4,7-trinitro-9-fluorenone and 5 g of poly-N-vinylcarbazole ($\overline{Mn}$=300,000) were dissolved in 70 ml of tetrahydrofuran to form a charge-transfer complex liquid. The charge-transfer complex liquid and 1 g of azo pigment No. 4-26 shown at the end were added to and dispersed in a solution of 5 g of a polyester resin (Bylon, mfd. by Toyobo K.K.) in 70 ml of tetrahydrofuran. The dispersion was applied on the undercoat layer so as to provide a 12 μ-thick dry film, followed by drying.

The charging characteristics and durability characteristics of the thus prepared photosensitive member were measure in the same manner as in Examples 1-1 and 1-41 except that the charging polarity was made ⊕, whereby the following results were obtained:

Initial characteristics:
$V_0$: ⊕590 volt
E1/2: 5.1 lux.sec
Durability characteristics:

| Initial stage | | After 5000 sheets of copying | |
|---|---|---|---|
| $V_D$ | $V_L$ | $V_D$ | $V_L$ |
| +605 V | +100 V | +635 V | +135 V |

EXAMPLE 4-49

On the casein layer of the aluminum plate coated with the casein layer prepared in Example 4-1, the charge transportation layer and charge generation layer which were the same as those in Example 4-1 were successively formed in this order, i.e., in the reverse order with that of Example 4-1, whereby a photosensitive member was obtained.

The charging characteristics of the thus prepared photosensitive member were measured in the same manner as in Example 1-1, except that the charging polarity was made ⊕, whereby the following results were obtained:

$V_0$: ⊕590 Volt
E1/2: 4.6 lux.sec

EXAMPLES 5-1 TO 5-40

Photosensitive members according to these Examples were prepared in the same manner as in Example 1-1 except that the azo pigment No. 1-1 was respectively replaced by azo pigments shown in Table 5-1 (selected from the compounds shown at the end of this specification).

The charging characteristics of the thus prepared photosensitive members were measured in the same manner as in Example 1-1. The results are inclusively shown in the following Table 5-1.

TABLE 5-1

| Example | Azo pigment No. | $V_0$ (−V) | $E_{\frac{1}{2}}$ (lux · sec) |
|---|---|---|---|
| 5-1 | 5-1 | 580 | 4.1 |
| 5-2 | 5-2 | 605 | 3.8 |
| 5-3 | 5-3 | 585 | 3.1 |
| 5-4 | 5-4 | 590 | 3.8 |
| 5-6 | 5-6 | 590 | 2.8 |
| 5-7 | 5-7 | 595 | 2.6 |
| 5-8 | 5-8 | 600 | 3.0 |
| 5-10 | 5-10 | 600 | 2.5 |
| 5-11 | 5-11 | 600 | 2.9 |
| 5-12 | 5-13 | 595 | 2.9 |
| 5-13 | 5-16 | 590 | 3.8 |
| 5-14 | 5-20 | 610 | 4.0 |
| 5-15 | 5-21 | 580 | 3.0 |
| 5-16 | 5-22 | 590 | 2.9 |
| 5-17 | 5-28 | 585 | 2.9 |
| 5-18 | 5-29 | 590 | 2.5 |
| 5-19 | 5-32 | 580 | 3.5 |
| 5-20 | 5-35 | 580 | 3.3 |
| 5-21 | 5-38 | 595 | 3.8 |
| 5-22 | 5-40 | 610 | 3.5 |
| 5-23 | 5-42 | 585 | 3.0 |
| 5-24 | 5-44 | 590 | 2.9 |
| 5-25 | 5-45 | 605 | 2.5 |
| 5-26 | 5-46 | 585 | 2.6 |
| 5-27 | 5-47 | 595 | 2.8 |
| 5-28 | 5-48 | 610 | 2.9 |
| 5-29 | 5-49 | 580 | 2.3 |
| 5-30 | 5-50 | 595 | 2.3 |
| 5-31 | 5-52 | 595 | 2.5 |
| 5-32 | 5-54 | 600 | 4.2 |
| 5-33 | 5-57 | 595 | 2.9 |

TABLE 5-1-continued

| Example | Azo pigment No. | $V_0(-V)$ | $E_{\frac{1}{2}}$ (lux · sec) |
|---|---|---|---|
| 5-34 | 5-58 | 615 | 2.2 |
| 5-35 | 5-59 | 590 | 2.3 |
| 5-36 | 5-64 | 585 | 2.4 |
| 5-37 | 5-66 | 585 | 2.3 |
| 5-38 | 5-67 | 590 | 2.4 |
| 5-39 | 5-69 | 610 | 2.8 |
| 5-40 | 5-71 | 600 | 2.3 |

EXAMPLES 5-41 TO 5-45

The durability characteristics, i.e., the light part potential and dark part potential on repetitive use, of the photosensitive members obtained in Examples 5-1, 5-3, 5-4, 5-17 and 5-19 were measured in the same manner as in Example 1-41. The results are shown in the following Table 2-2.

TABLE 5-2

| Example No. | Photosensitive member Example No. | Initial stage $V_D(V)$ | Initial stage $V_L(V)$ | After 5000 times of copying $V_D(V)$ | After 5000 times of copying $V_L(V)$ |
|---|---|---|---|---|---|
| 5-41 | 5-1 | −605 | −100 | −630 | −130 |
| 5-42 | 5-3 | −595 | −90 | −620 | −120 |
| 5-43 | 5-4 | −605 | −100 | −630 | −130 |
| 5-44 | 5-17 | −590 | −95 | −615 | −120 |
| 5-45 | 5-19 | −600 | −105 | −625 | −130 |

EXAMPLE 5-46

On the charge generation layer prepared in Example 5-1 was applied a coating solution prepared by dissolving 5 g of 2,4,7-trinitro-9-fluorenone and poly-4,4'-dioxydiphenyl-2,2'-propanecarbonate in 70 ml of tetrahydrofuran so as to provide a dry coating rate of 10 g/m², followed by drying.

The charging characteristics of the thus prepared photosensitive member were measured in the same manner as in Example 1-1 except that the charging polarity was made ⊕. The following results were obtained:
$V_0$: ⊕580 volt
E1/2: 6.7 lux.sec

EXAMPLE 5-47

A polyethylene terephthalate film coated with a vapor-deposited aluminum layer was provided, and a 0.5 μ-thick polyvinyl alcohol film was formed on the aluminum layer.

Then, the dispersion of the azo pigment used in Example 5-1 was applied on the above formed polyvinyl alcohol film by means of a wire bar so as to provide a 0.5 μ-thick dry film, followed by drying to form a charge generation layer.

Then, a coating liquid prepared by dissolving 5 g of a pyrazoline compound represented by the formula:

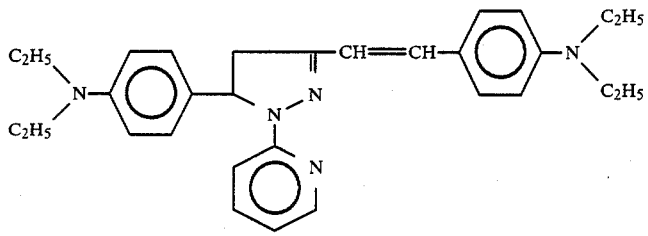

and 5 g of a polyarylate resin (polycondensation product of bisphenol A and terephthalic acid-isophthalic acid) in 70 ml of tetrahydrofuran on the charge generation layer so as to provide a 10 μ-thick dry film, followed by drying to form a charge transportation layer.

The charging characteristics and durability characteristics of the thus prepared photosensitive member were measured in the same manner as in Examples 1-1 and 1-41, whereby the following results were obtained:
Initial characteristics:
$V_0$: ⊖600 volt
E1/2: 4.8 lux.sec

| Initial stage | | After 5000 sheets of copying | |
|---|---|---|---|
| $V_D$ | $V_L$ | $V_D$ | $V_L$ |
| −600 V | −100 V | −620 V | −130 V |

The above results show that the photosensitive member according to the present invention has a good sensitivity as well as an excellent potential stability on repetitive use.

EXAMPLE 5-48

On a 100 μ-thick aluminum plate was applied an ammoniacal aqueous solution of casein, followed by drying to form a 0.5 μ-thick undercoat layer.

Then, 5 g of 2,4,7-trinitro-9-fluorenone and 5 g of poly-N-vinylcarbazole ($\overline{Mn}$=300,000) were dissolved in 70 ml of tetrahydrofuran to form a charge-transfer complex liquid. The charge-transfer complex liquid and 1 g of azo pigment No. 5-26 shown at the end were added to and dispersed in a solution of 5 g of a polyester resin (Bylon, mfd. by Toyobo K.K.) in 70 ml of tetrahydrofuran. The dispersion was applied on the undercoat layer so as to provide a 12 μ-thick dry film, followed by drying.

The charging characteristics and durability characteristics of the thus prepared photosensitive member were measure in the same manner as in Examples 1-1 and 1-41 except that the charging polarity was made ⊕, whereby the following results were obtained:
Initial characteristics:
$V_0$: ⊕590 volt
E1/2: 5.2 lux.sec
Durability characteristics:

| Initial stage | | After 5000 sheets of copying | |
|---|---|---|---|
| $V_D$ | $V_L$ | $V_D$ | $V_L$ |
| 625 V | 105 V | 640 V | 120 V |

EXAMPLE 5-49

On the casein layer of the aluminum plate coated with the casein layer prepared in Example 5-1, the charge transportation layer and charge generation layer which were the same as those in Example 5-1 were successively formed in this order, i.e., in the reverse order with that of Example 5-1, whereby a photosensitive member was obtained.

The charging characteristics of the thus prepared photosensitive member were measured in the same manner as in Example 1-1, except that the charging polarity was made ⊕, whereby the following results were obtained:

Initial characteristics:
$V_0$: ⊕585 volt
$E_{1/2}$: 4.9 lux.sec
Durability characteristics:

| Initial stage | | After 5000 sheets of copying | |
|---|---|---|---|
| $V_D$ | $V_L$ | $V_D$ | $V_L$ |
| 610 V | 100 V | 625 V | 120 V |

EXAMPLES 6-1 TO 6-40

Photosensitive members according to these Examples were prepared in the same manner as in Example 1-1 except that the azo pigment No. 1-1 was respectively replaced by azo pigments shown in Table 6-1 (selected from the compounds shown at the end of this specification).

The charging characteristics of the thus prepared photosensitive members were measured in the same manner as in Example 1-1. The results are inclusively shown in the following Table 6-1.

TABLE 6-1

| Example | Azo pigment No. | $V_0$ (−V) | $E_{1/2}$ (lux · sec) |
|---|---|---|---|
| 6-1 | 6-1 | 600 | 3.5 |
| 6-2 | 6-2 | 610 | 3.0 |
| 6-3 | 6-3 | 590 | 4.1 |
| 6-4 | 6-4 | 580 | 3.8 |
| 6-5 | 6-5 | 580 | 3.6 |
| 6-6 | 6-6 | 570 | 3.9 |
| 6-7 | 6-7 | 590 | 2.8 |
| 6-8 | 6-8 | 560 | 3.2 |
| 6-9 | 6-9 | 590 | 3.5 |
| 6-10 | 6-10 | 590 | 3.6 |
| 6-11 | 6-11 | 570 | 3.4 |
| 6-12 | 6-14 | 590 | 3.8 |
| 6-13 | 6-15 | 560 | 2.7 |
| 6-14 | 6-16 | 580 | 4.0 |
| 6-15 | 6-20 | 570 | 3.5 |
| 6-16 | 6-21 | 560 | 3.1 |
| 6-17 | 6-22 | 590 | 3.3 |
| 6-18 | 6-23 | 600 | 3.7 |
| 6-19 | 6-24 | 550 | 3.2 |
| 6-20 | 6-25 | 580 | 4.3 |
| 6-21 | 6-27 | 580 | 3.4 |
| 6-22 | 6-28 | 580 | 3.5 |
| 6-23 | 6-29 | 590 | 2.6 |
| 6-24 | 6-31 | 560 | 4.5 |
| 6-25 | 6-33 | 570 | 3.2 |
| 6-26 | 6-34 | 560 | 2.5 |
| 6-27 | 6-35 | 590 | 3.8 |
| 6-28 | 6-37 | 590 | 3.7 |
| 6-29 | 6-38 | 570 | 4.1 |

TABLE 6-1-continued

| Example | Azo pigment No. | $V_0$ (−V) | $E_{1/2}$ (lux · sec) |
|---|---|---|---|
| 6-30 | 6-39 | 610 | 2.7 |
| 6-31 | 6-40 | 600 | 2.6 |
| 6-32 | 6-42 | 600 | 3.0 |
| 6-33 | 6-45 | 590 | 2.8 |
| 6-34 | 6-48 | 580 | 3.6 |
| 6-35 | 6-50 | 590 | 3.4 |
| 6-36 | 6-52 | 580 | 4.1 |
| 6-37 | 6-57 | 580 | 3.8 |
| 6-38 | 6-60 | 560 | 3.2 |
| 6-39 | 6-64 | 570 | 4.5 |
| 6-40 | 6-65 | 590 | 2.9 |

EXAMPLES 6-41 TO 6-45

The durability characteristics, i.e., the light part potential and dark part potential on repetitive use, of the photosensitive members obtained in Examples 6-1, 6-6, 6-25, 6-30 and 6-37 were measured in the same manner as in Example 1-41. The results are shown in the following Table 6-2.

TABLE 6-2

| Example No. | Photosensitive member Example No. | Initial stage | | After 5000 times of copying | |
|---|---|---|---|---|---|
| | | $V_D$ (V) | $V_L$ (V) | $V_D$ (V) | $V_L$ (V) |
| 6-41 | 6-1 | −590 | −100 | −610 | −120 |
| 6-42 | 6-6 | −600 | −100 | −620 | −120 |
| 6-43 | 6-25 | −600 | −90 | −620 | −110 |
| 6-44 | 6-30 | −610 | −110 | −630 | −130 |
| 6-45 | 6-37 | −580 | −100 | −610 | −130 |

EXAMPLE 6-46

On the charge generation layer prepared in Example 6-1 was applied a coating solution prepared by dissolving 5 g of 2,4,7-trinitro-9-fluorenone and poly-4,4'-dioxydiphenyl-2,2'-propanecarbonate in 70 ml of tetrahydrofuran so as to provide a dry coating rate of 10 g/cm², followed by drying.

The charging characteristics of the thus prepared photosensitive member were measured in the same manner as in Example 1-1 except that the charging polarity was made ⊕. The following results were obtained:

$V_0$: ⊕570 volt
$E_{1/2}$: 5.6 lux.sec

EXAMPLE 6-47

A polyethylene terephthalate film coated with a vapor-deposited aluminum layer was provided, and a 0.5 μ-thick polyvinyl alcohol film was formed on the aluminum layer.

Then, the dispersion of the azo pigment used in Example 6-1 was applied on the above formed polyvinyl alcohol film by means of a wire bar so as to provide a 0.5 μ-thick dry film, followed by drying to form a charge generation layer.

Then, a coating liquid prepared by dissolving 5 g of a pyrazoline compound represented by the formula:

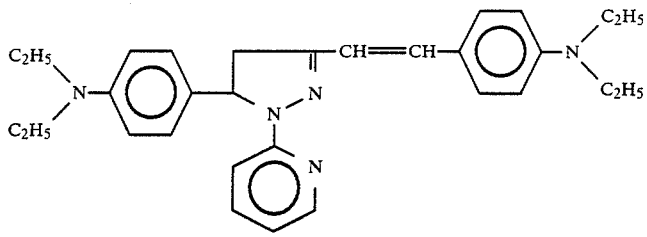

and 5 g of a polyarylate resin (polycondensation product of bisphenol A and terephthalic acid-isophthalic acid) in 70 ml of tetrahydrofuran on the charge generation layer so as to provide a 10 μ-thick dry film, followed by drying to form a charge transportation layer.

The charging characteristics and durability characteristics of the thus prepared photosensitive member were measured in the same manner as in Examples 1-1 and 1-41, whereby the following results were obtained:
Initial characteristics:
$V_0$: ⊖580 volt
$E_{\frac{1}{2}}$: 4.3 lux.sec
Durability characteristics:

| Initial stage | | After 5000 sheets of copying | |
|---|---|---|---|
| $V_D$ | $V_L$ | $V_D$ | $V_L$ |
| −580 V | −100 V | −590 V | −120 V |

The above results show that the photosensitive member according to the present invention has a good sensitivity as well as an excellent potential stability on repetitive use.

EXAMPLE 6-48

On a 100 μ-thick aluminum plate was applied an ammoniacal aqueous solution of casein, followed by drying to form a 0.5 μ-thick undercoat layer.

Then, 5 g of 2,4,7-trinitro-9-fluorenone and 5 g of poly-N-vinylcarbazole ($\overline{Mn}$=300,000) were dissolved in 70 ml of tetrahydrofuran to form a charge-transfer complex liquid. The charge-transfer complex liquid and 1 g of azo pigment No. 6-32 shown at the end were added to and dispersed in a solution of 5 g of a polyester resin (Bylon, mfd. by Toyobo K.K.) in 70 ml of tetrahydrofuran. The dispersion was applied on the undercoat layer so as to provide a 12 μ-thick dry film, followed by drying.

The charging characteristics and durability characteristics of the thus prepared photosensitive member were measured in the same manner as in Examples 1-1 and 1-41 except that the charging polarity was made ⊕, whereby the following results were obtained:
Initial characteristics:
$V_0$: ⊕580 volt
$E_{\frac{1}{2}}$: 5.2 lux.sec
Durability characteristics:

| Initial stage | | After 5000 sheets of copying | |
|---|---|---|---|
| $V_D$ | $V_L$ | $V_D$ | $V_L$ |
| +590 V | +110 V | +600 V | +120 V |

EXAMPLE 6-49

On the casein layer of the aluminum plate coated with the casein layer prepared in Example 6-1, the charge transportation layer and charge generation layer which were the same as those in Example 6-1 were successively formed in this order, i.e., in the reverse order with that of Example 6-1, whereby a photosensitive member was obtained.

The charging characteristics of the thus prepared photosensitive member were measured in the same manner as in Example 1-1, except that the charging polarity was made ⊕, whereby the following results were obtained:
$V_0$: ⊕590 volt
$E_{\frac{1}{2}}$: 4.7 lux. sec Examples of azo pigments represented by the formula (1):

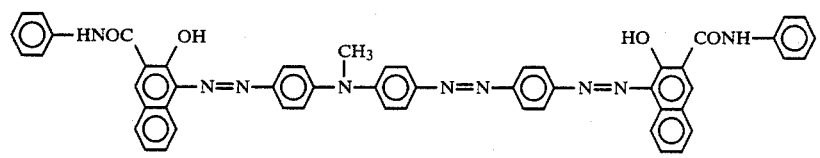

1-1

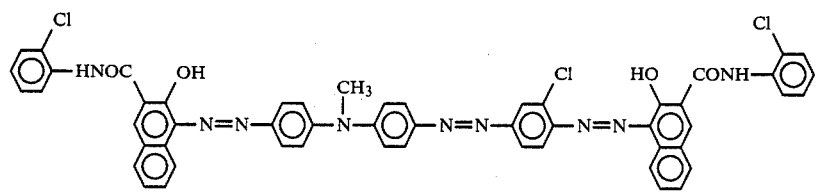

1-2

-continued
Examples of azo pigments represented by the formula (1):
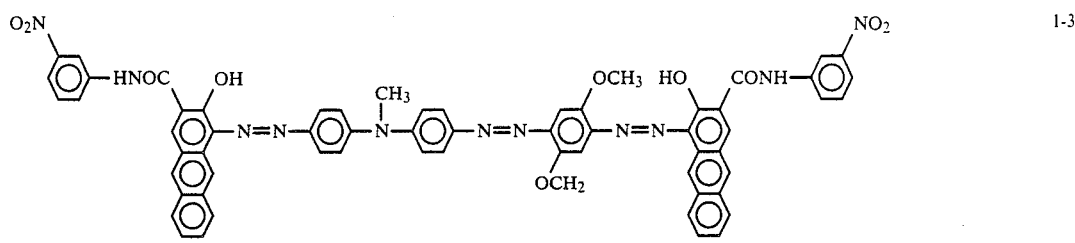
1-3
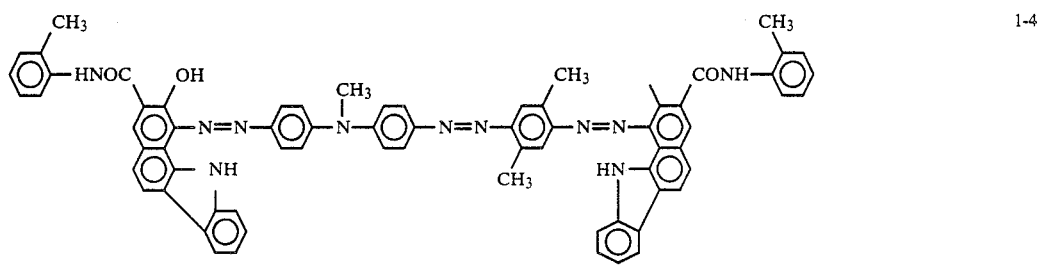
1-4
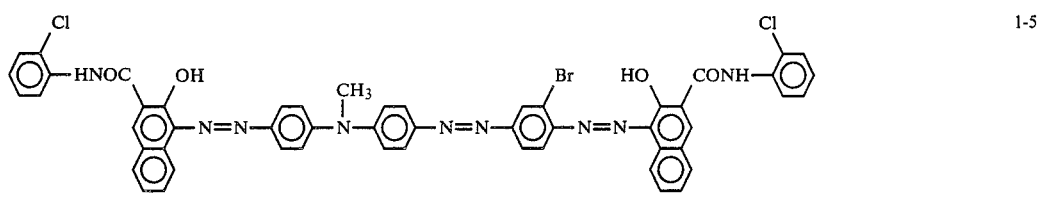
1-5
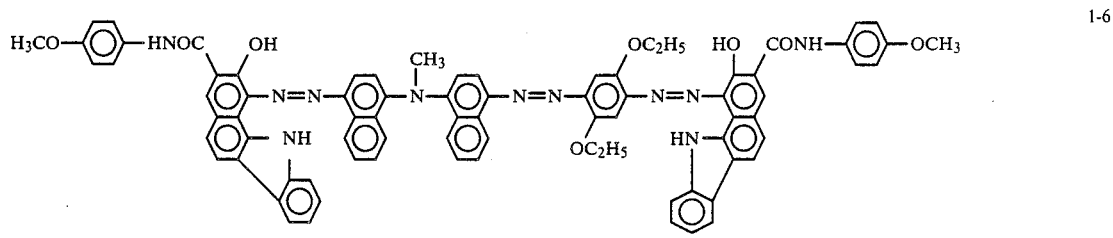
1-6
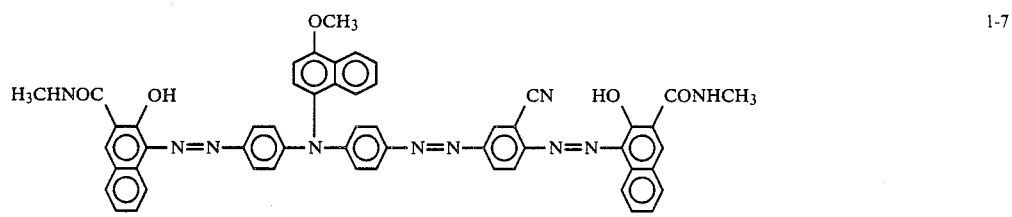
1-7
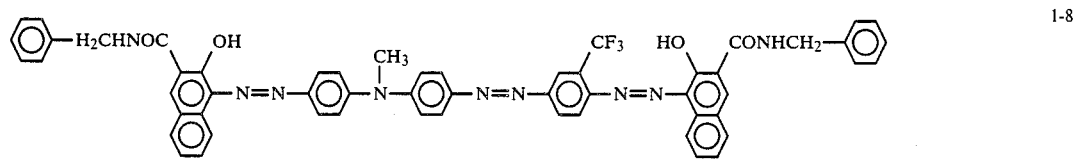
1-8

-continued
Examples of azo pigments represented by the formula (1):
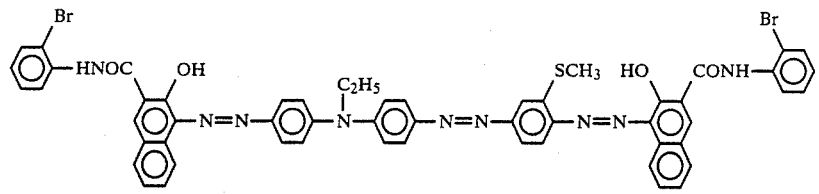 1-9
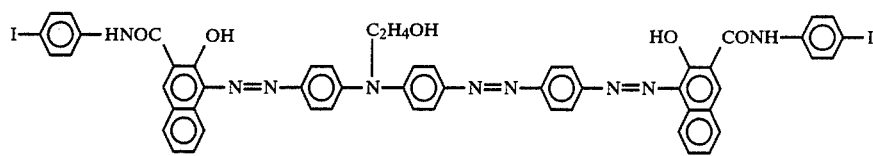 1-10
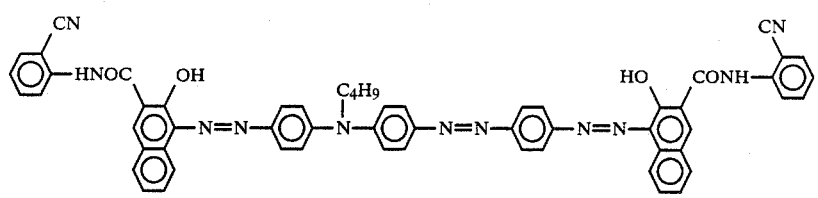 1-11
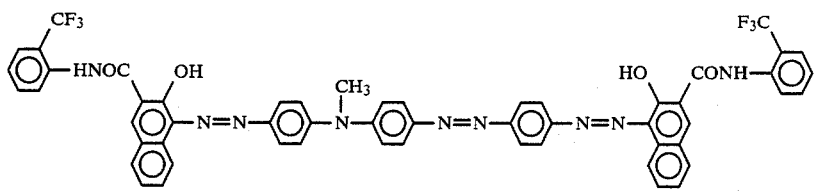 1-12
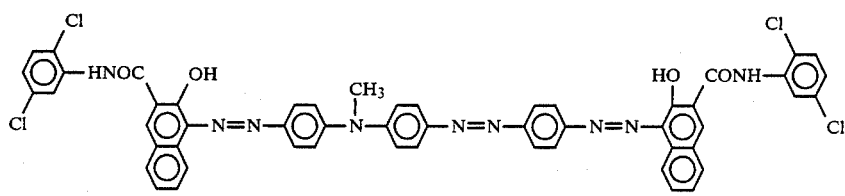 1-13
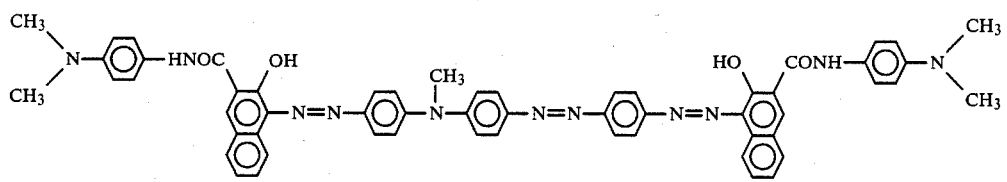 1-14
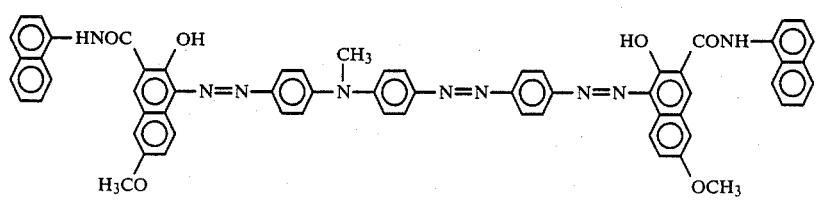 1-15

-continued
Examples of azo pigments represented by the formula (1):
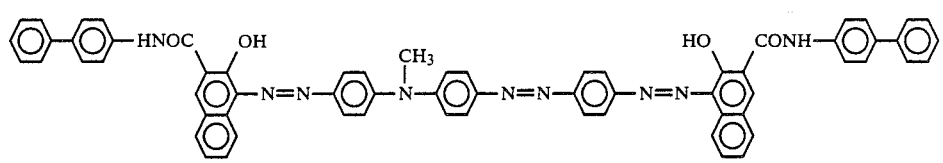 1-16
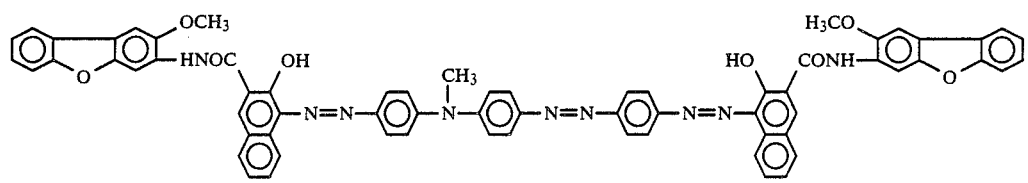 1-17
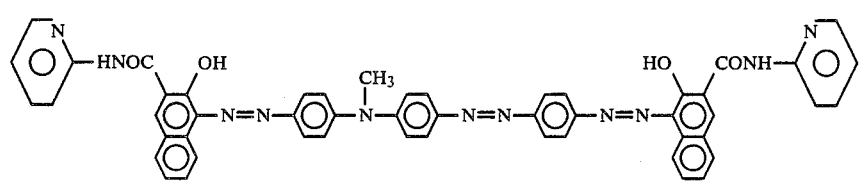 1-18
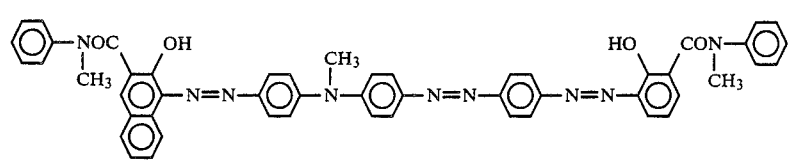 1-19
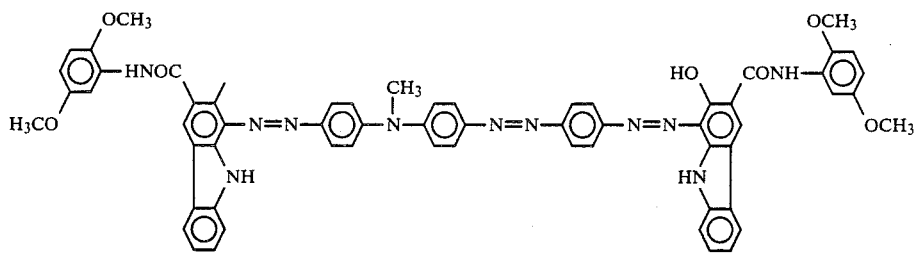 1-20
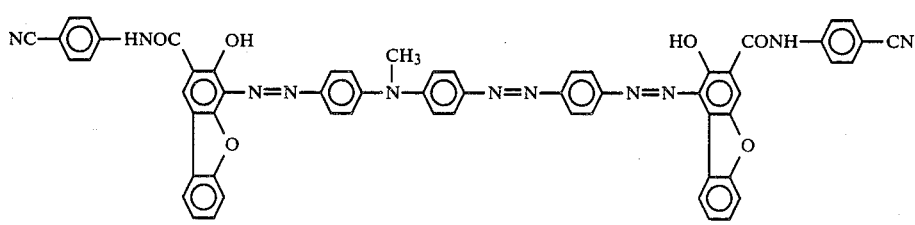 1-21

-continued
Examples of azo pigments represented by the formula (1):
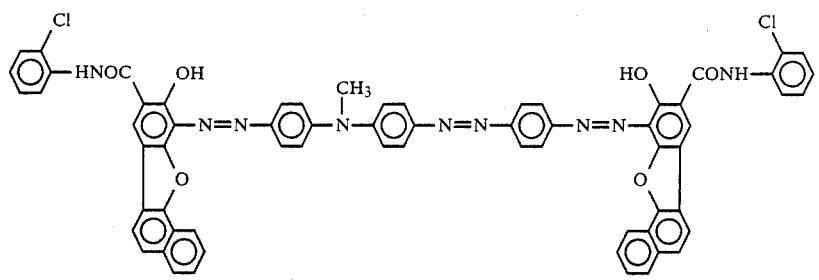
1-22
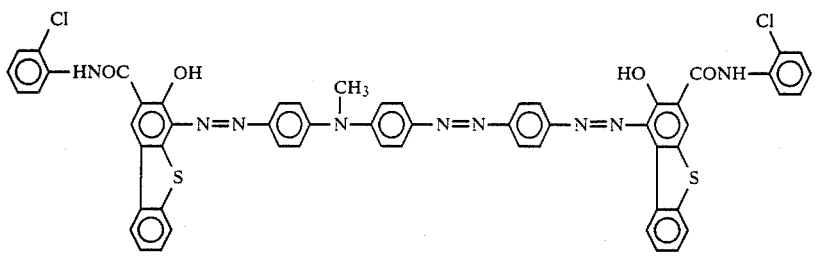
1-23
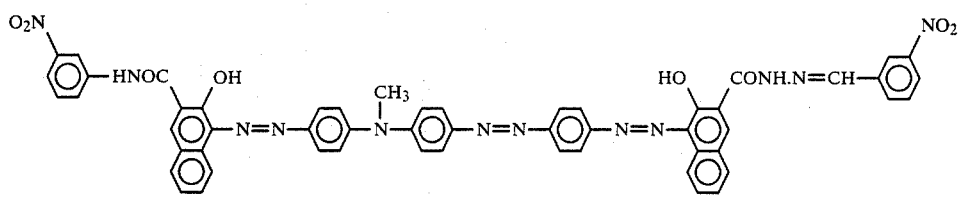
1-24
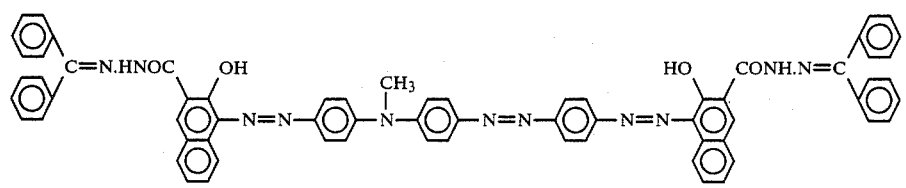
1-25
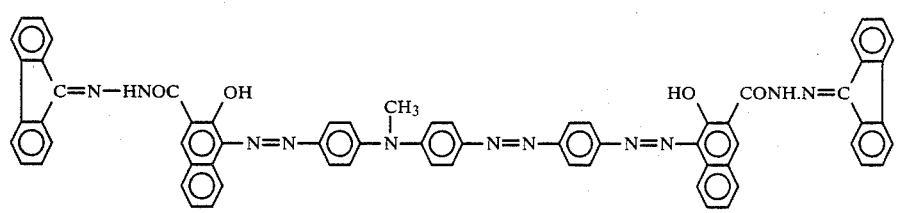
1-26
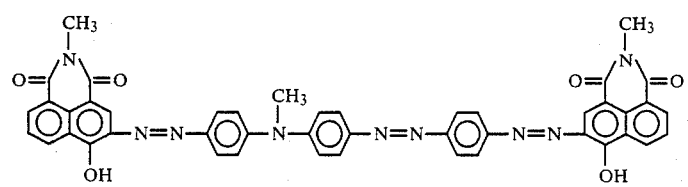
1-27

-continued
Examples of azo pigments represented by the formula (1):
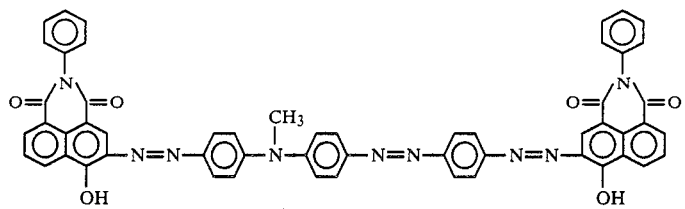
1-28
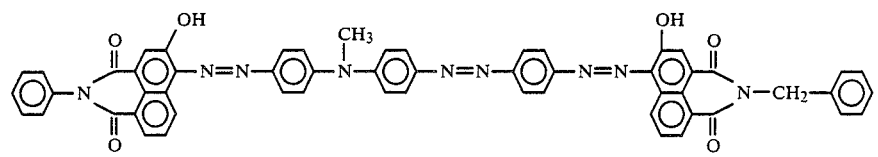
1-29
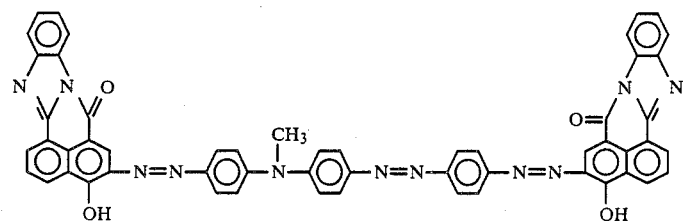
1-30
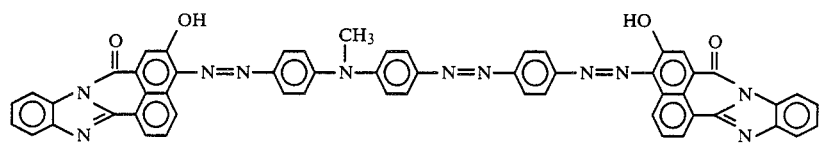
1-31
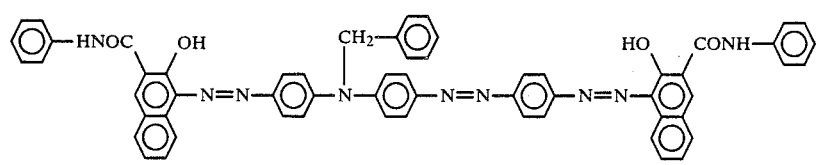
1-32
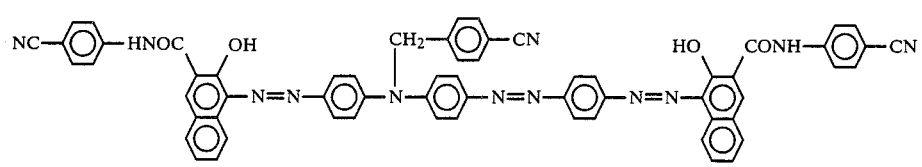
1-33
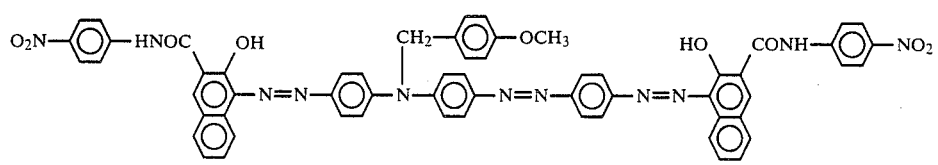
1-34

-continued
Examples of azo pigments represented by the formula (1):
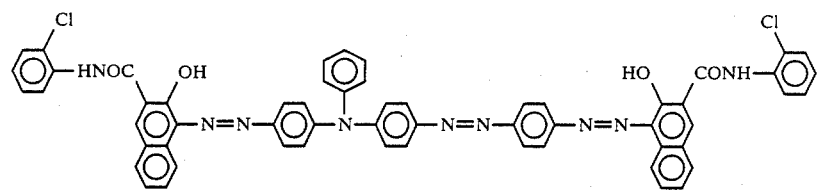 1-35
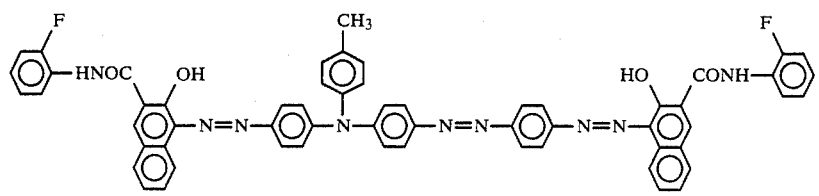 1-36
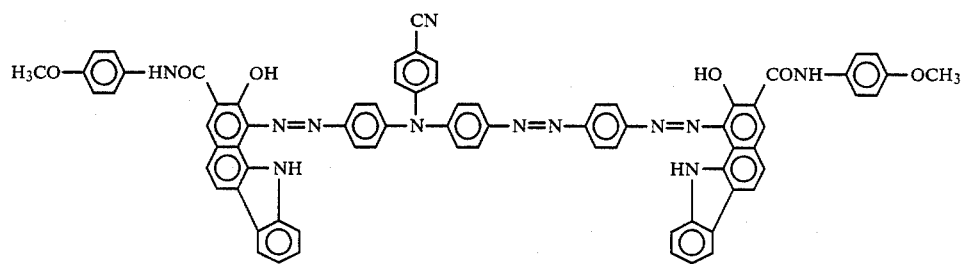 1-37
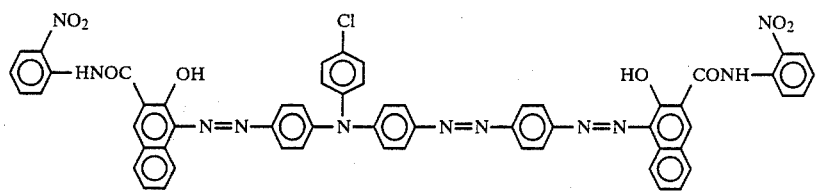 1-38
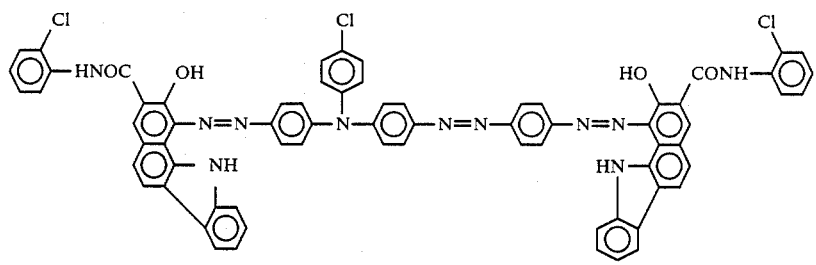 1-39
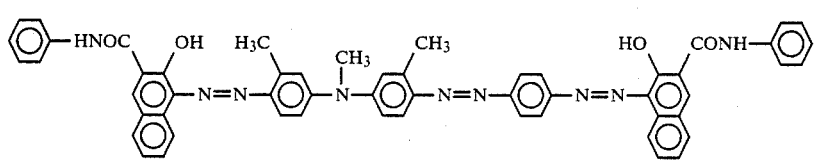 1-40

-continued
Examples of azo pigments represented by the formula (1):
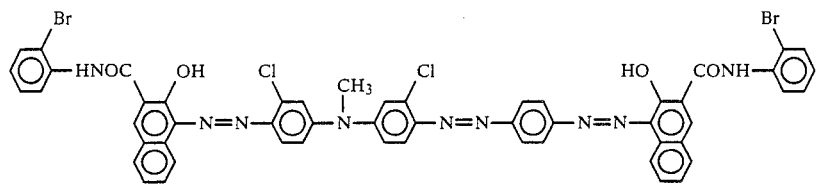 1-41
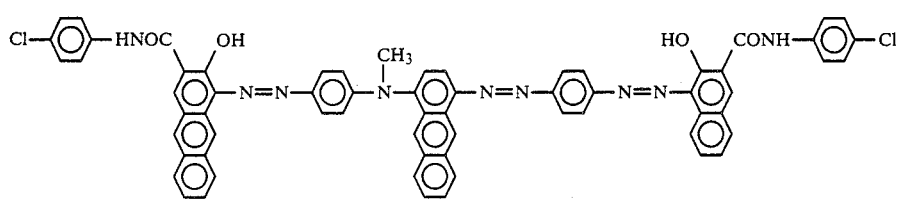 1-42
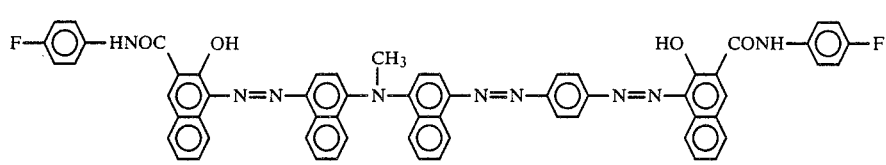 1-43
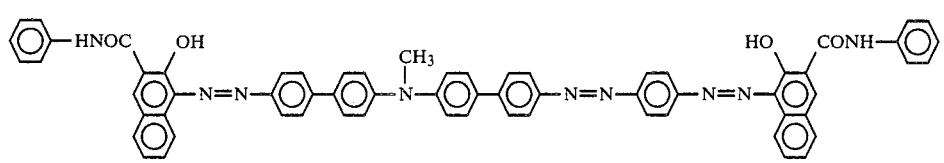 1-44
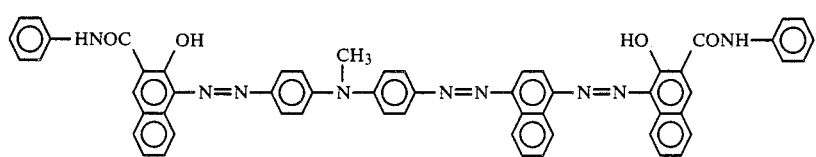 1-45
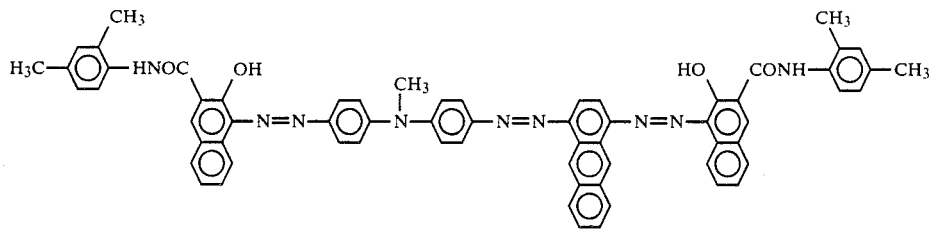 1-46
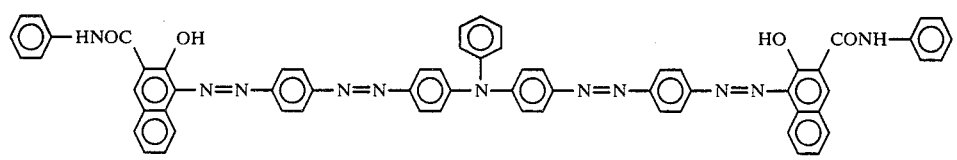 1-47

-continued
Examples of azo pigments represented by the formula (1):
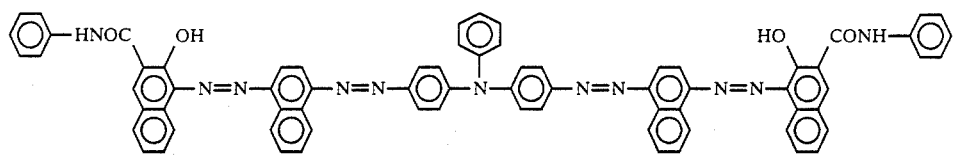
1-48
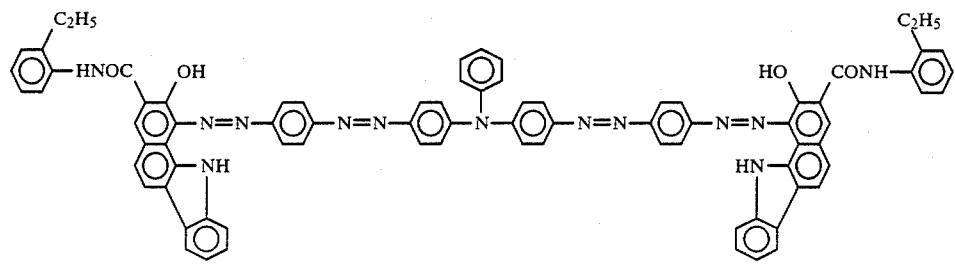
1-49
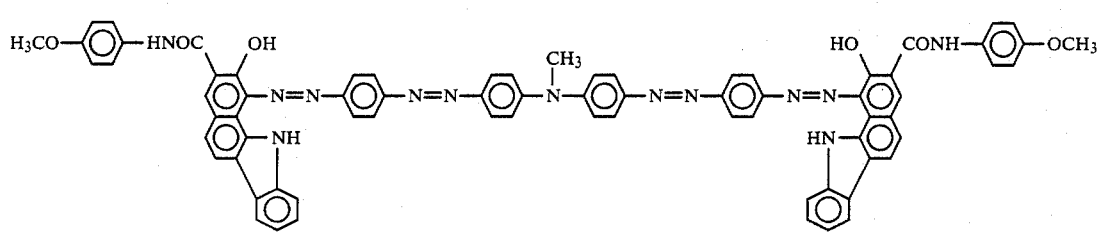
1-50
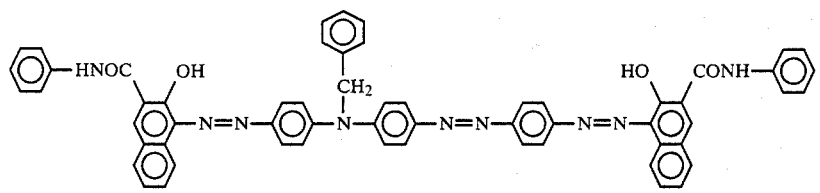
1-51
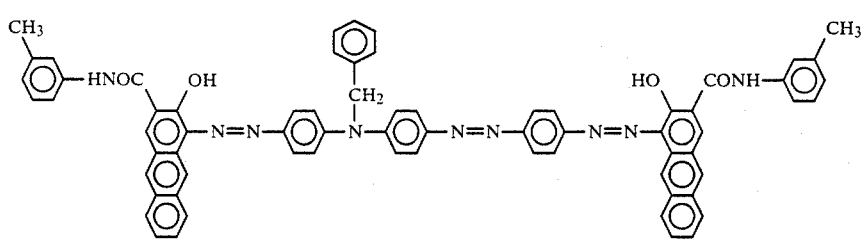
1-52
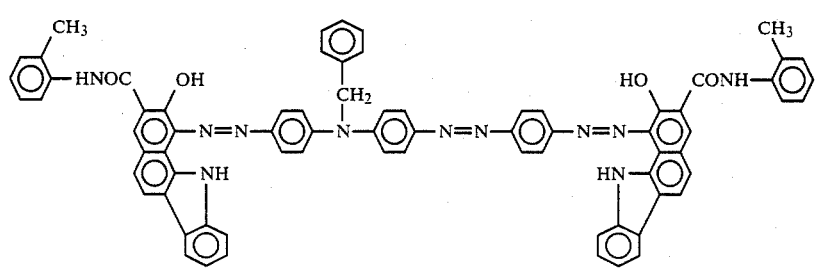
1-53

-continued
Examples of azo pigments represented by the formula (1):
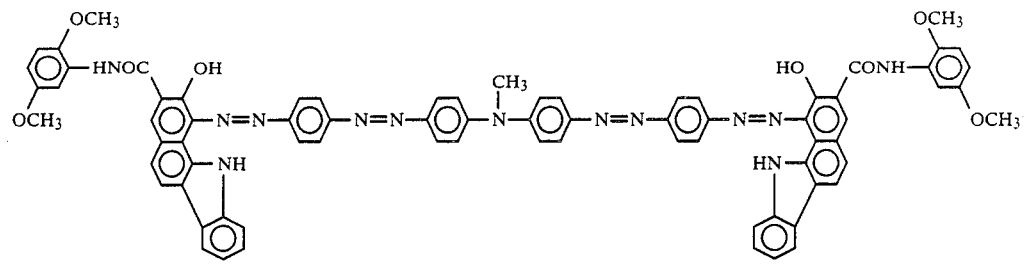
1-54
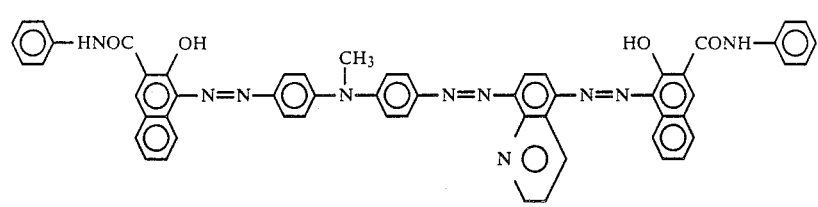
1-55
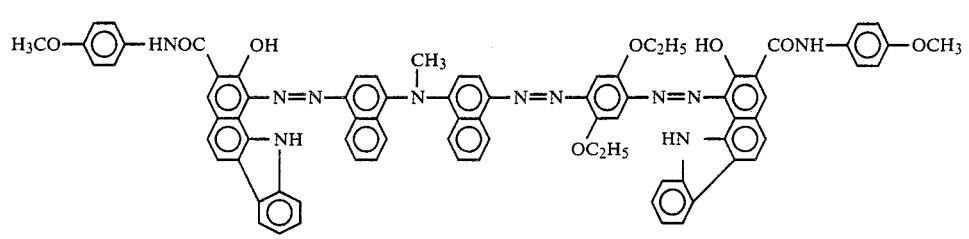
1-56
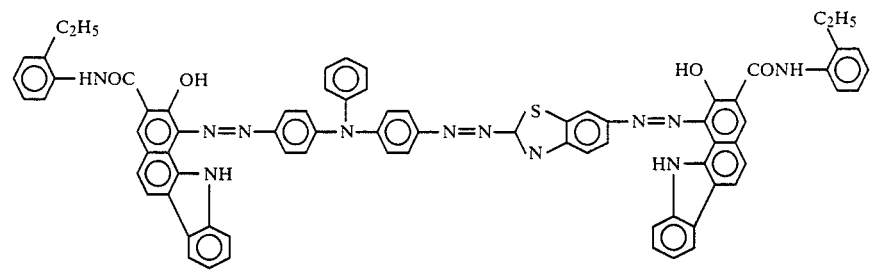
1-57
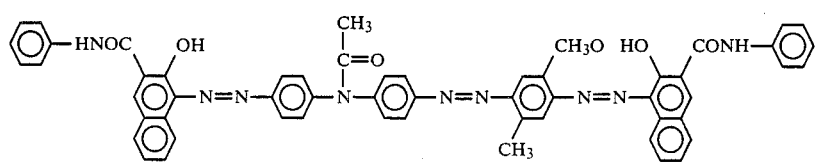
1-58

-continued
Examples of azo pigments represented by the formula (1):
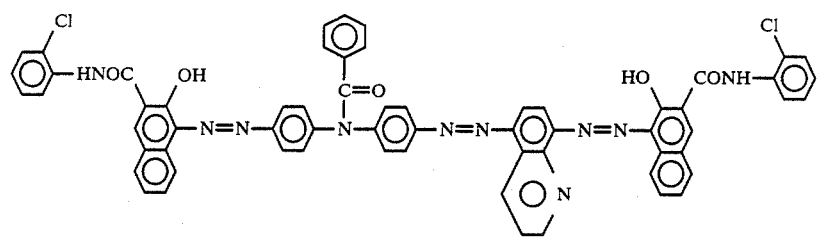
1-59
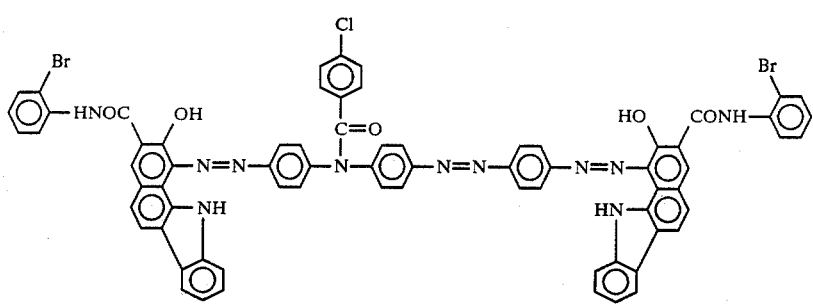
1-60
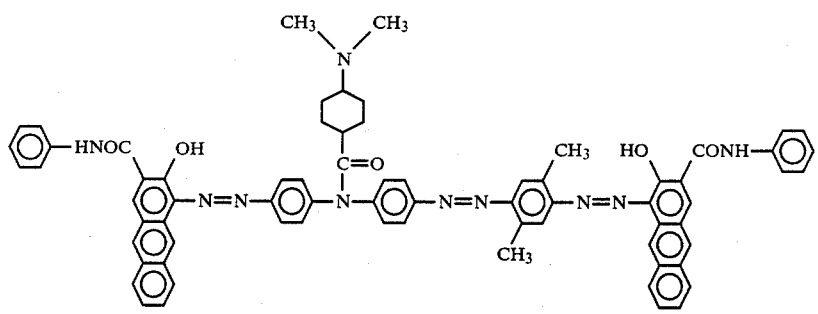
1-61
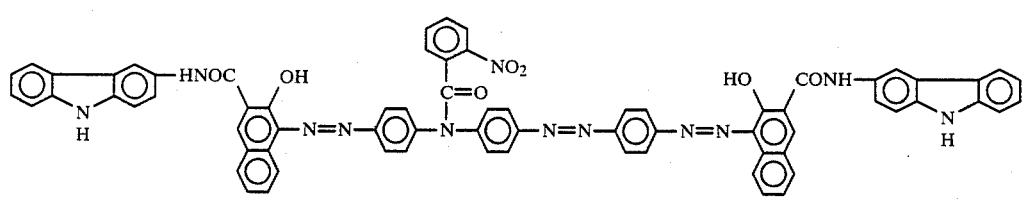
1-62
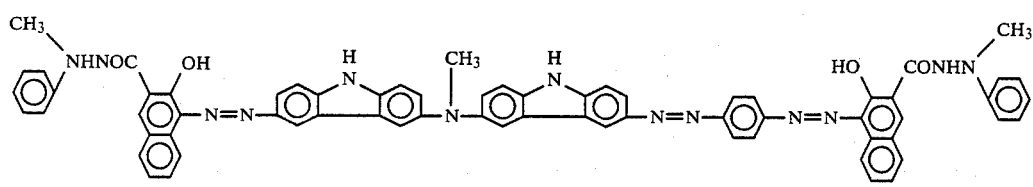
1-63

-continued
Examples of azo pigments represented by the formula (1):
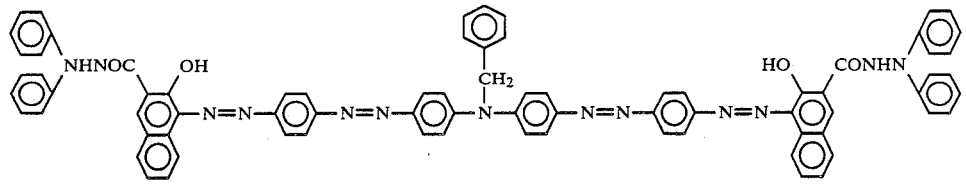
1-64
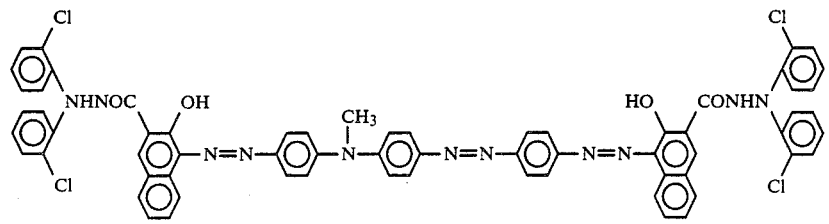
1-65
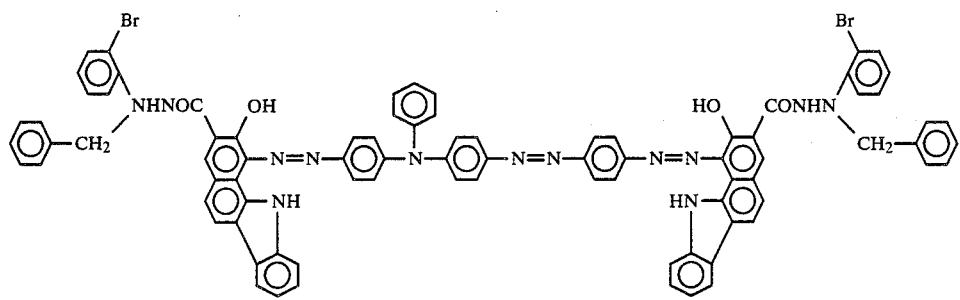
1-66
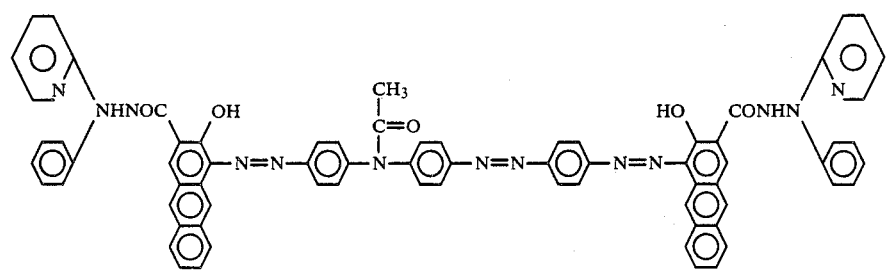
1-67
Examples of azo pigments represented by the formula (2):
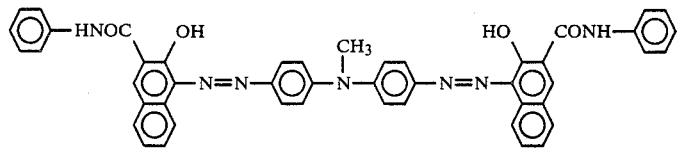
2-1
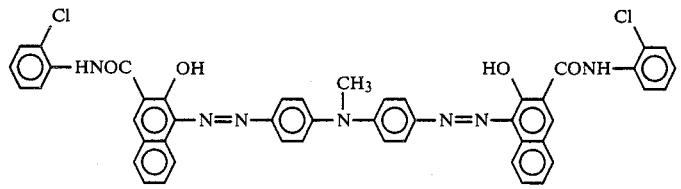
2-2

-continued
Examples of azo pigments represented by the formula (2):
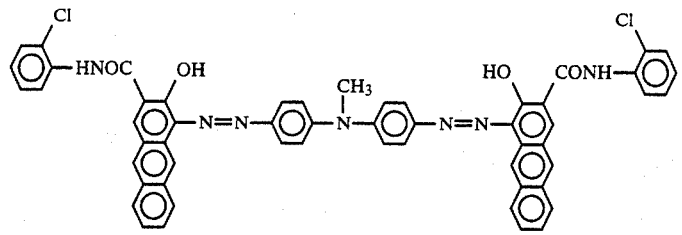
2-3
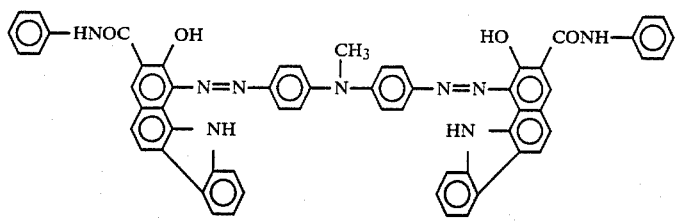
2-4
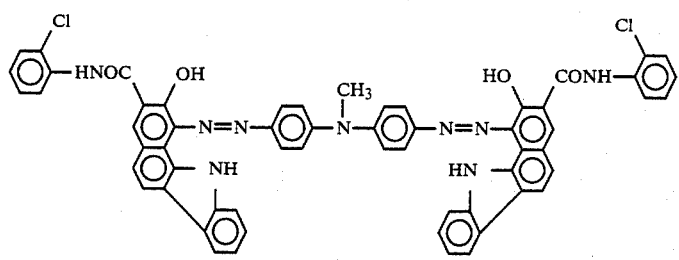
2-5
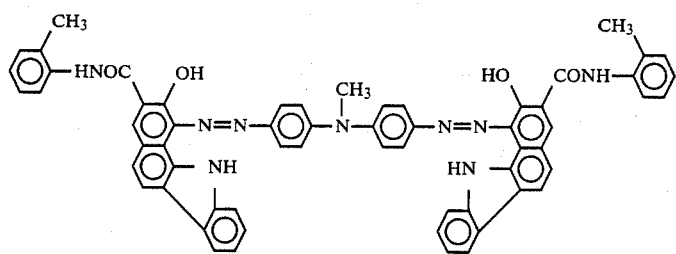
2-6
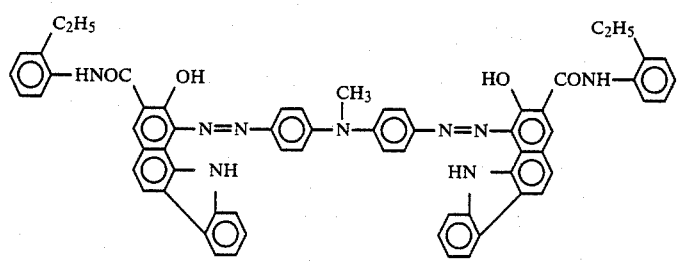
2-7

-continued
Examples of azo pigments represented by the formula (2):
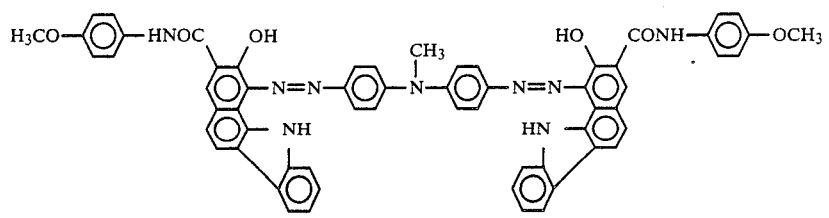 2-8
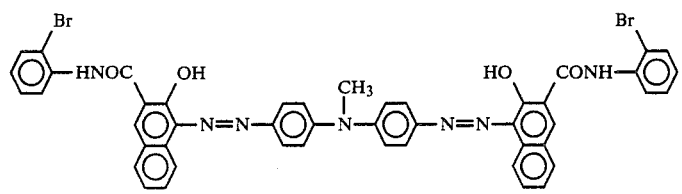 2-9
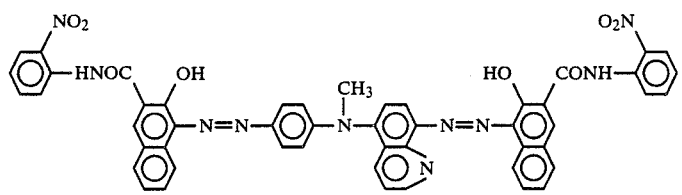 2-10
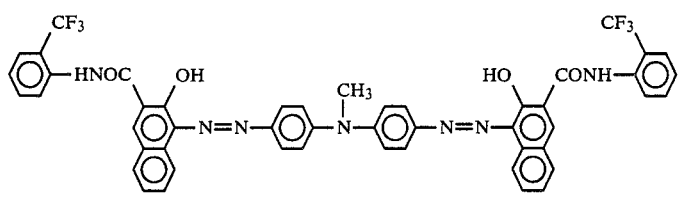 2-11
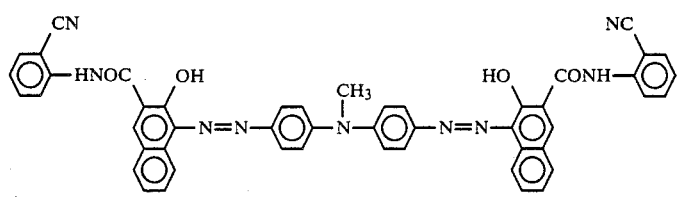 2-12
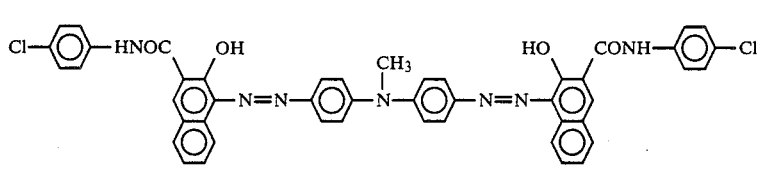 2-13
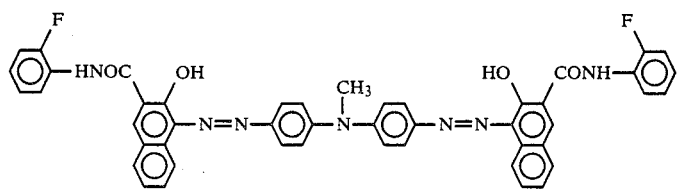 2-14

-continued
Examples of azo pigments represented by the formula (2):
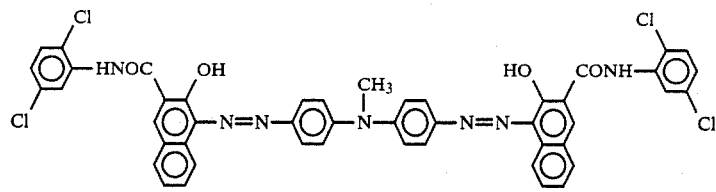
2-15
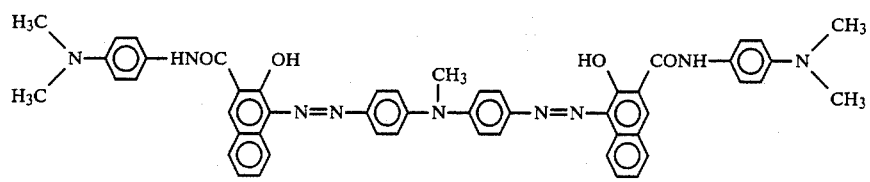
2-16
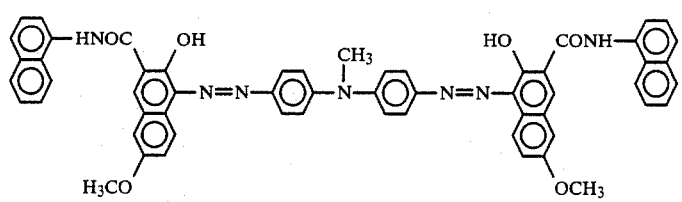
2-17
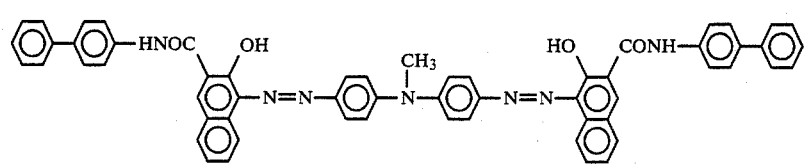
2-18
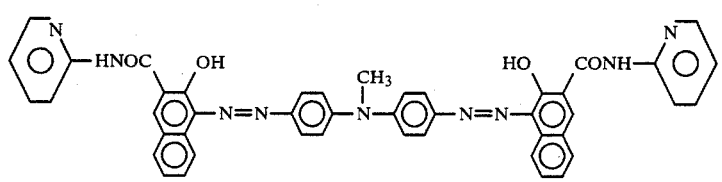
2-19
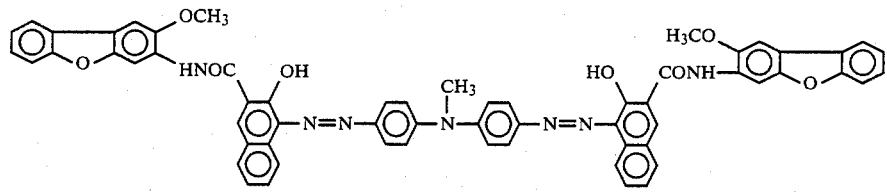
2-20
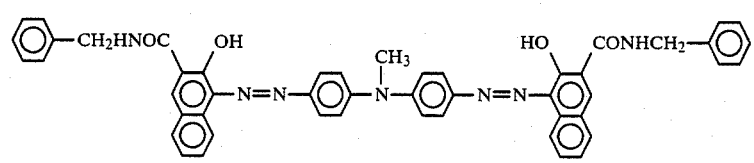
2-21

-continued
Examples of azo pigments represented by the formula (2):
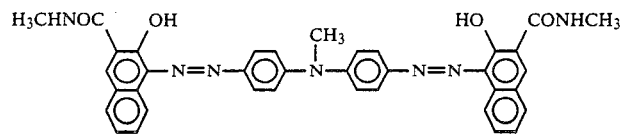
2-22
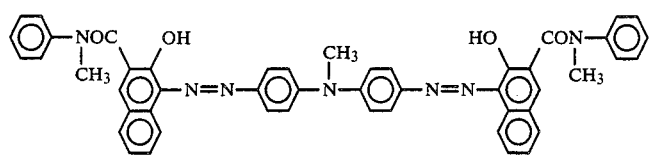
2-23
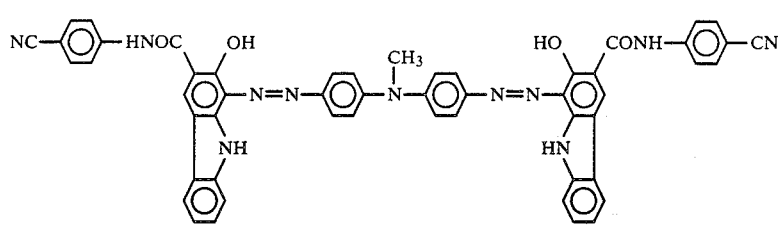
2-24
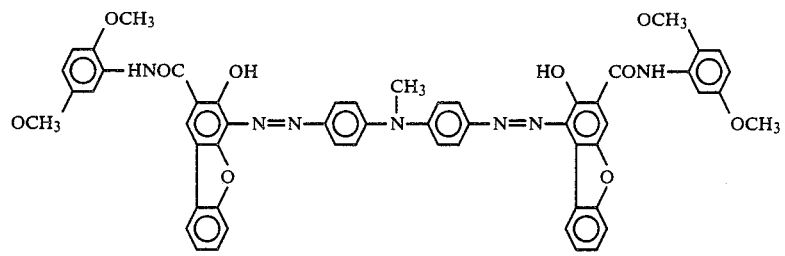
2-25
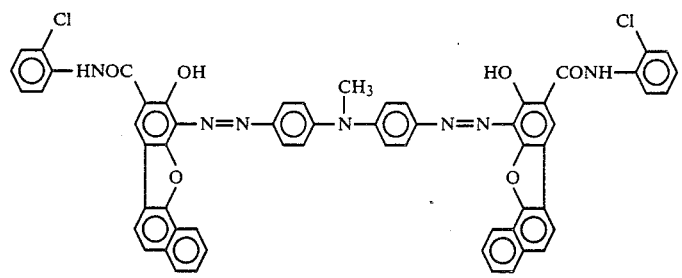
2-26
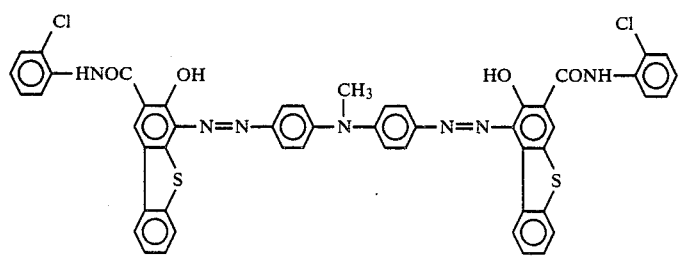
2-27

-continued
Examples of azo pigments represented by the formula (2):
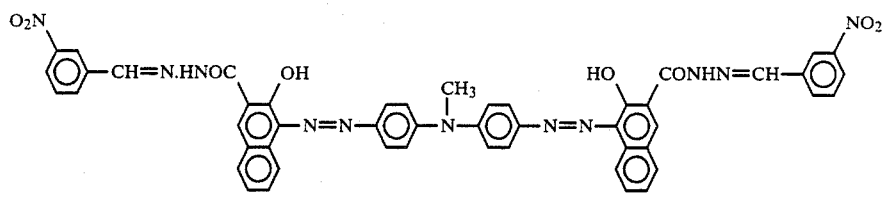 2-28
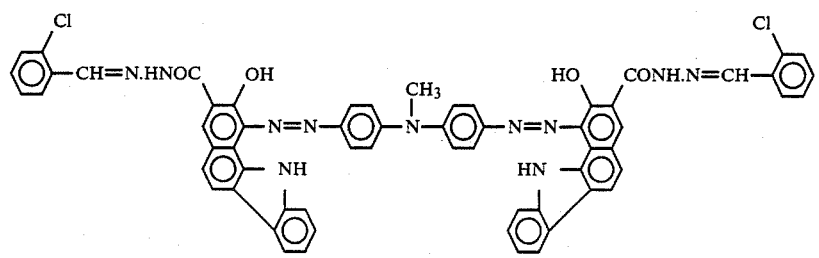 2-29
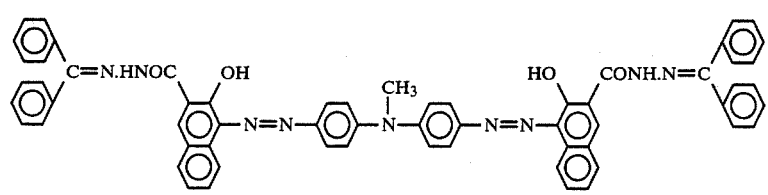 2-30
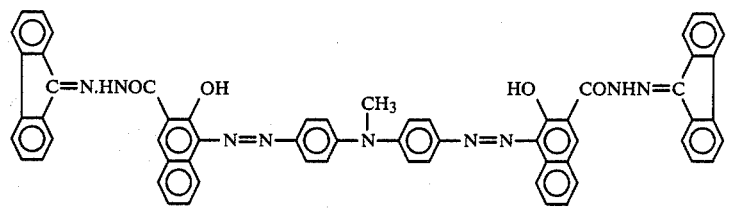 2-31
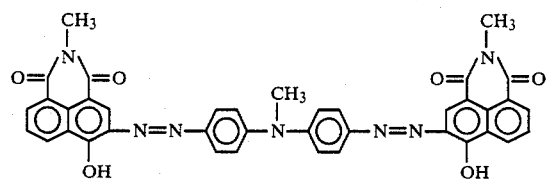 2-32
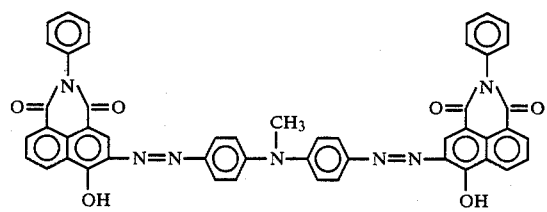 2-33

-continued
Examples of azo pigments represented by the formula (2):
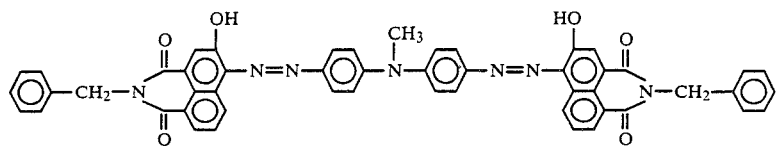
2-34
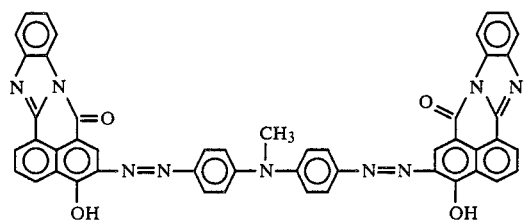
2-35
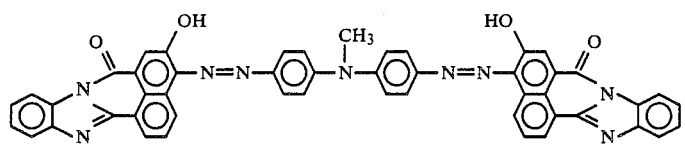
2-36
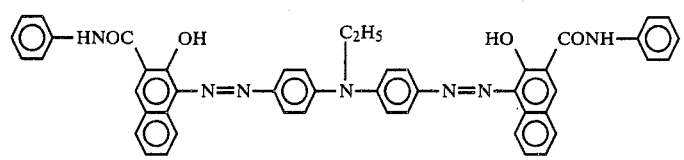
2-37
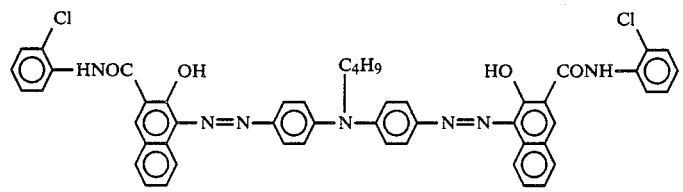
2-38
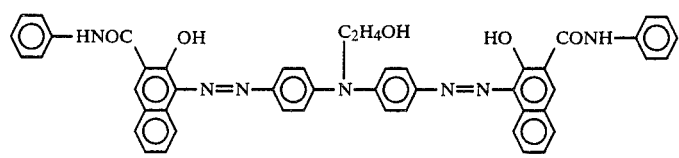
2-39
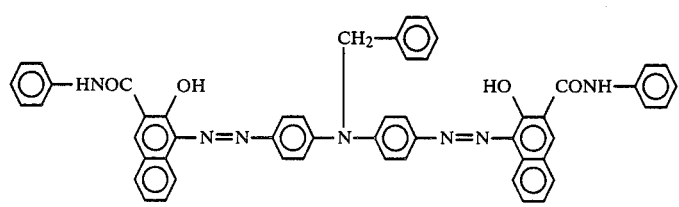
2-40

-continued
Examples of azo pigments represented by the formula (2):
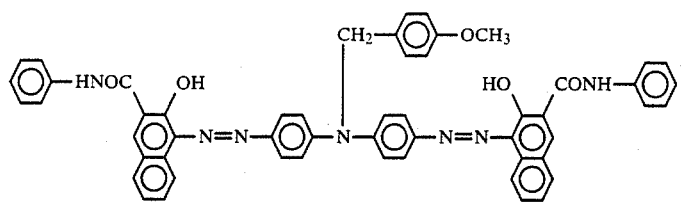
2-41
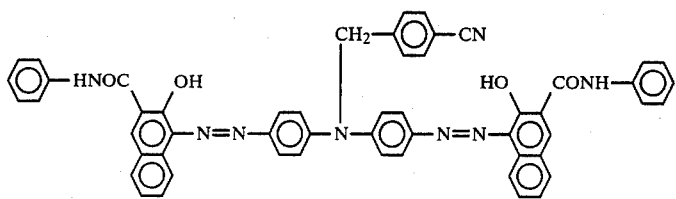
2-42
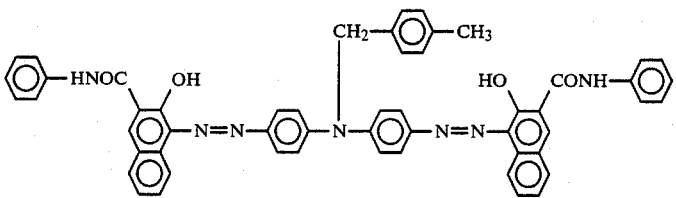
2-43
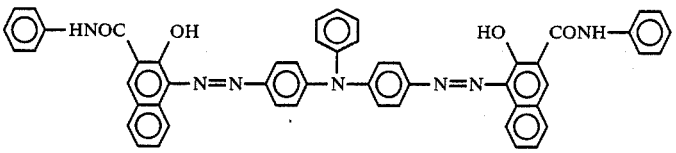
2-44
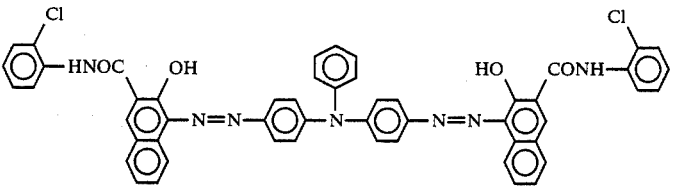
2-45
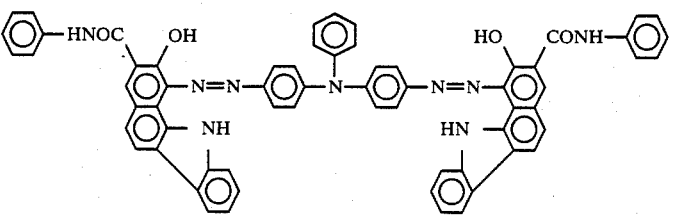
2-46

-continued
Examples of azo pigments represented by the formula (2):
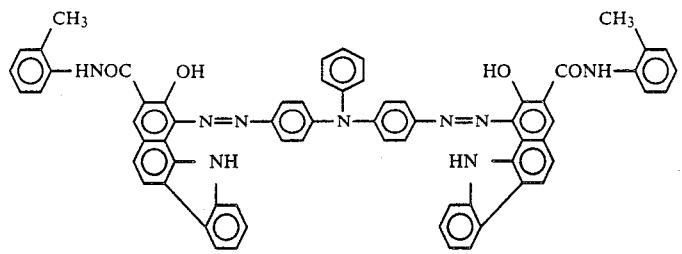
2-47
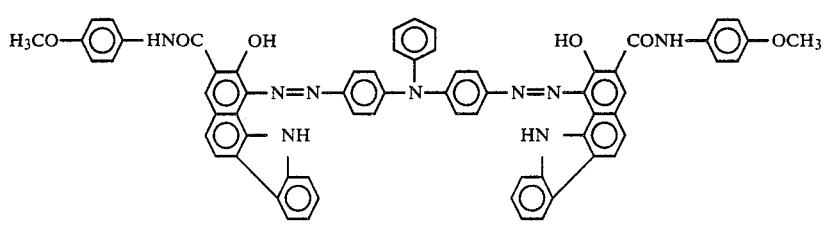
2-48
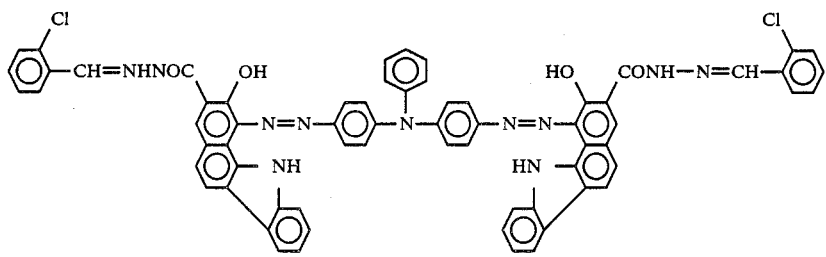
2-49
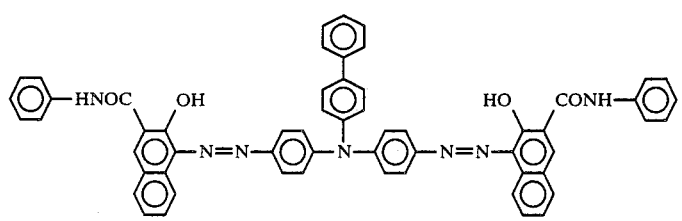
2-50
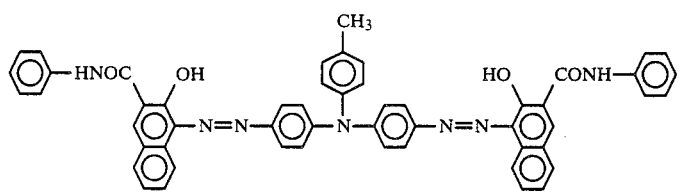
2-51
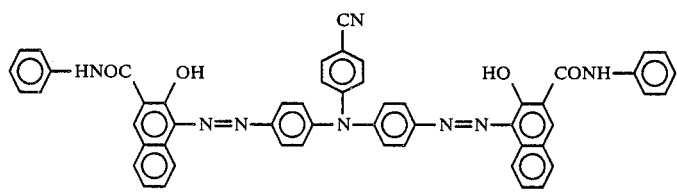
2-52

-continued
Examples of azo pigments represented by the formula (2):
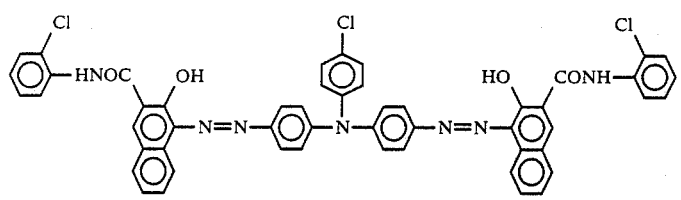
2-53
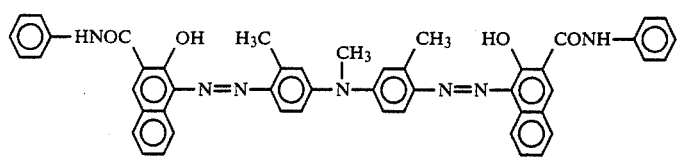
2-54
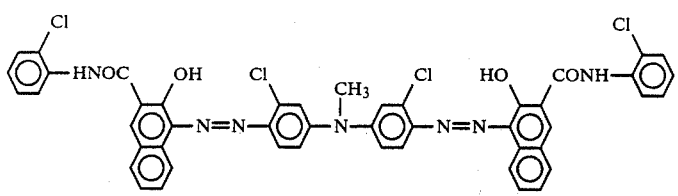
2-55
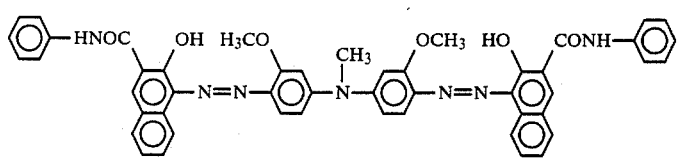
2-56
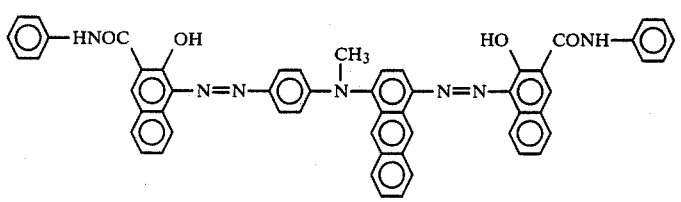
2-57
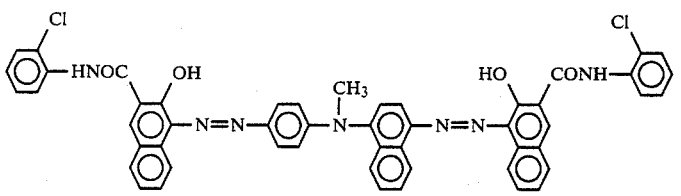
2-58
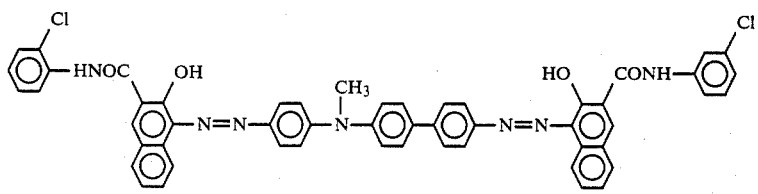
2-59

-continued
Examples of azo pigments represented by the formula (2):
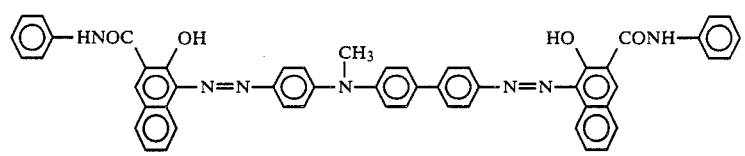
2-60
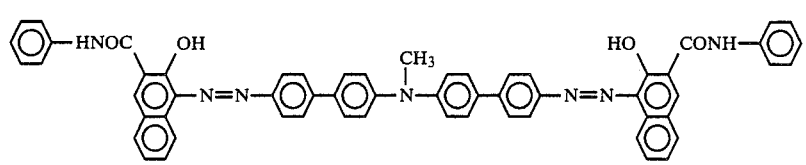
2-61
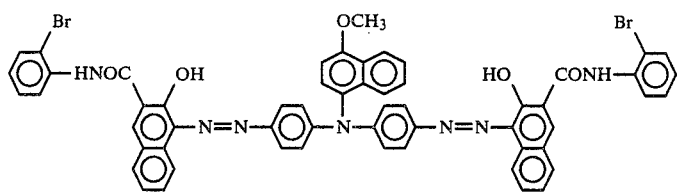
2-62
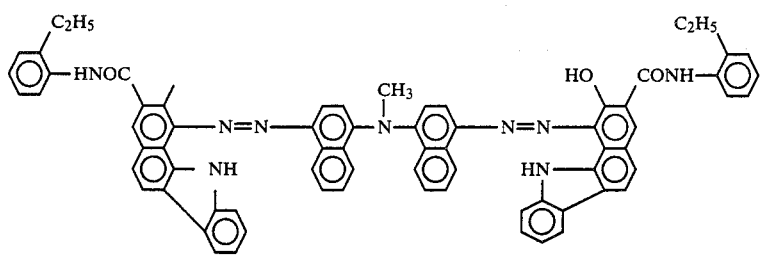
2-63
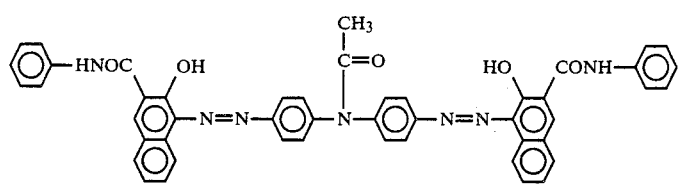
2-64
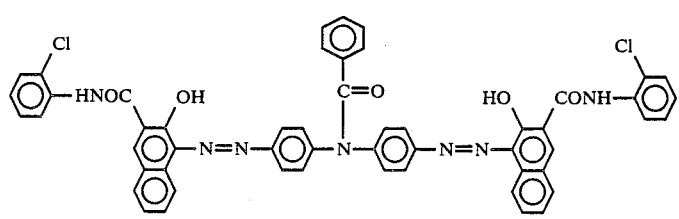
2-65

-continued
Examples of azo pigments represented by the formula (2):
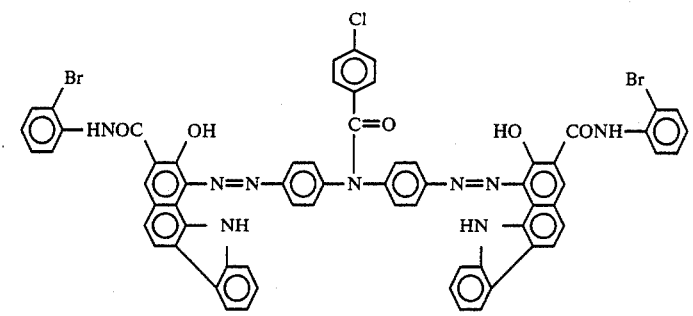
2-66
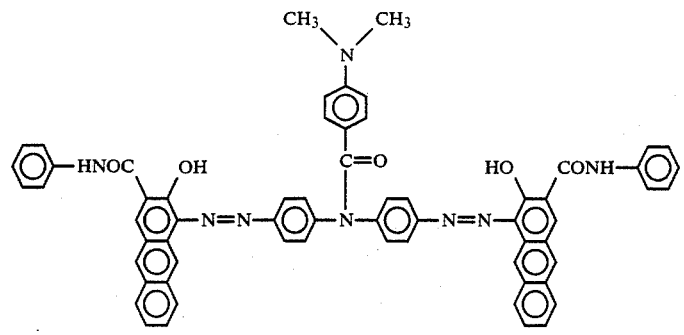
2-67
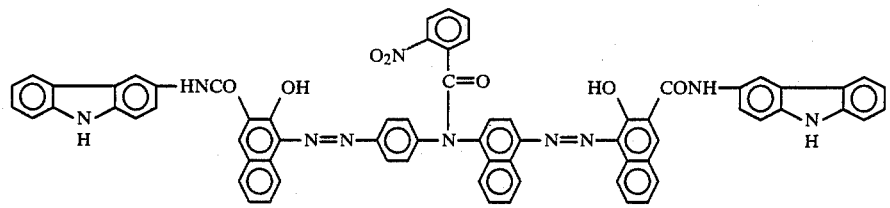
2-68
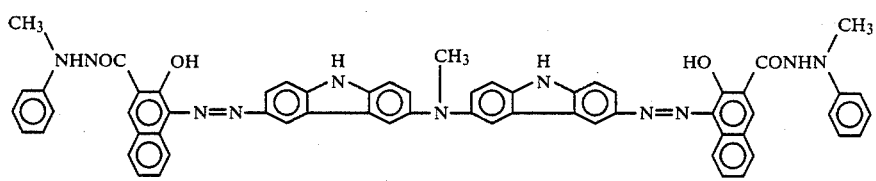
2-69
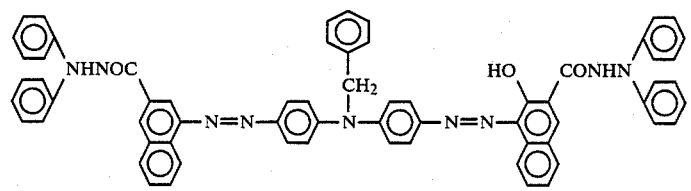
2-70

-continued
Examples of azo pigments represented by the formula (2):
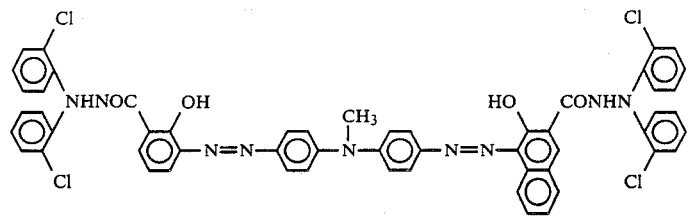
2-71
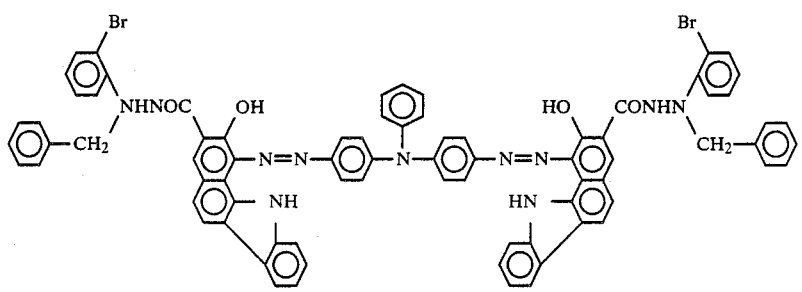
2-72
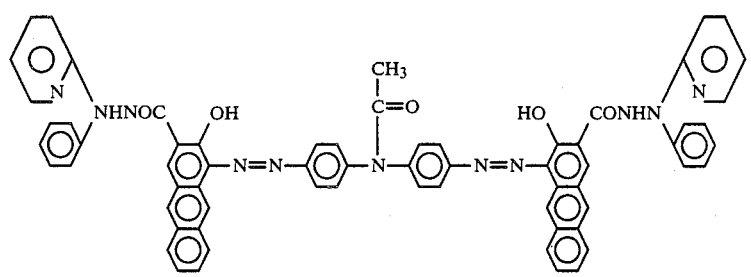
2-73
Examples of azo pigments represented by the formula (3):
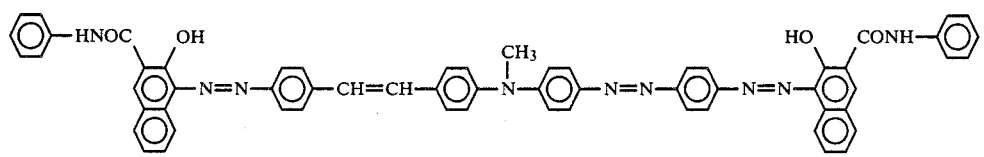
3-1
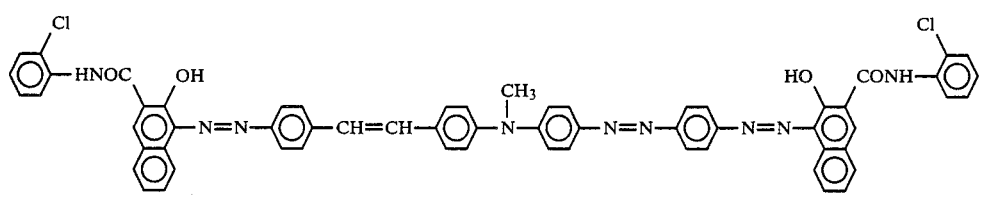
3-2
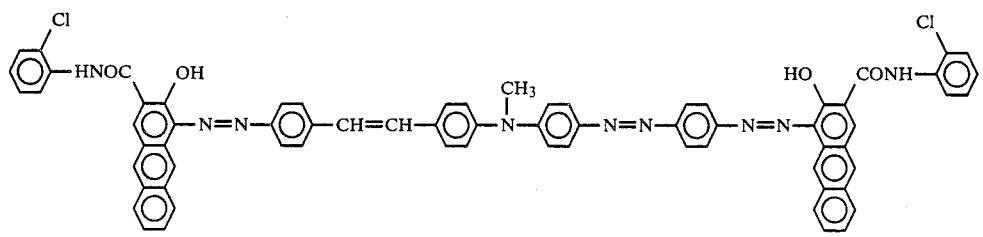
3-3

-continued
Examples of azo pigments represented by the formula (3):
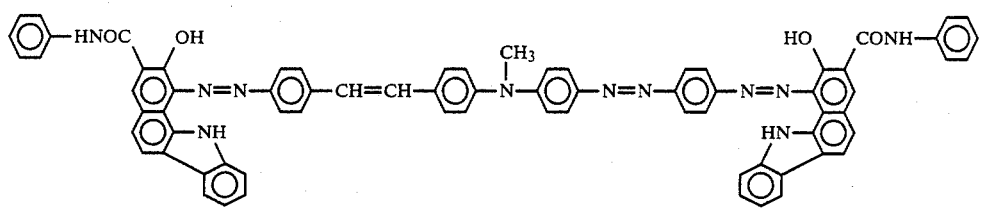
3-4
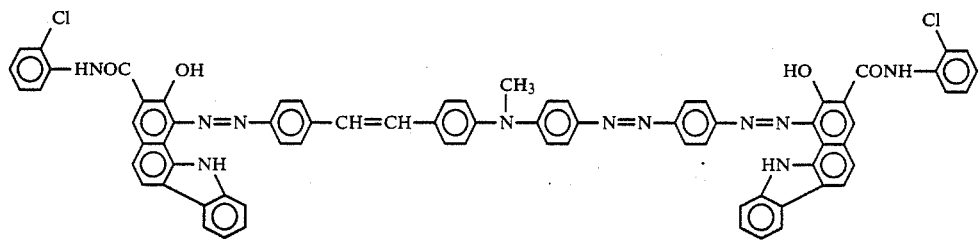
3-5
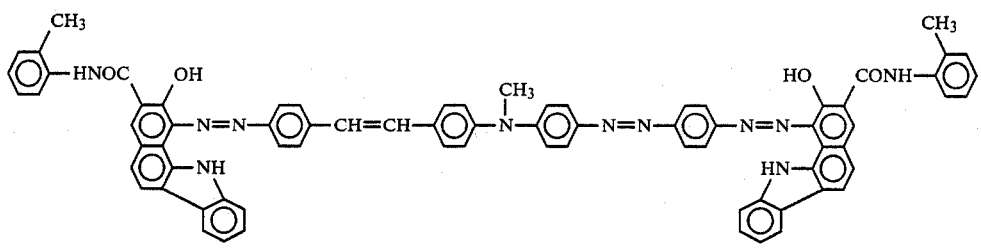
3-6
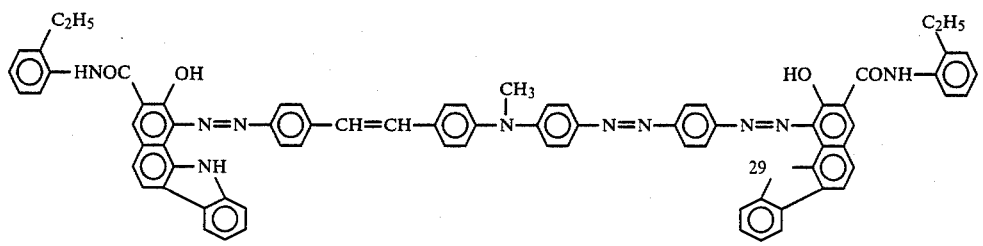
3-7
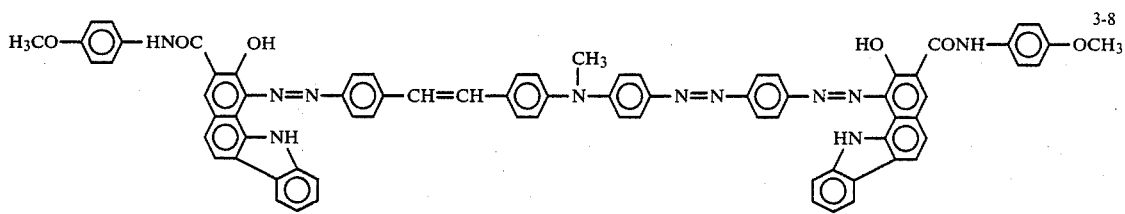
3-8
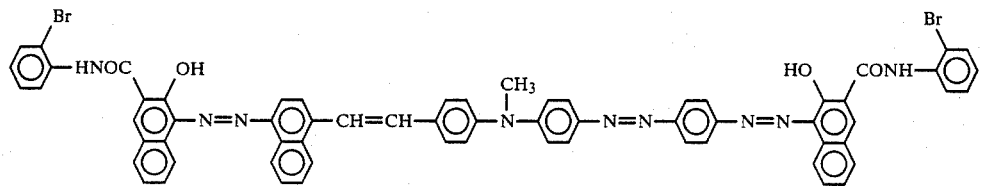
3-9

-continued
Examples of azo pigments represented by the formula (3):
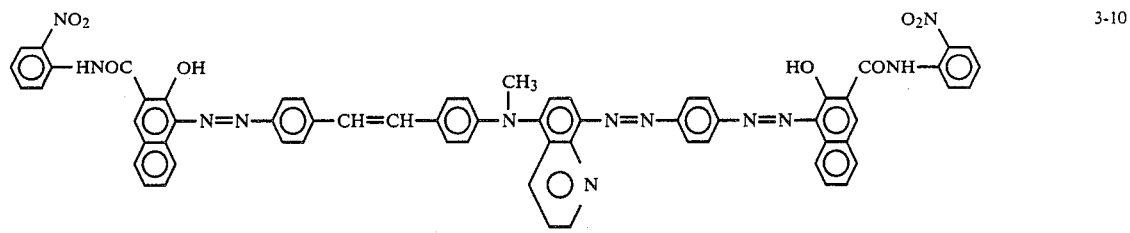
3-10
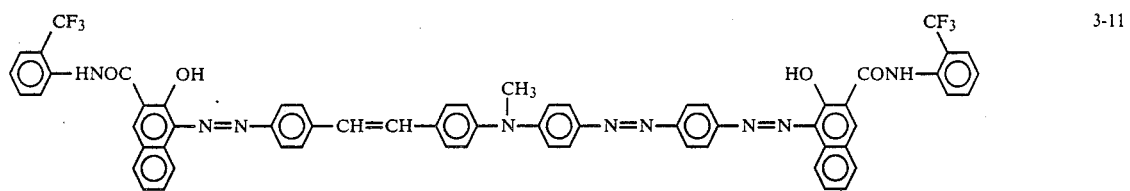
3-11
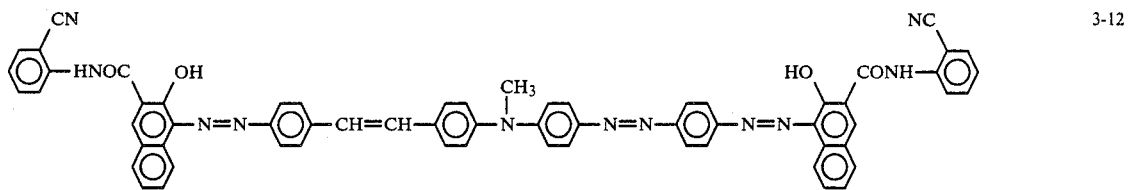
3-12
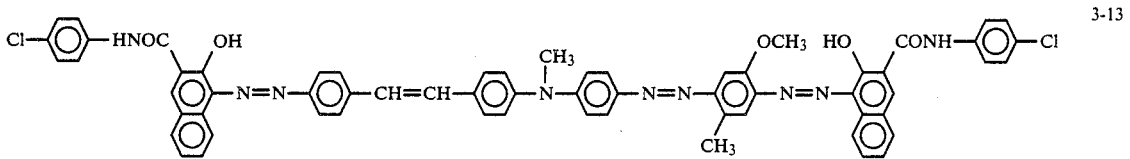
3-13
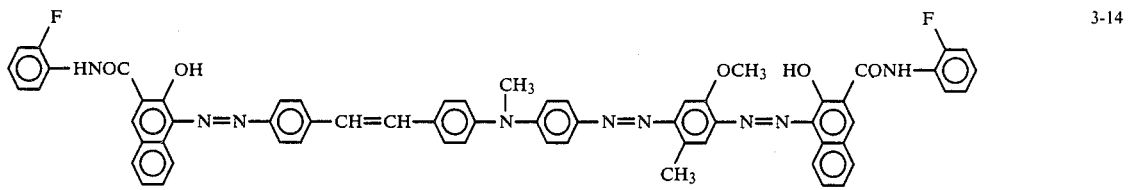
3-14
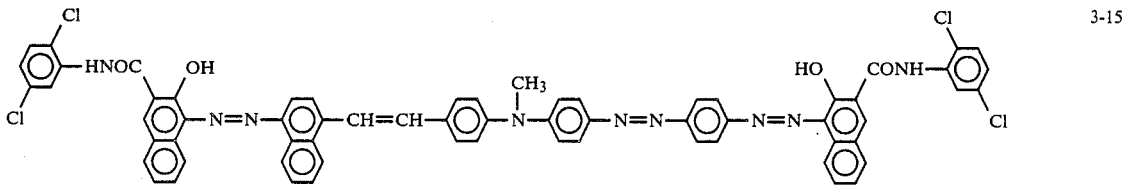
3-15

-continued
Examples of azo pigments represented by the formula (3):
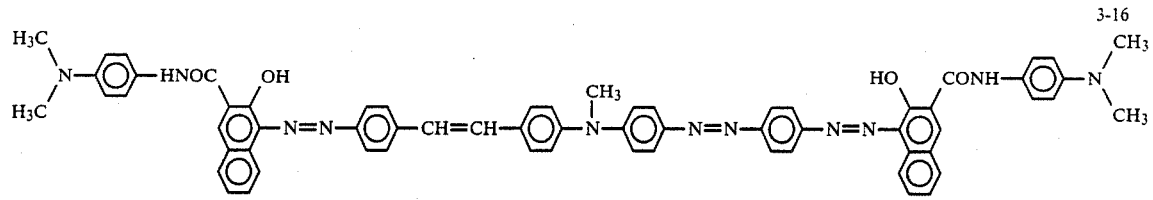
3-16
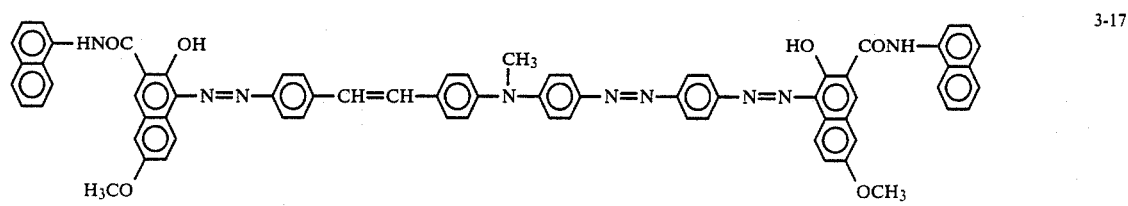
3-17
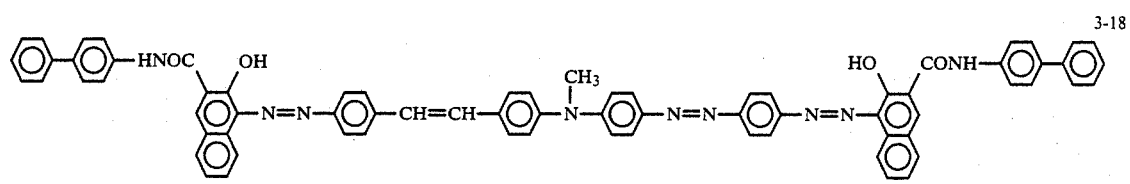
3-18
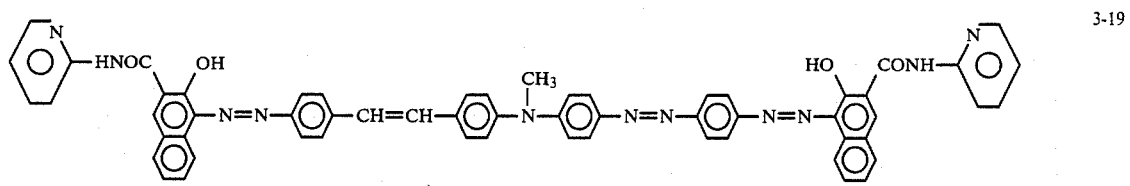
3-19
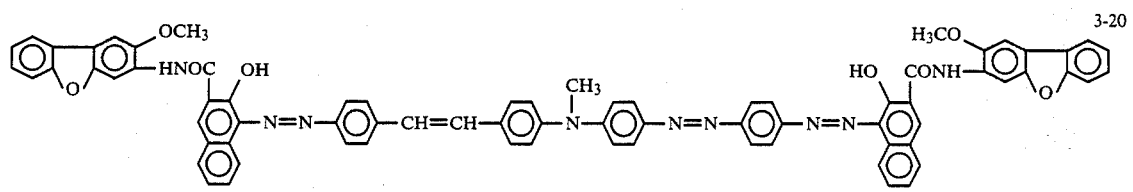
3-20
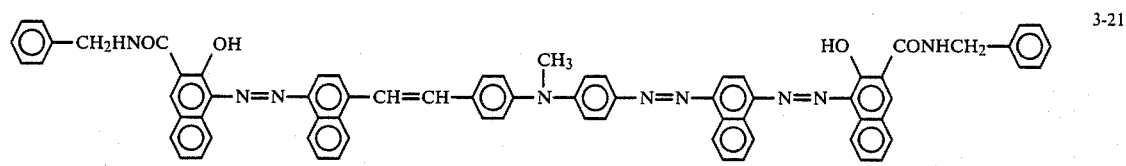
3-21
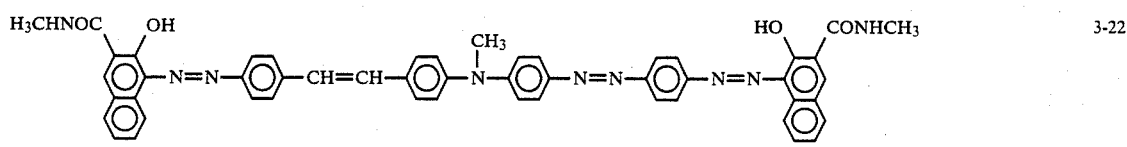
3-22

-continued
Examples of azo pigments represented by the formula (3):
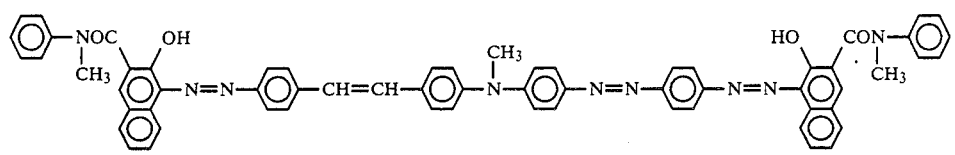
3-23
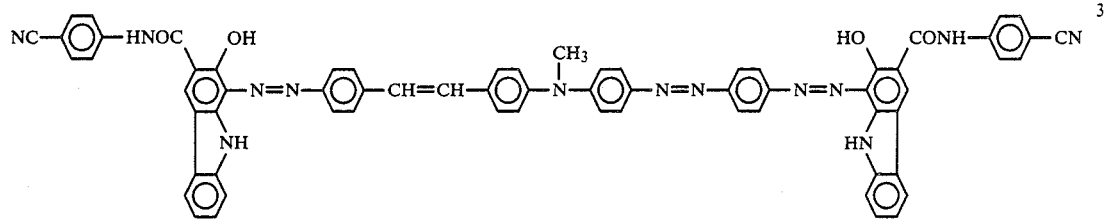
3-24
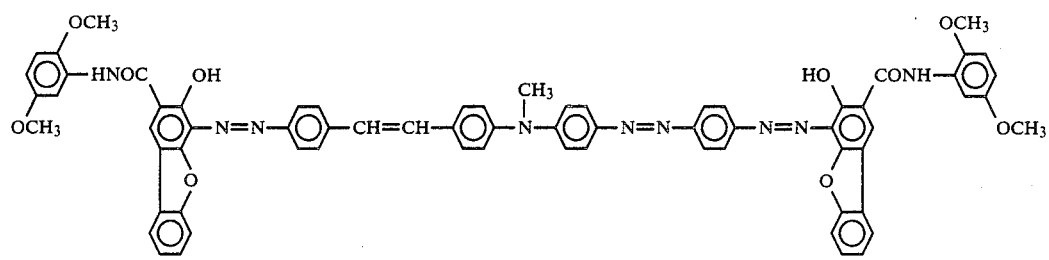
3-25
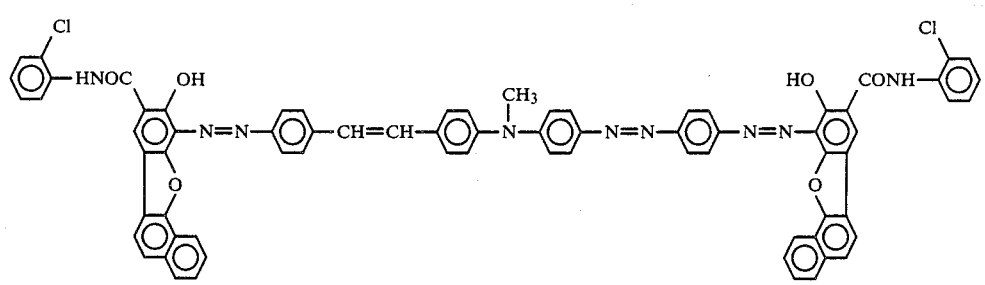
3-26
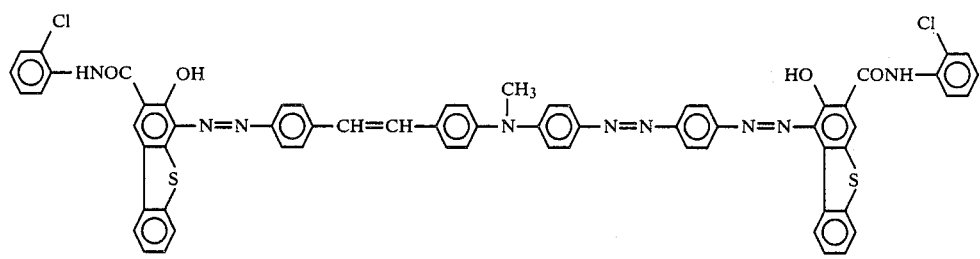
3-27
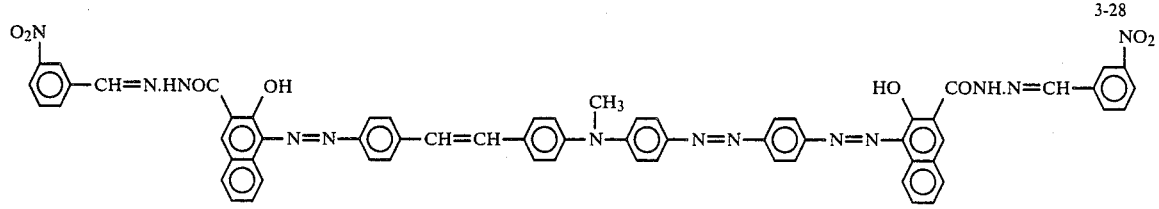
3-28

-continued
Examples of azo pigments represented by the formula (3):
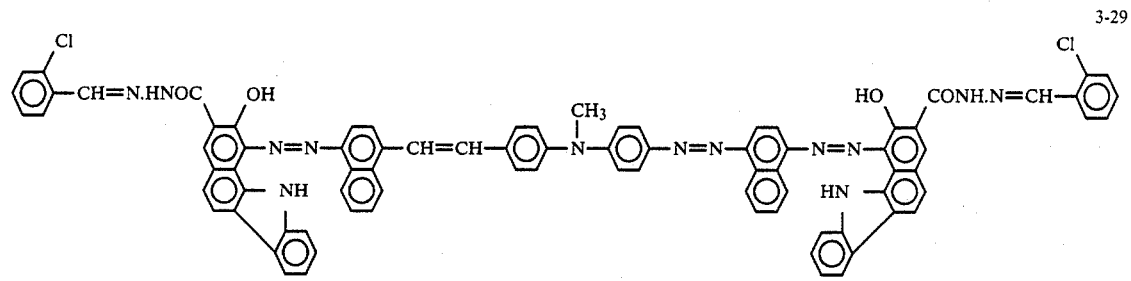
3-29
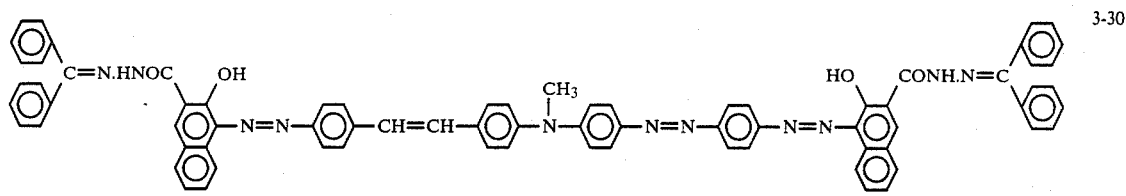
3-30
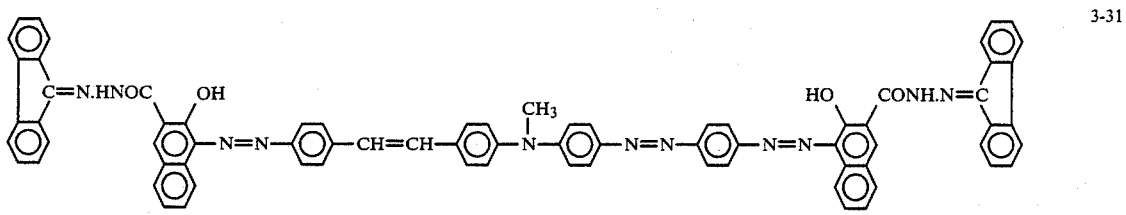
3-31
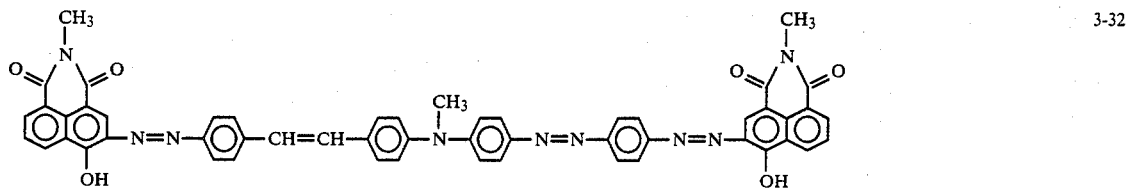
3-32
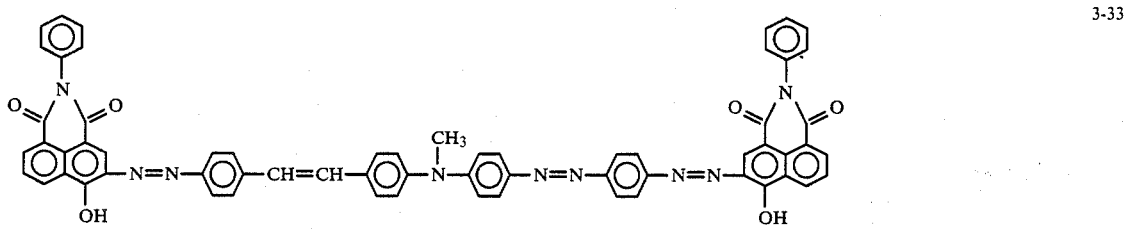
3-33
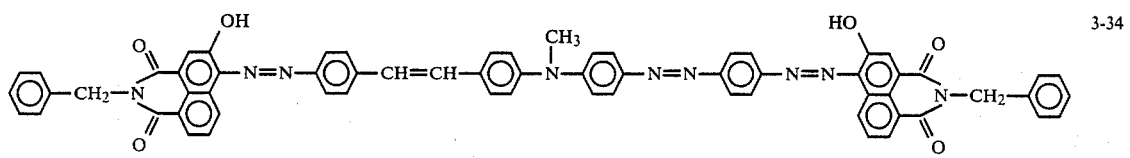
3-34

-continued
Examples of azo pigments represented by the formula (3):
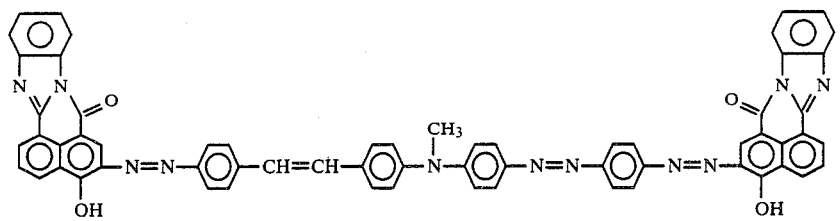
3-35
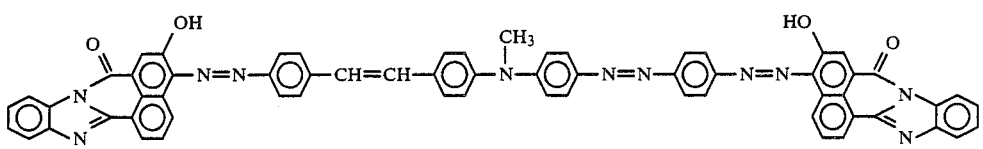
3-36
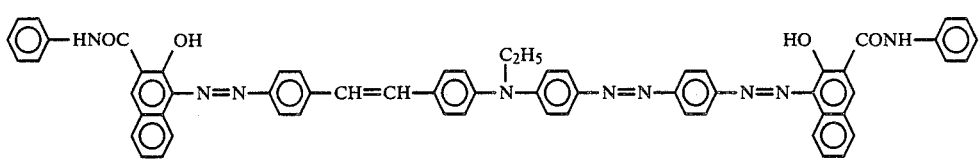
3-37
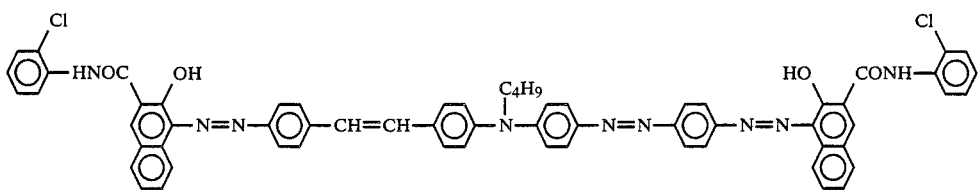
3-38
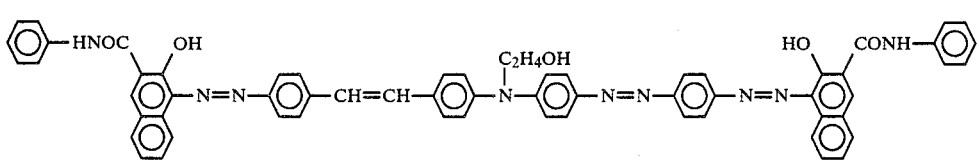
3-39
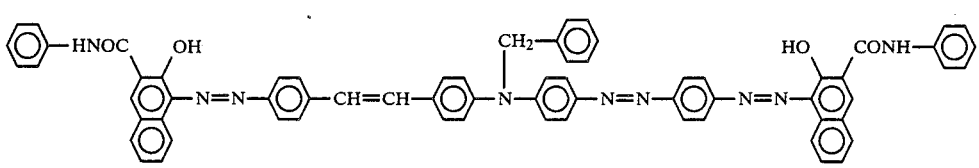
3-40
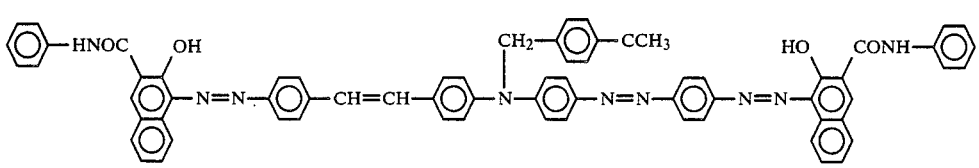
3-41

-continued
Examples of azo pigments represented by the formula (3):
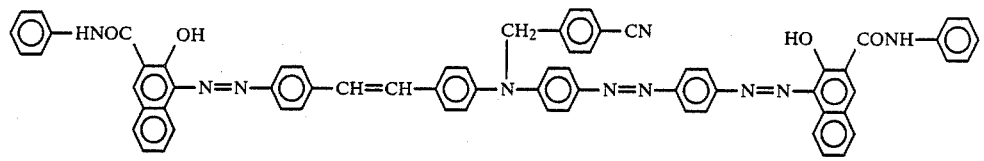
3-42
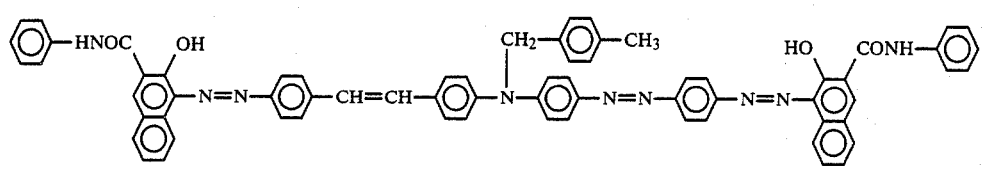
3-43
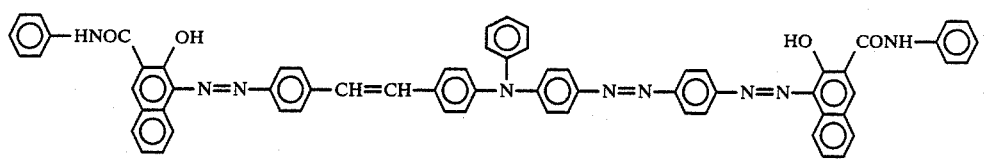
3-44
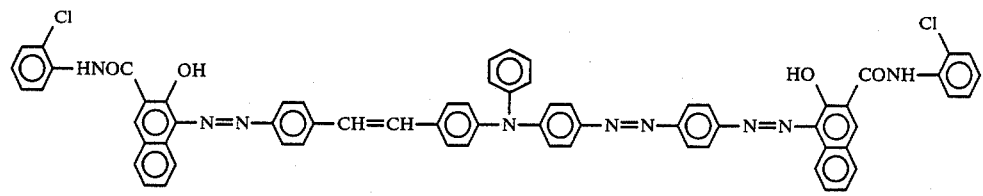
3-45
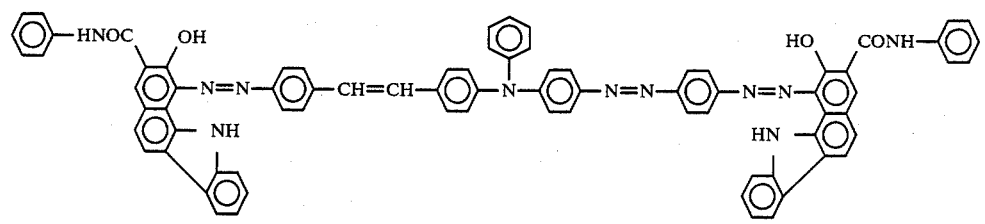
3-46
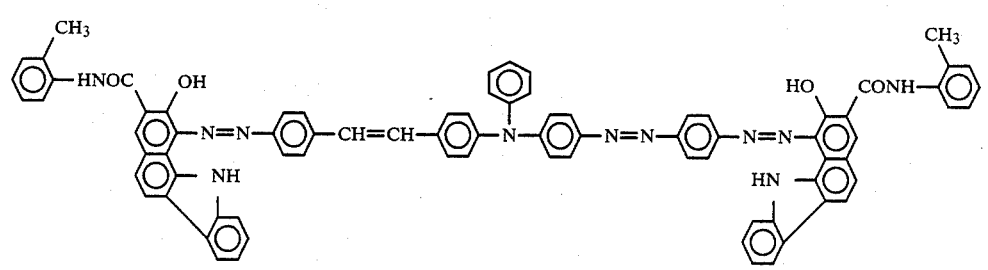
3-47

-continued
Examples of azo pigments represented by the formula (3):
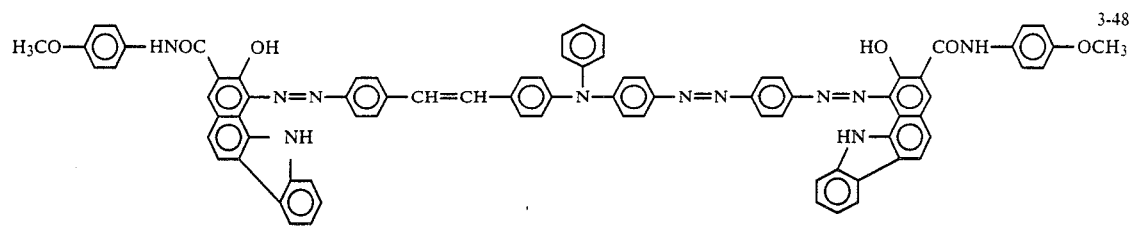
3-48
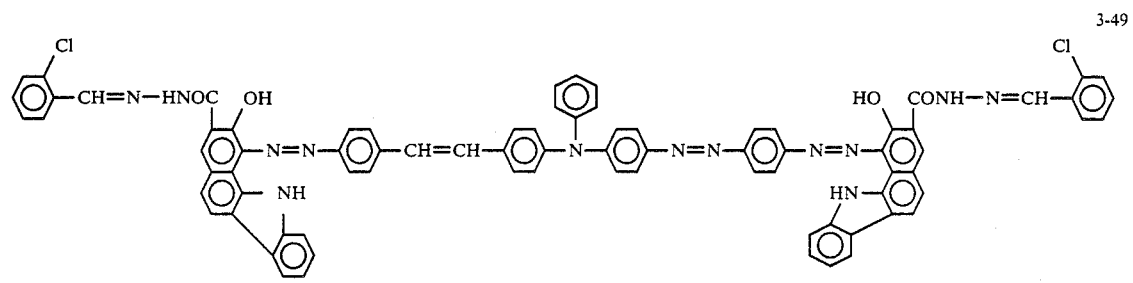
3-49
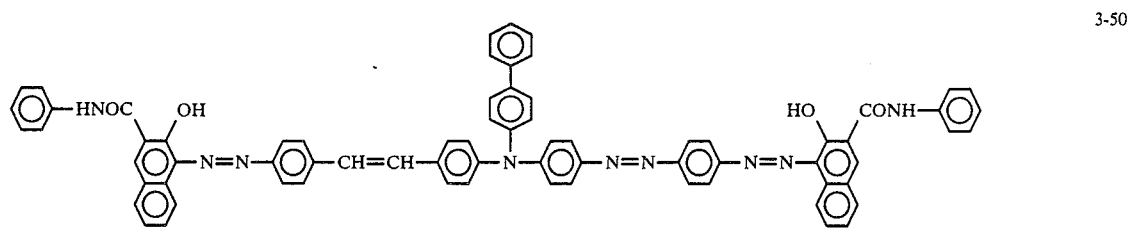
3-50
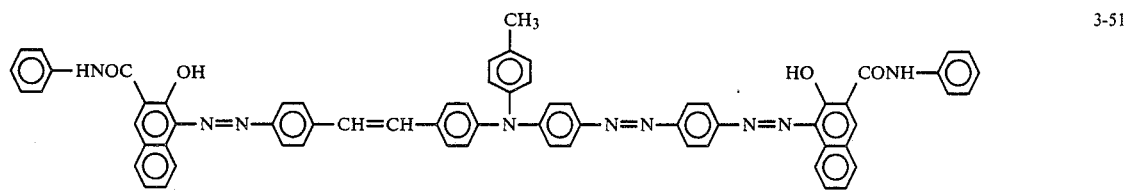
3-51
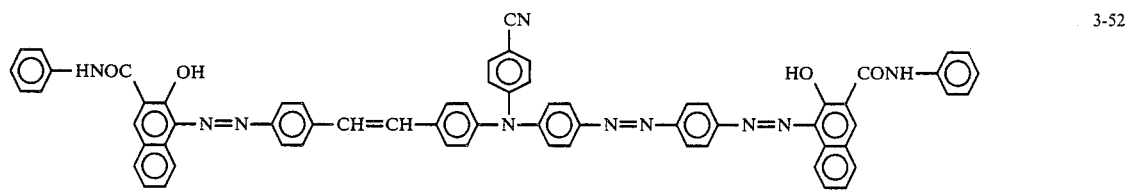
3-52
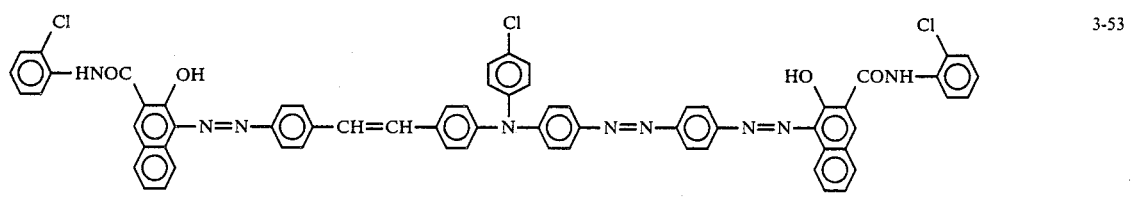
3-53

-continued
Examples of azo pigments represented by the formula (3):
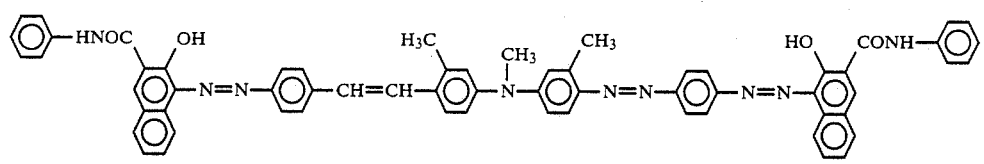
3-54
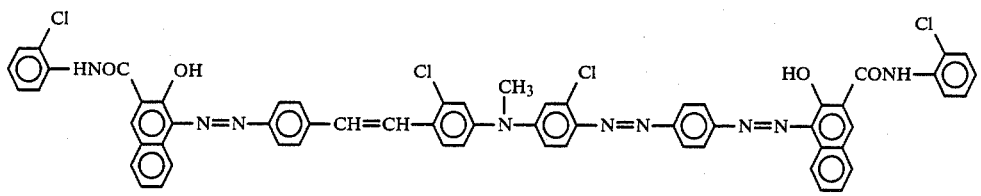
3-55
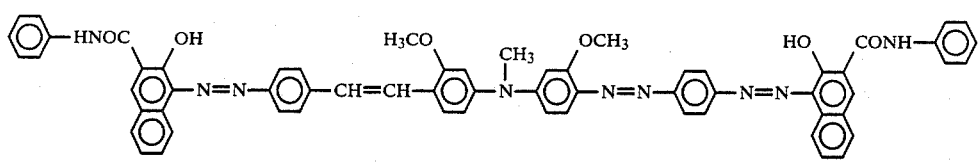
3-56
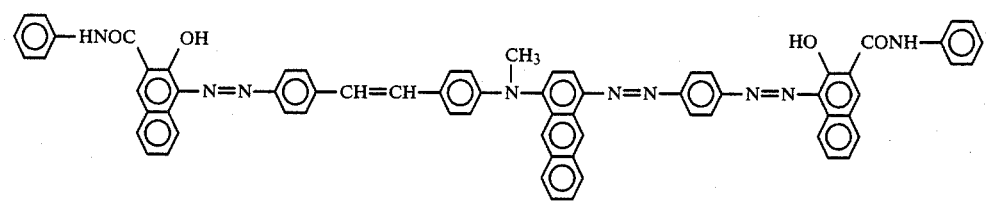
3-57
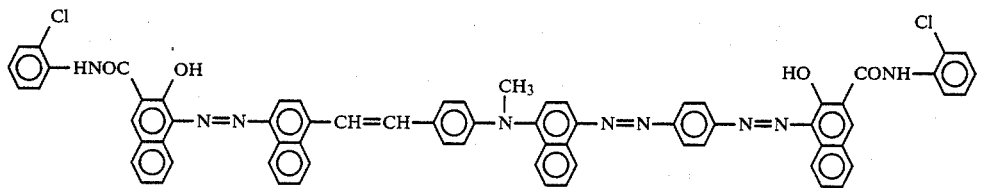
3-58
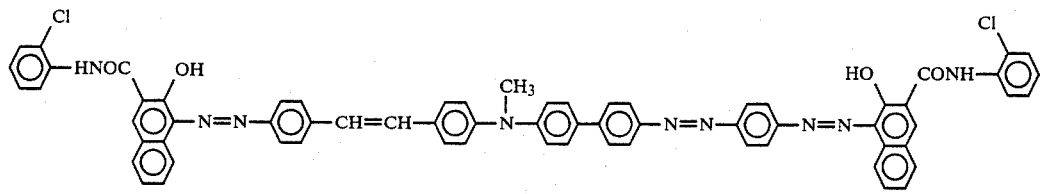
3-59
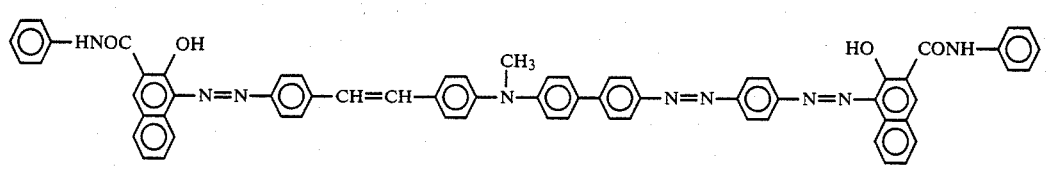
3-60

-continued
Examples of azo pigments represented by the formula (3):
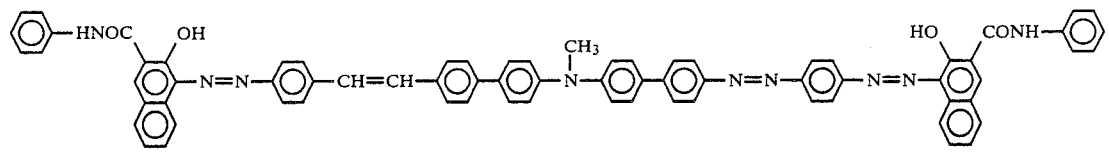
3-61
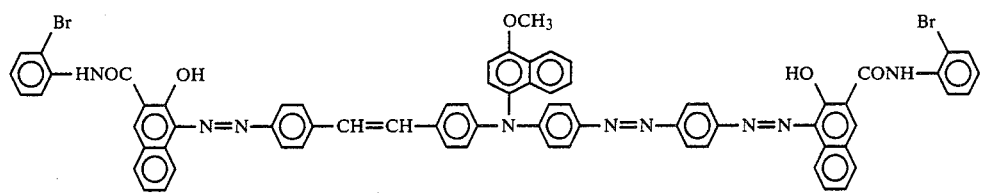
3-62
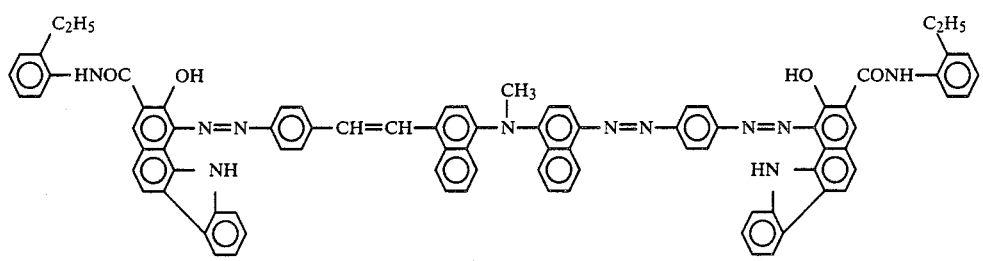
3-63
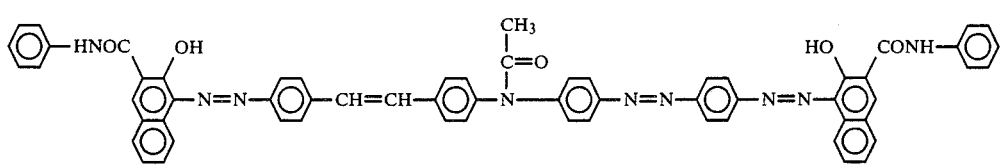
3-64
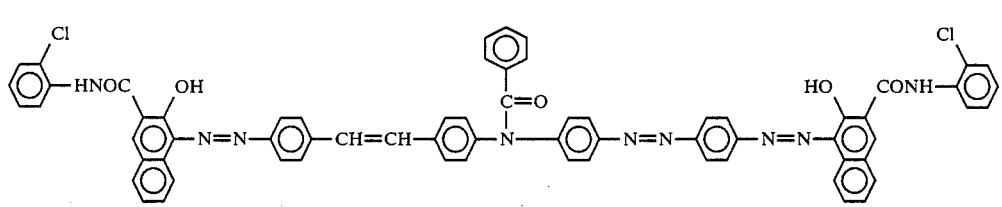
3-65
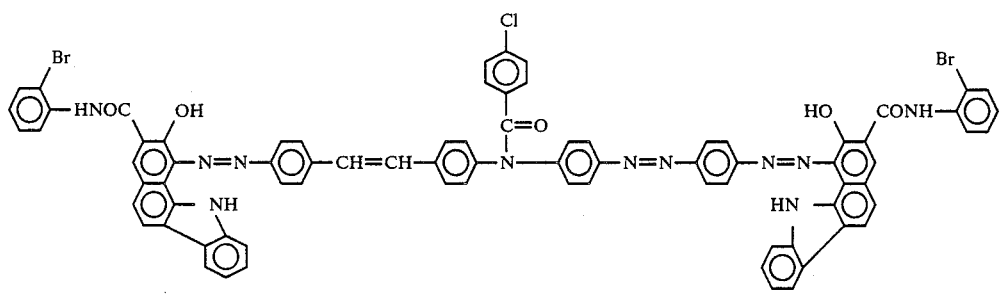
3-66

-continued
Examples of azo pigments represented by the formula (3):
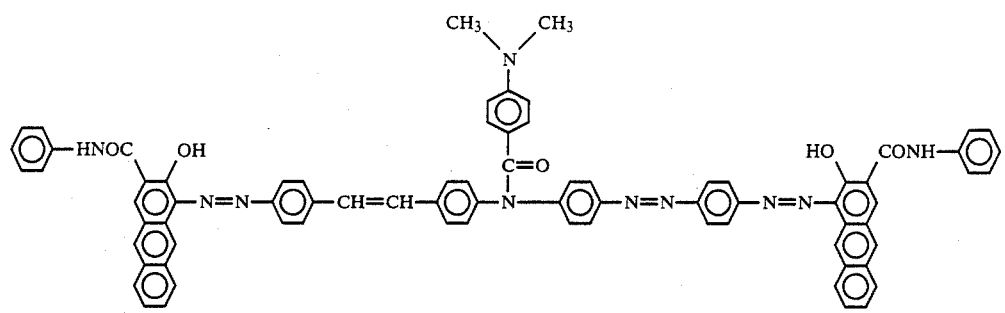
3-67
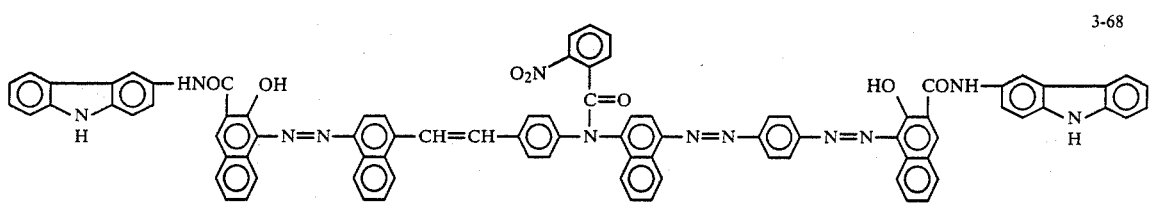
3-68
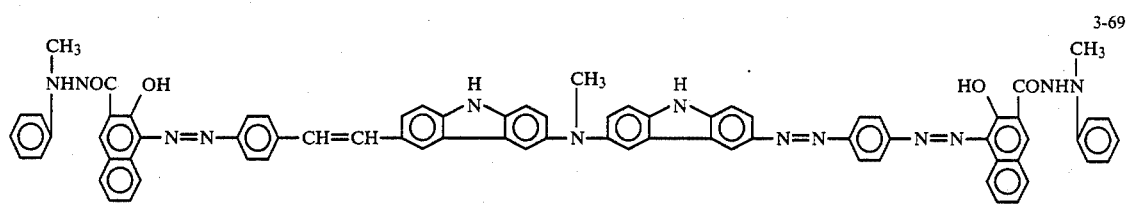
3-69
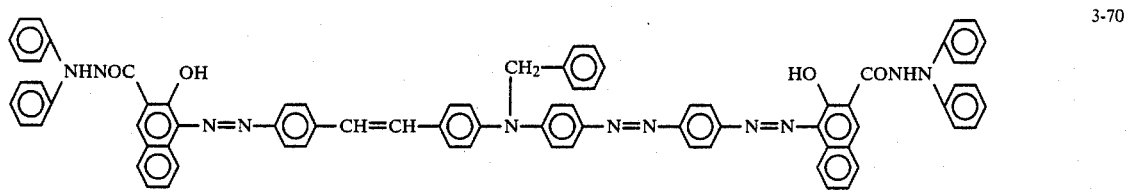
3-70
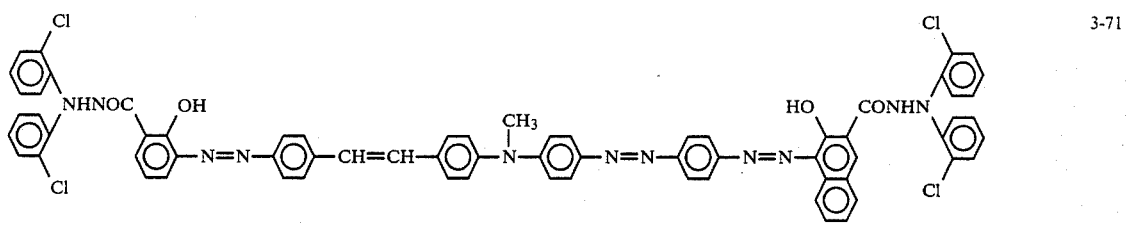
3-71
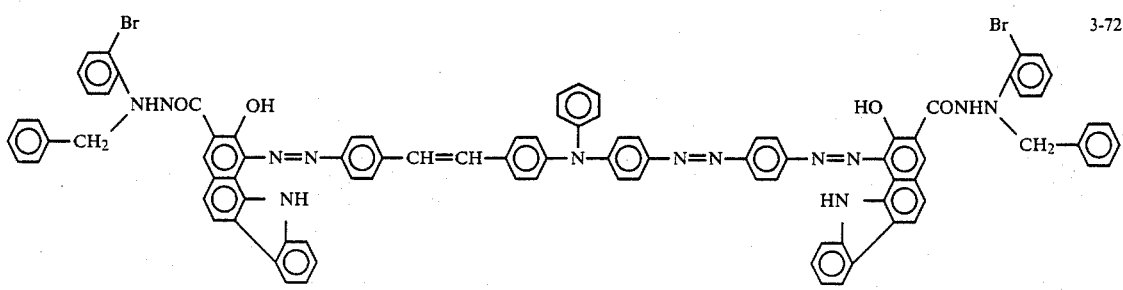
3-72

-continued
Examples of azo pigments represented by the formula (3):
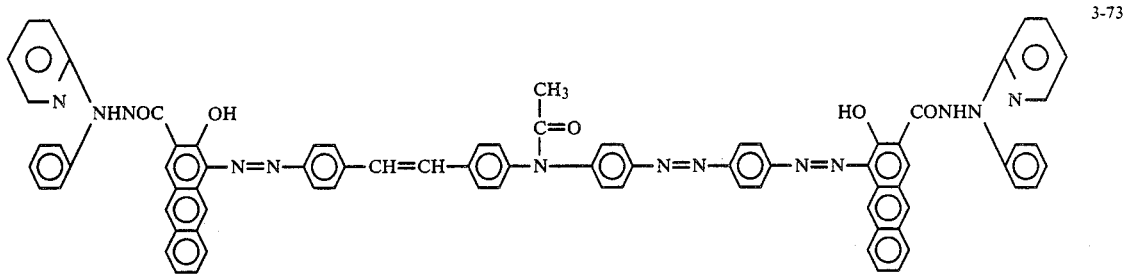
3-73
Examples of azo pigments represented by the formula (4):
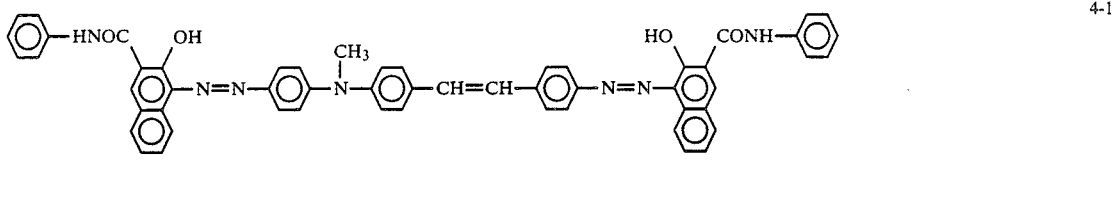
4-1
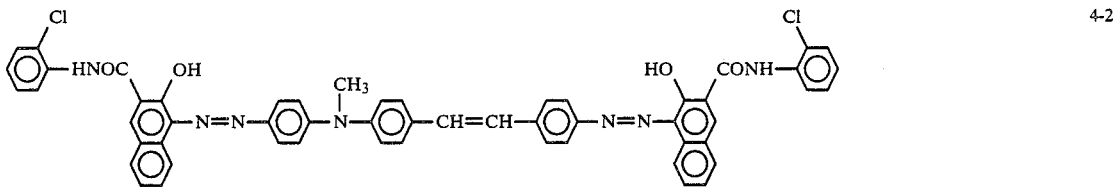
4-2
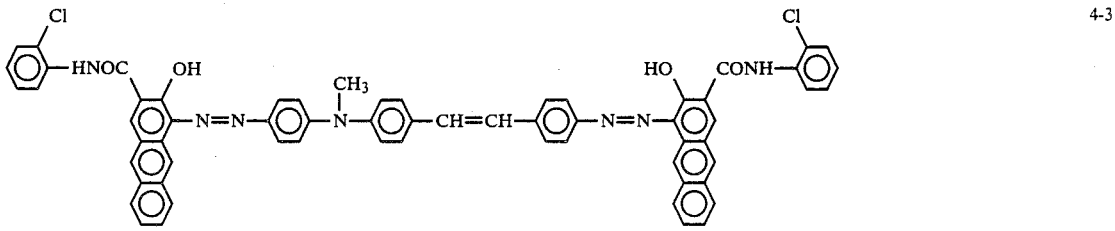
4-3
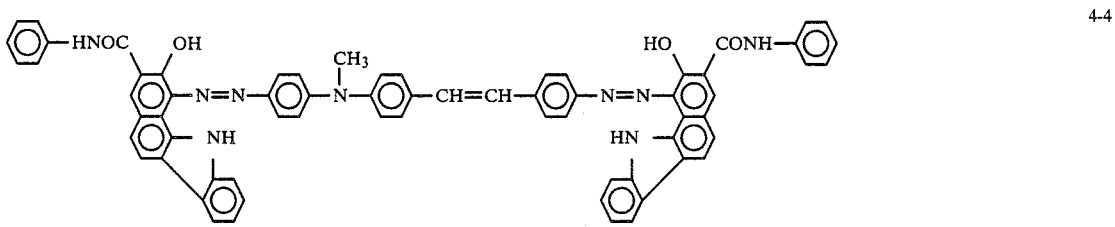
4-4

-continued
Examples of azo pigments represented by the formula (4):
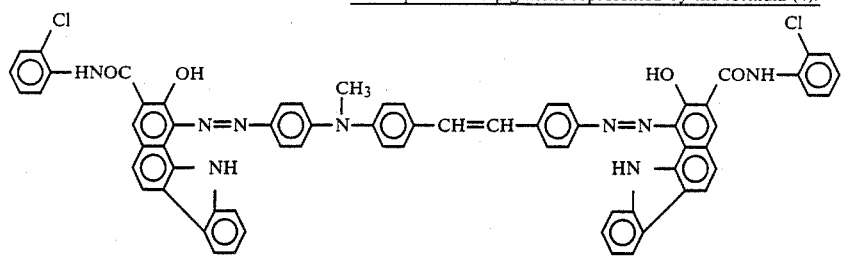
4-5
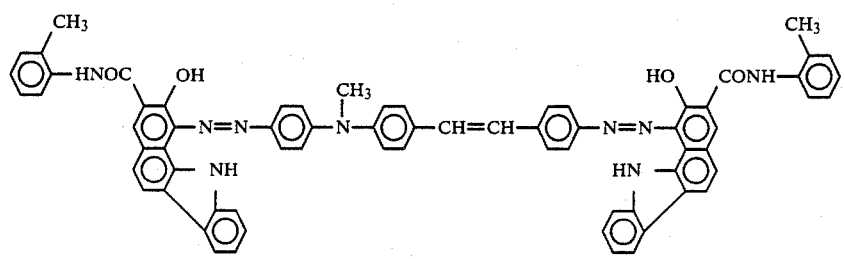
4-6
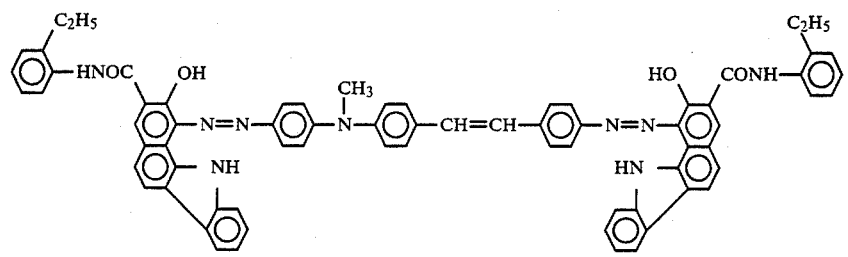
4-7
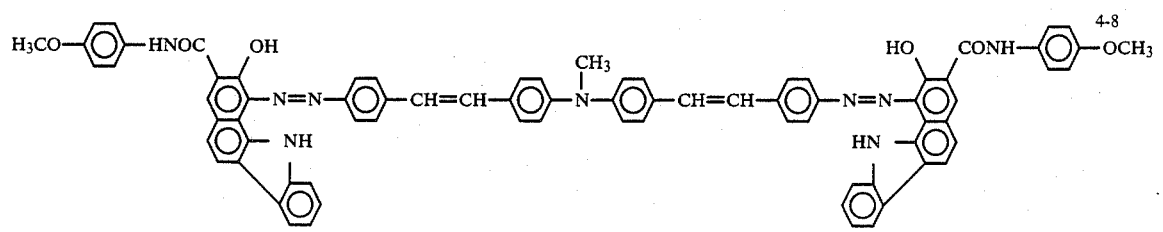
4-8
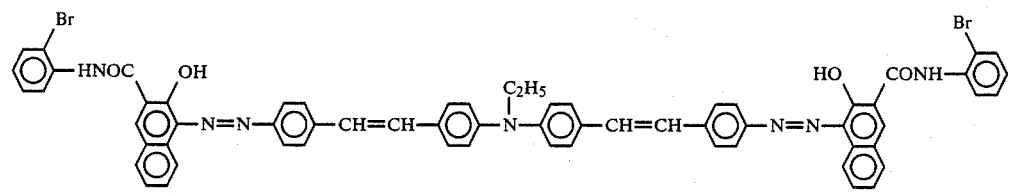
4-9
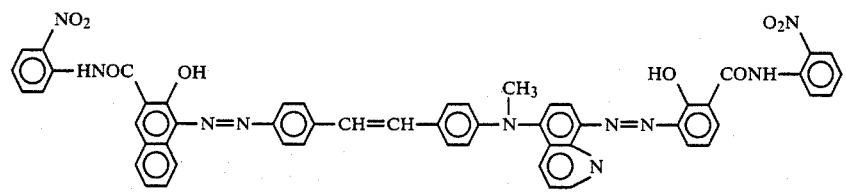
4-10

-continued
Examples of azo pigments represented by the formula (4):
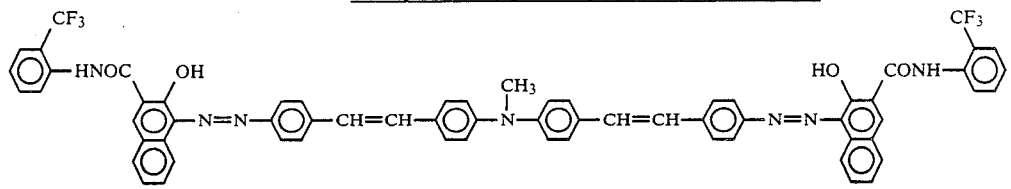
4-11
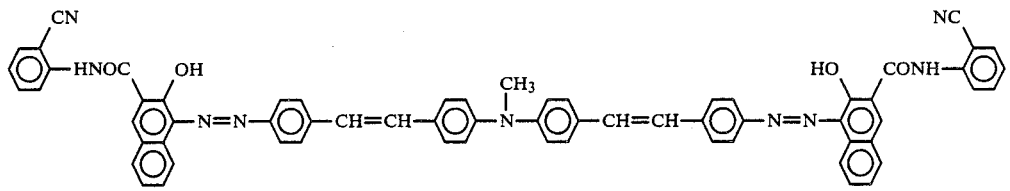
4-12
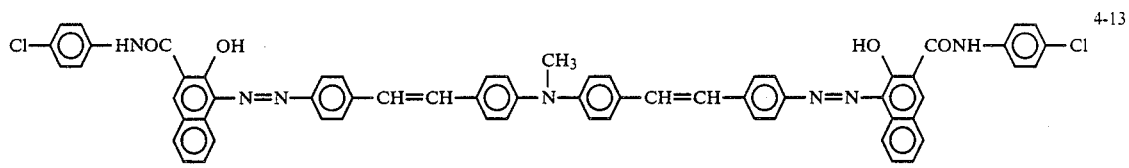
4-13
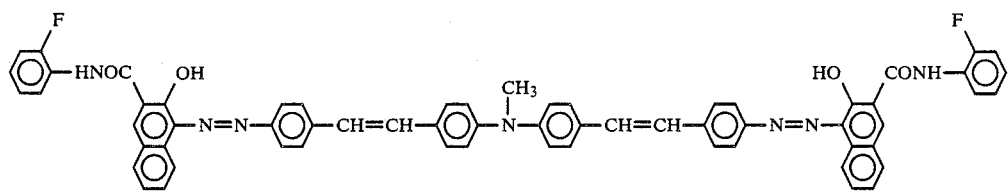
4-14
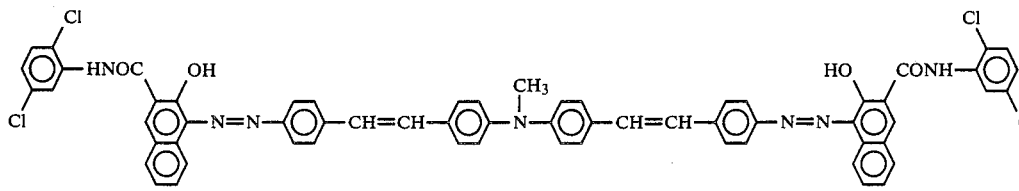
4-15
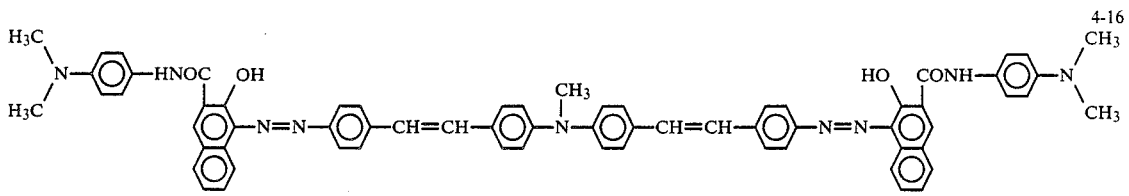
4-16
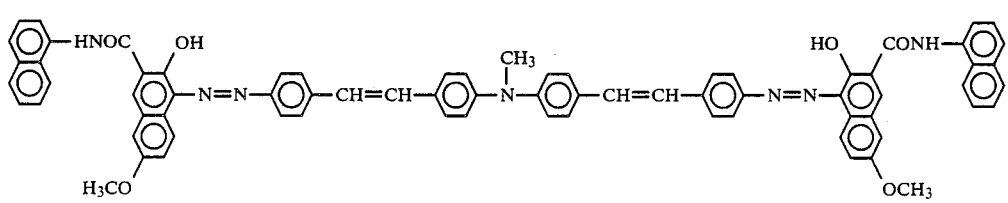
4-17

-continued
Examples of azo pigments represented by the formula (4):
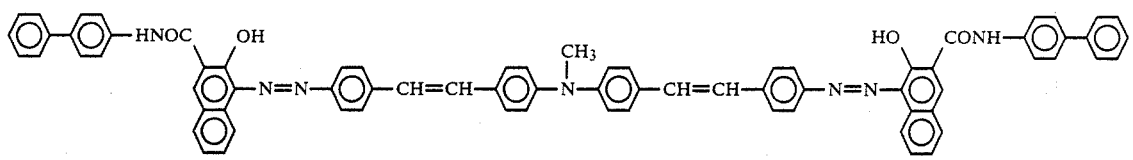
4-18
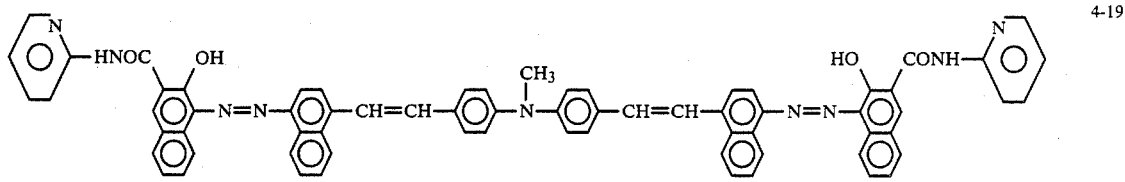
4-19
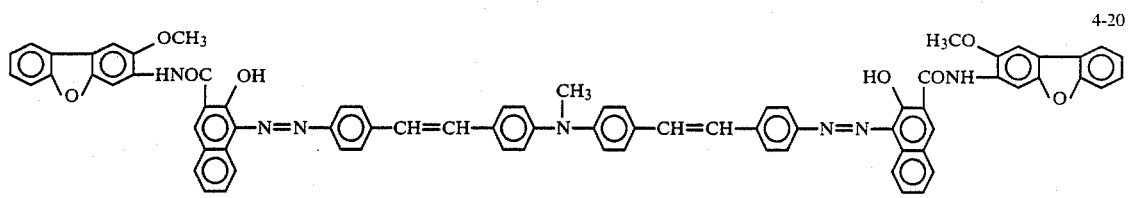
4-20
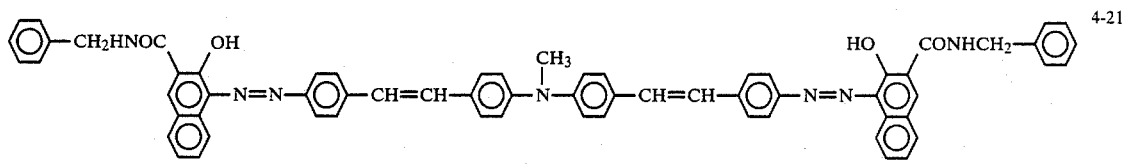
4-21
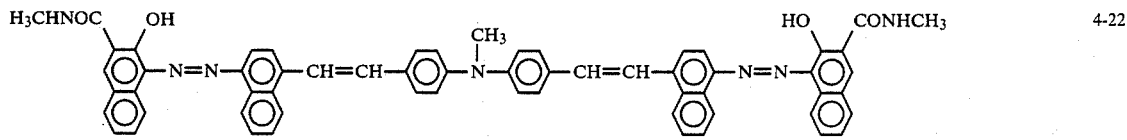
4-22
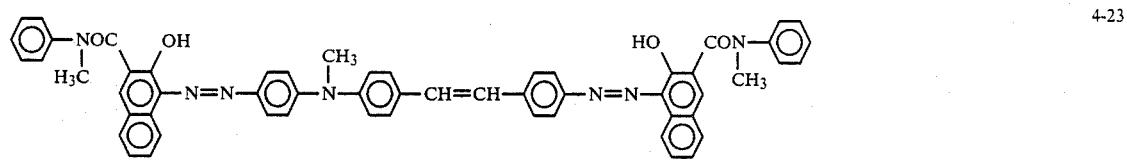
4-23
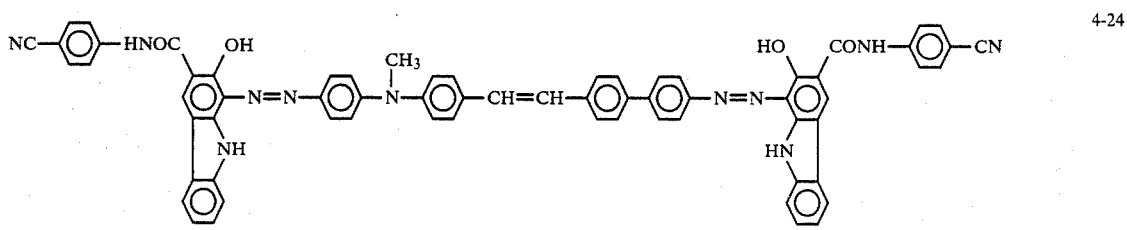
4-24

-continued
Examples of azo pigments represented by the formula (4):
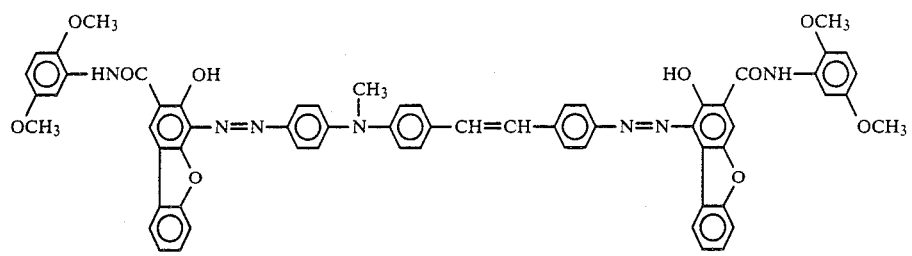 4-25
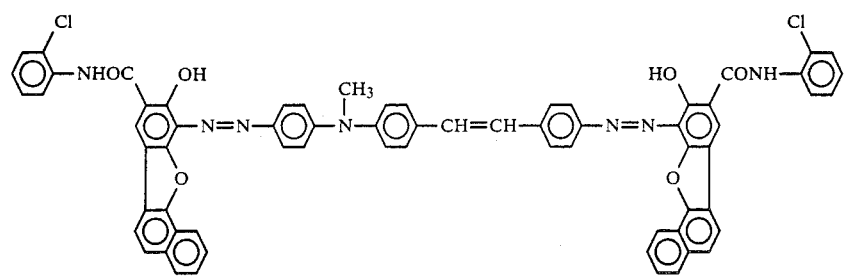 4-26
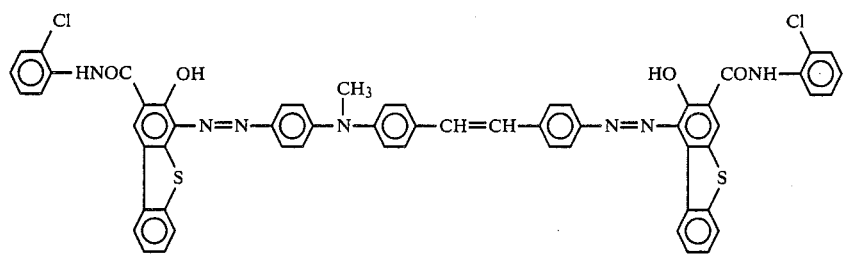 4-27
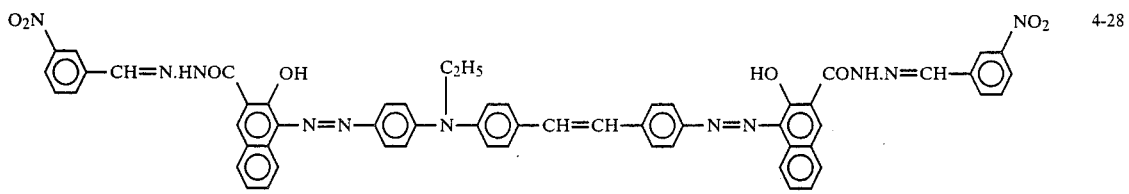 4-28
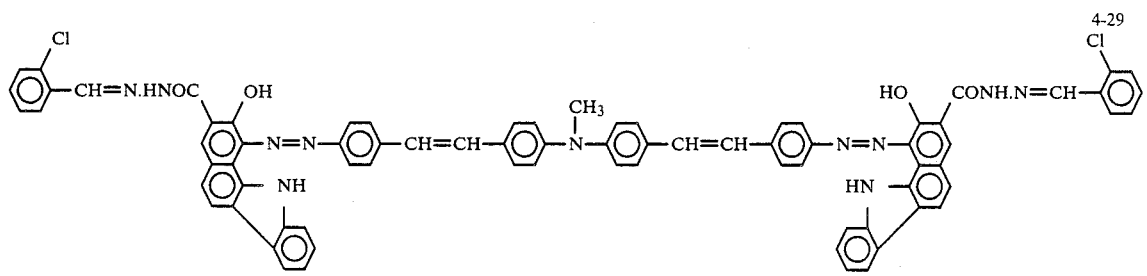 4-29

-continued
Examples of azo pigments represented by the formula (4):
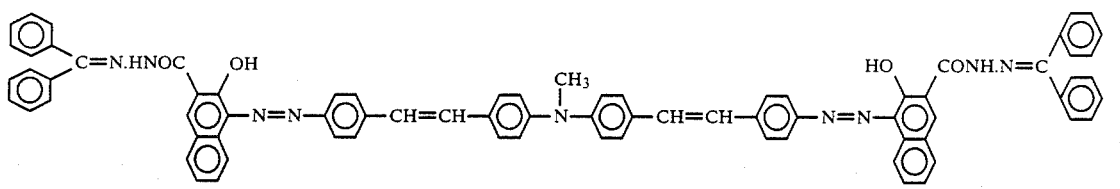
4-30
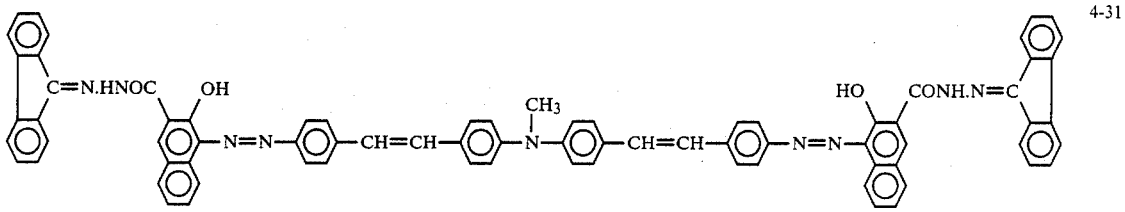
4-31
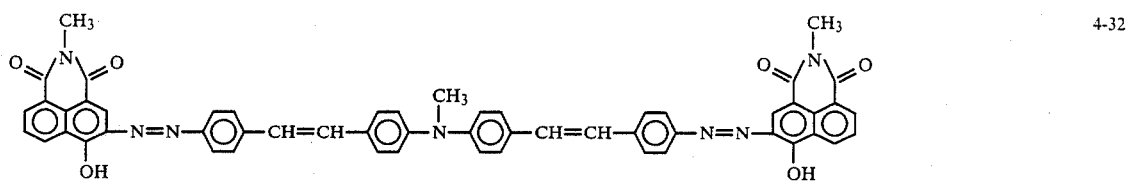
4-32
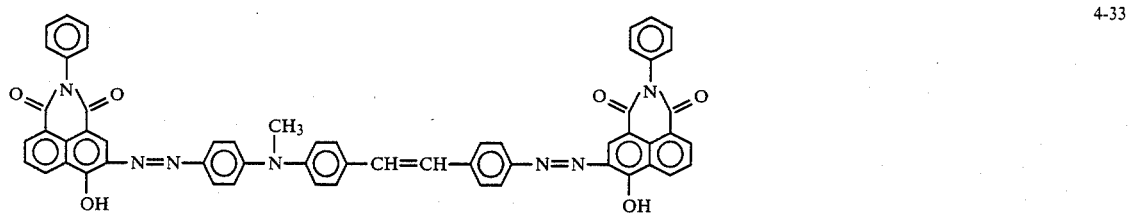
4-33
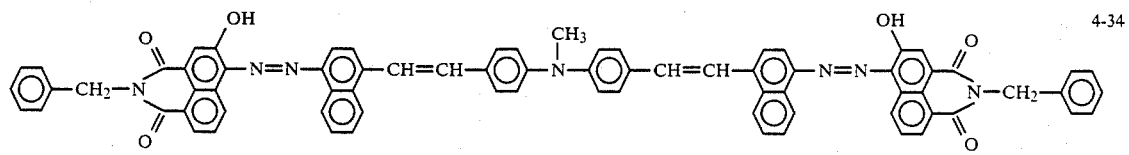
4-34
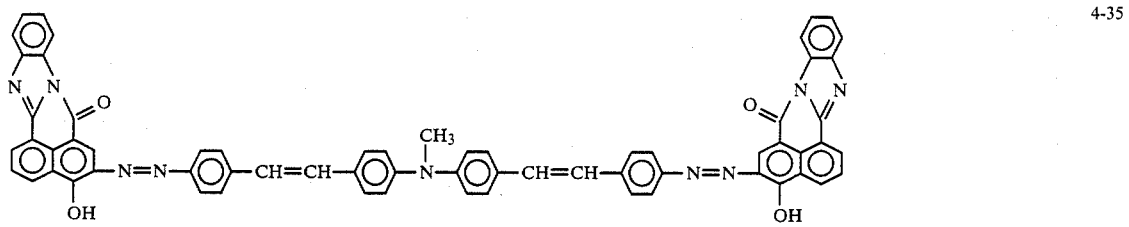
4-35
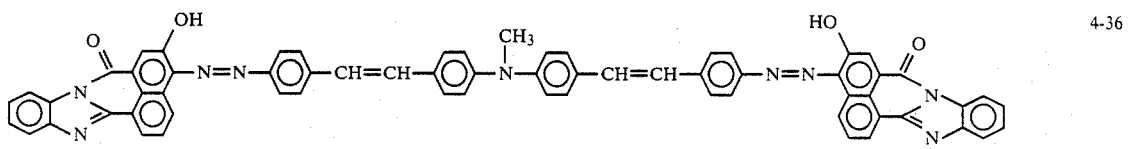
4-36

-continued
Examples of azo pigments represented by the formula (4):
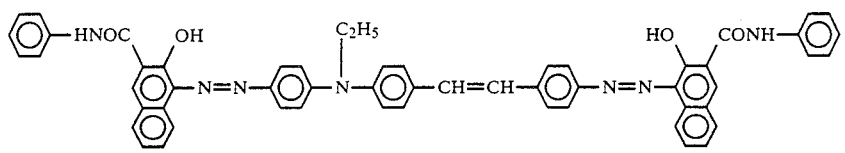 4-37
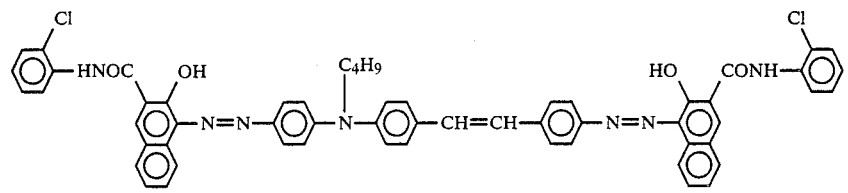 4-38
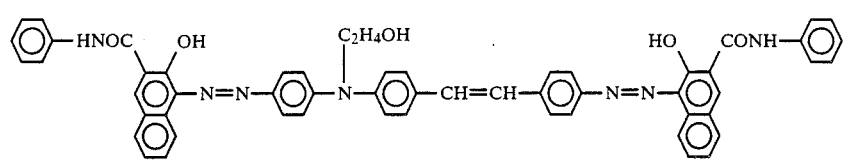 4-39
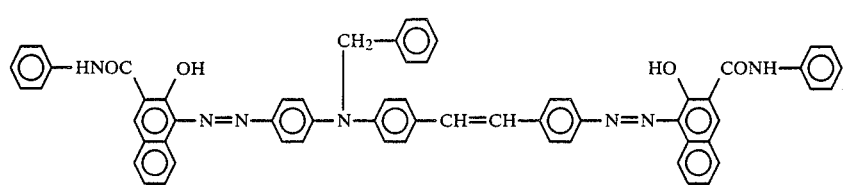 4-40
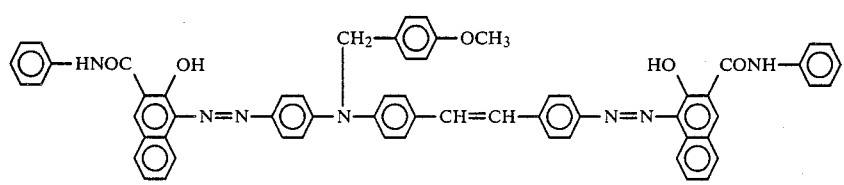 4-41
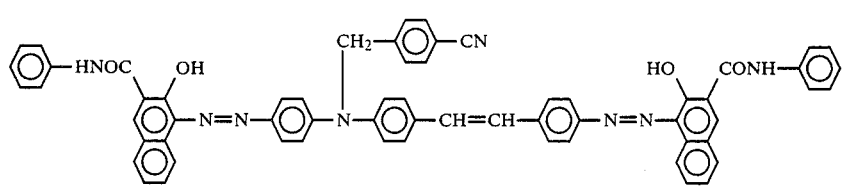 4-42
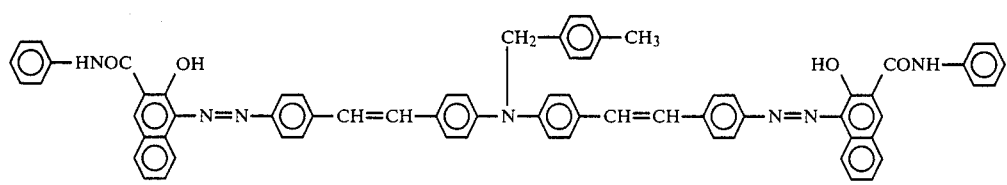 4-43

-continued
Examples of azo pigments represented by the formula (4):
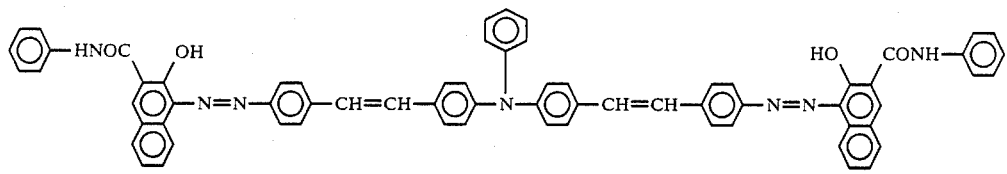
4-44
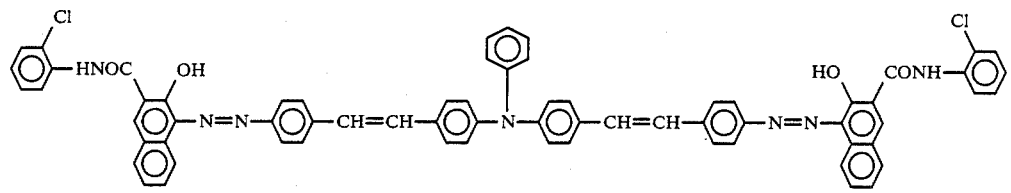
4-45
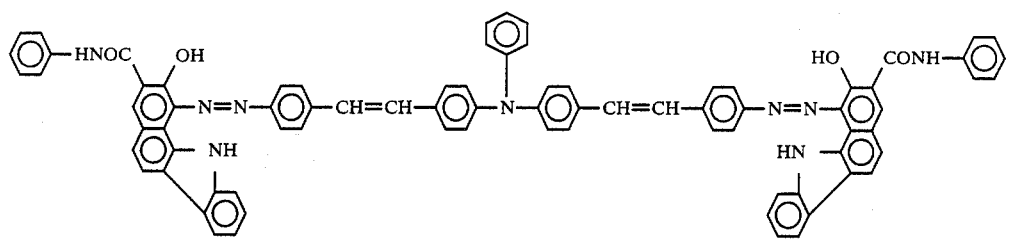
4-46
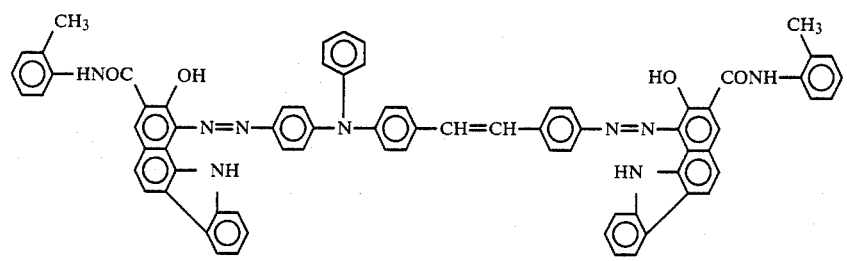
4-47
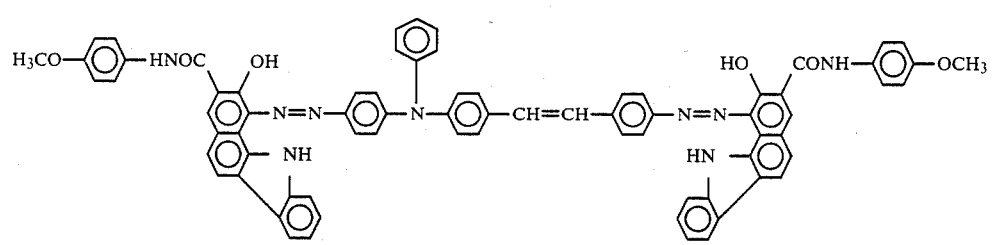
4-48
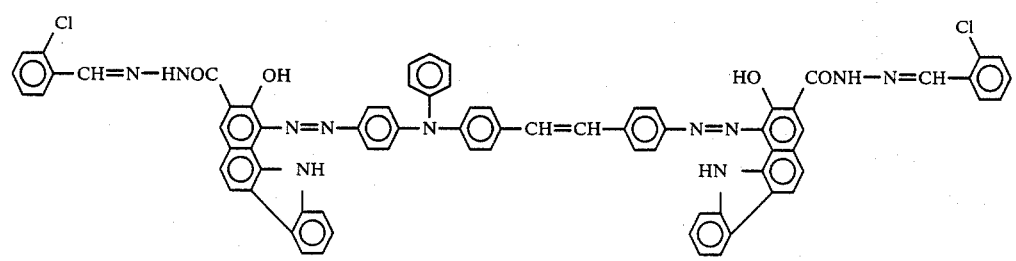
4-49

-continued
Examples of azo pigments represented by the formula (4):
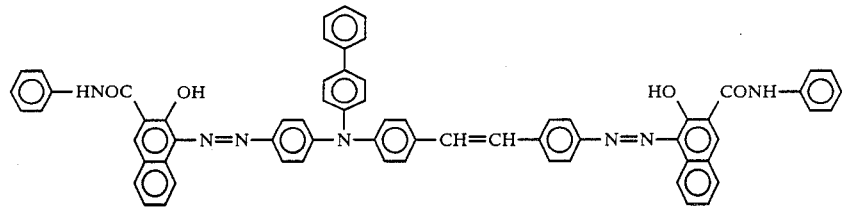
4-50
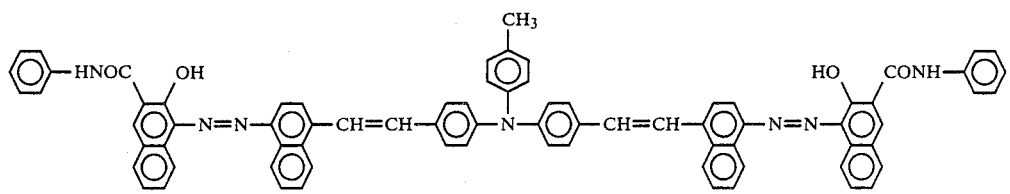
4-51
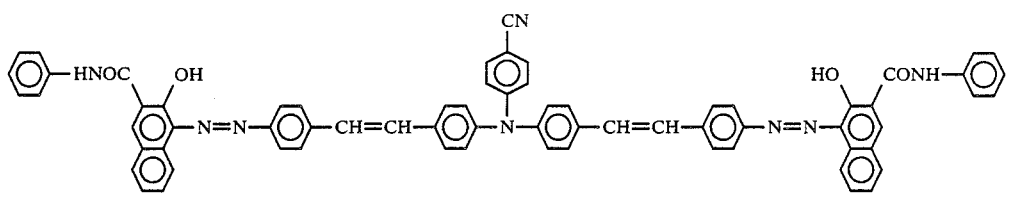
4-52
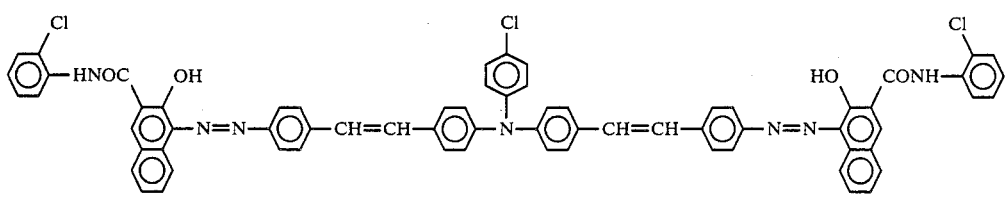
4-53
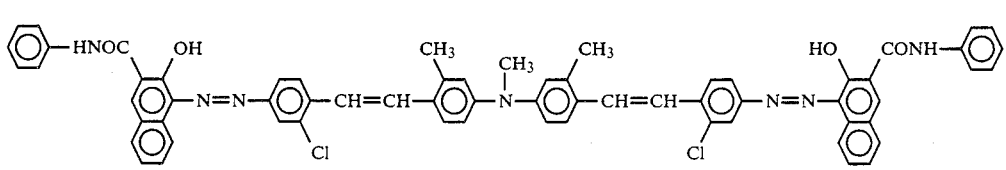
4-54
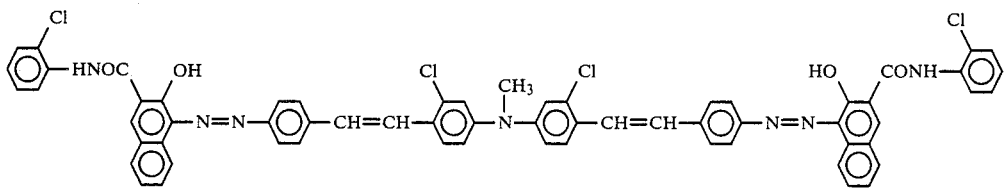
4-55
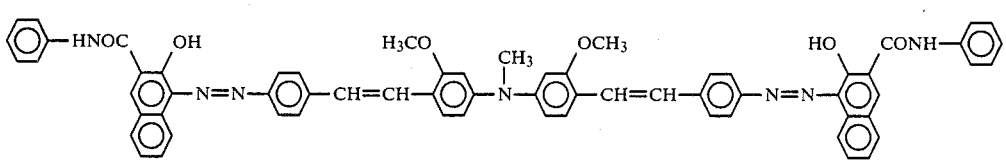
4-56

-continued
Examples of azo pigments represented by the formula (4):
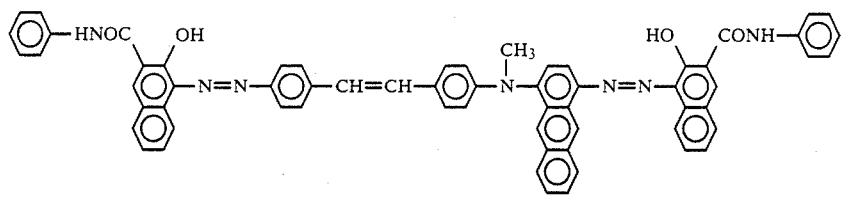
4-57
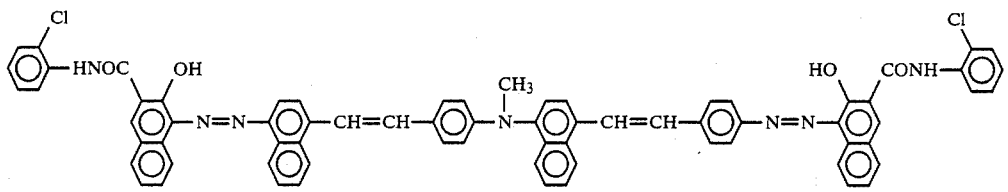
4-58
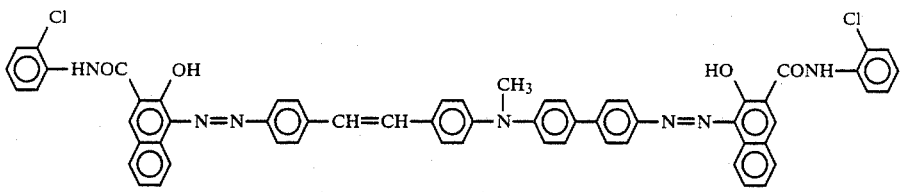
4-59
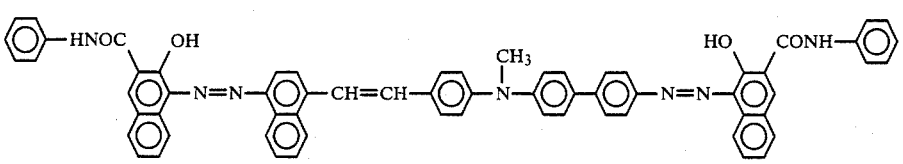
4-60
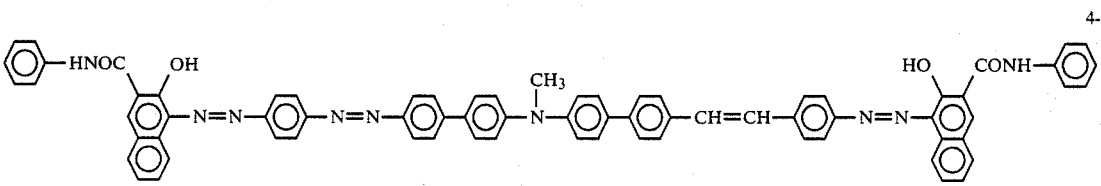
4-61
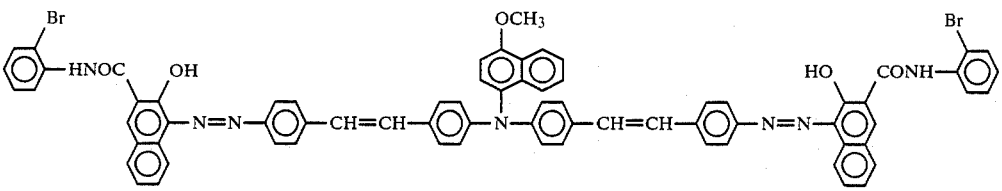
4-62
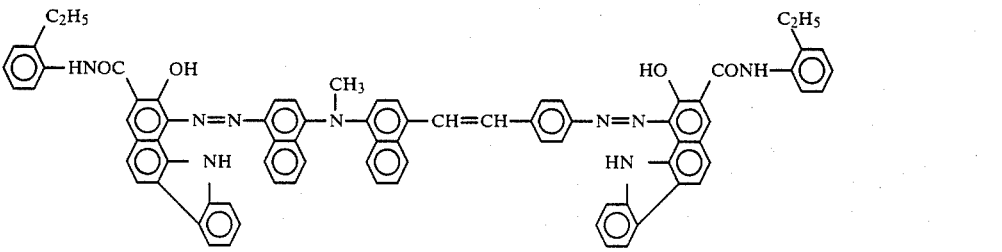
4-63

-continued
Examples of azo pigments represented by the formula (4):
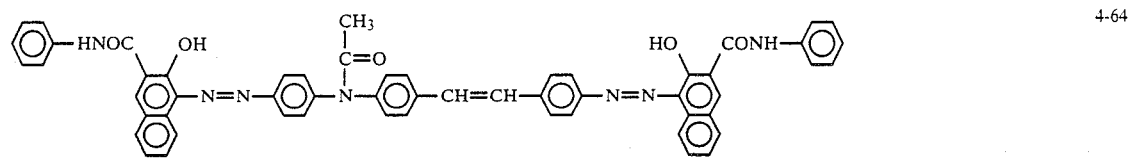 4-64
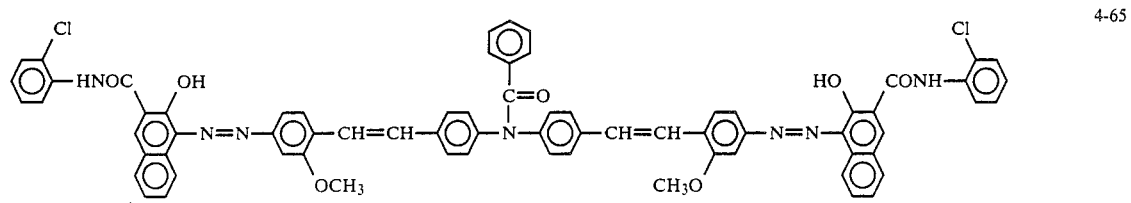 4-65
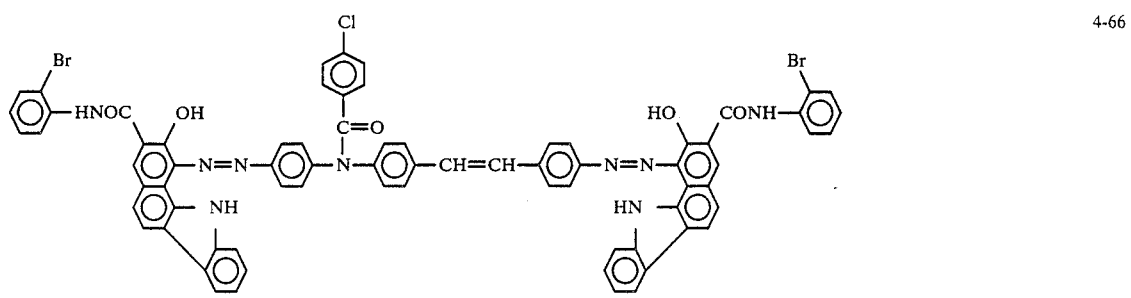 4-66
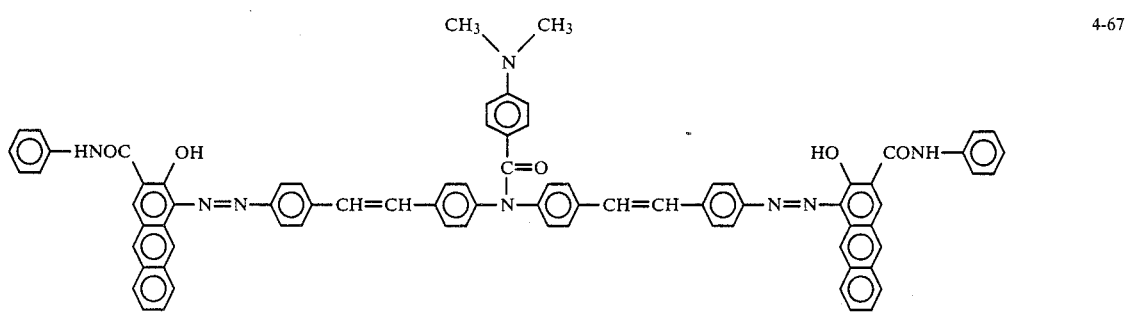 4-67
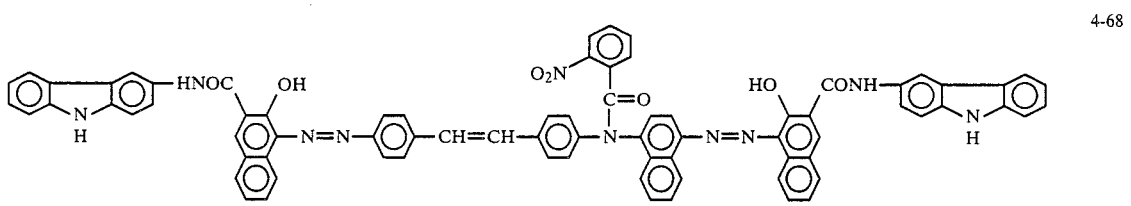 4-68
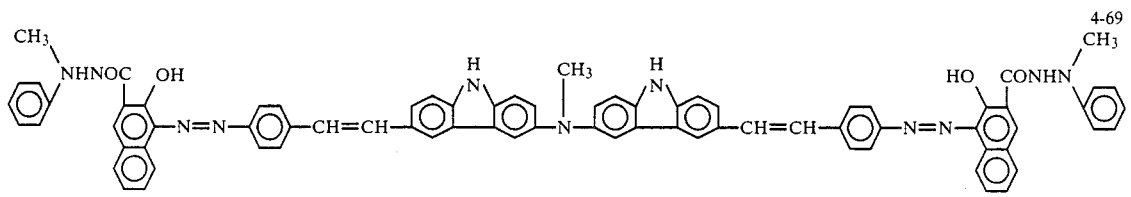 4-69

-continued
Examples of azo pigments represented by the formula (4):
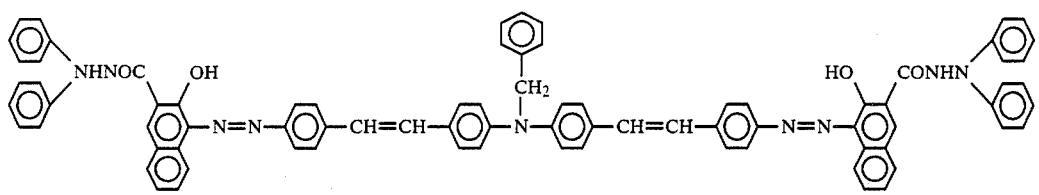
4-70
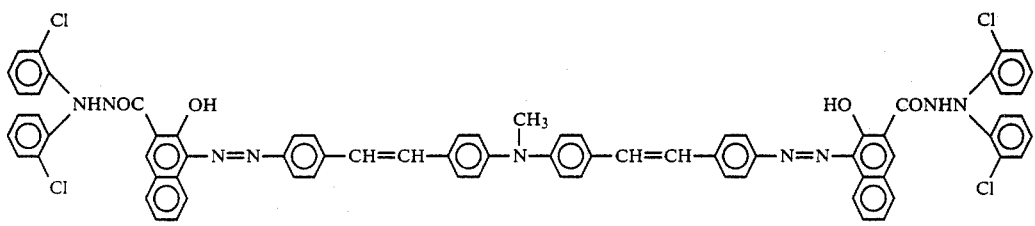
4-71
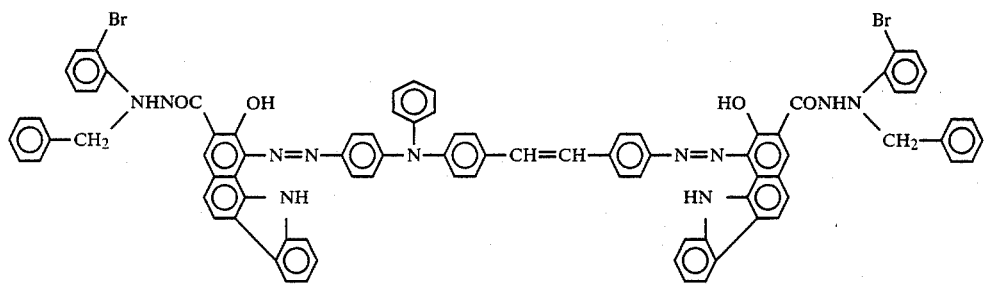
4-72
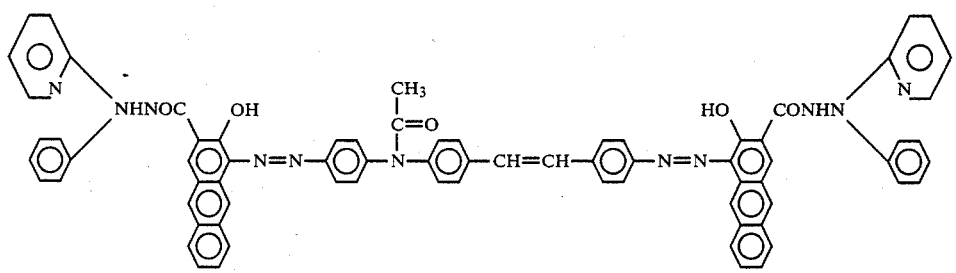
4-73
Examples of azo pigments represented by the formula (5):
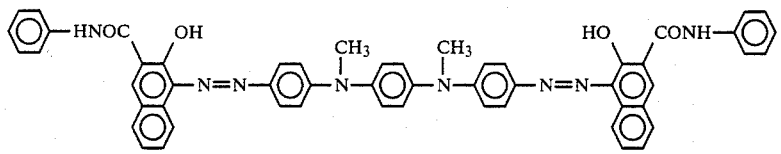
5-1
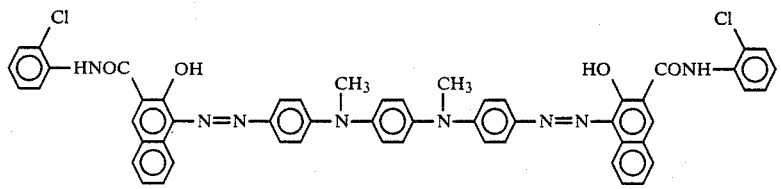
5-2

-continued
Examples of azo pigments represented by the formula (5):
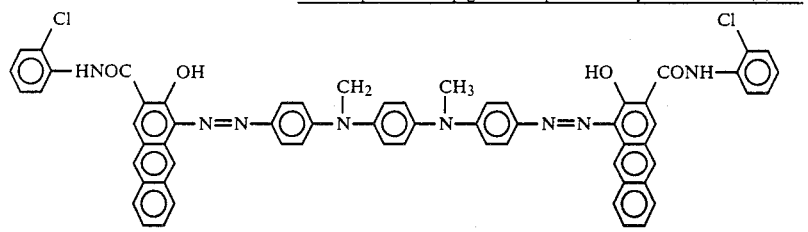 5-3
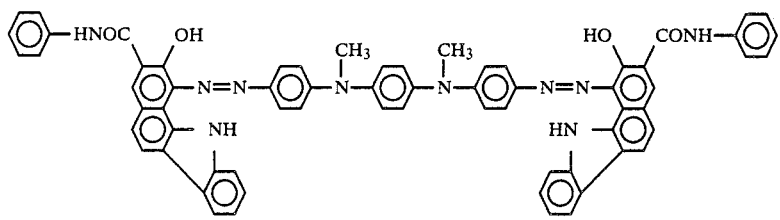 5-4
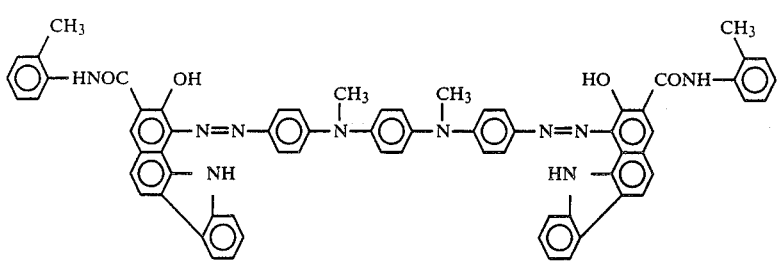 5-5
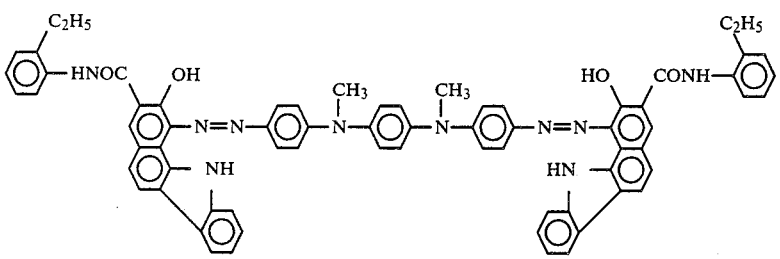 5-6
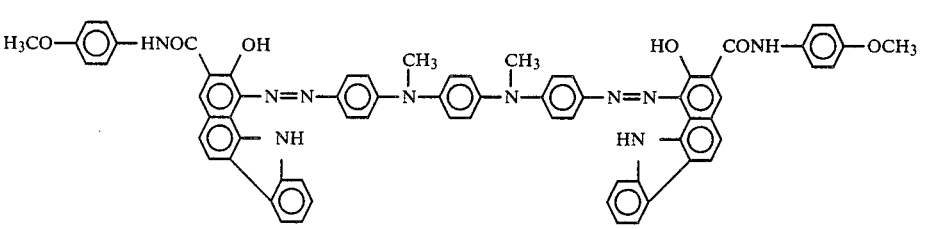 5-7
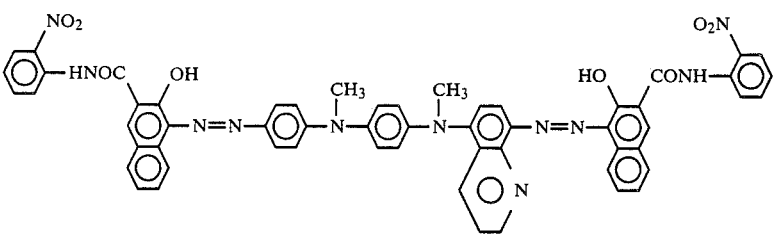 5-8
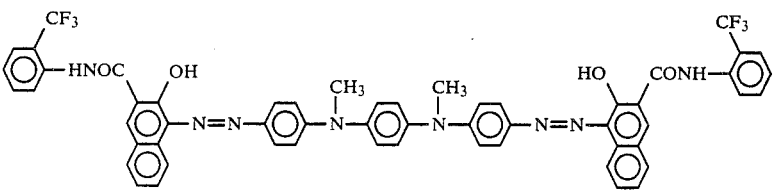 5-9

-continued
Examples of azo pigments represented by the formula (5):
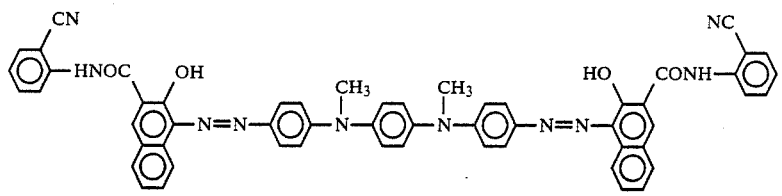 5-10
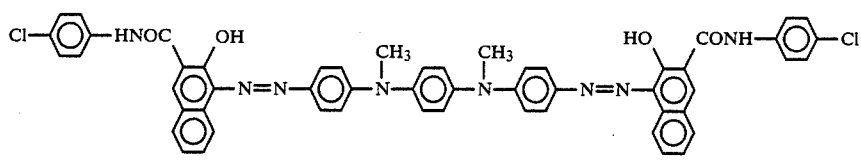 5-11
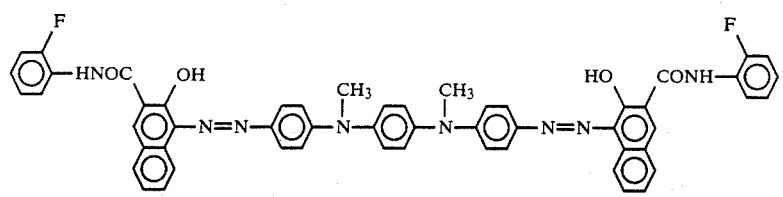 5-12
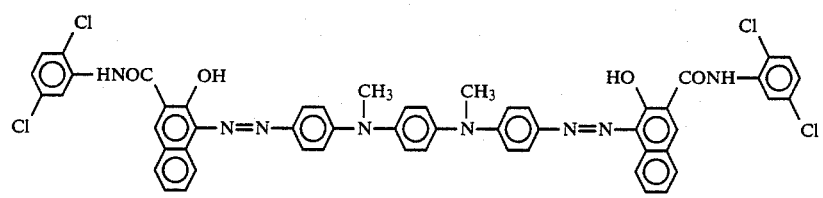 5-13
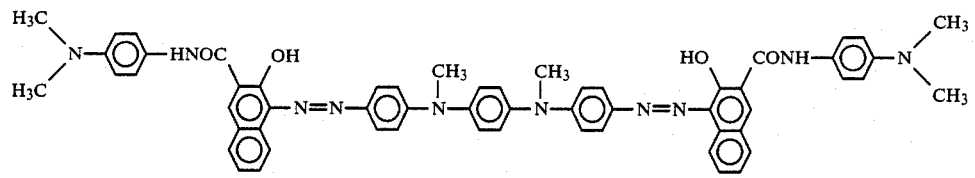 5-14
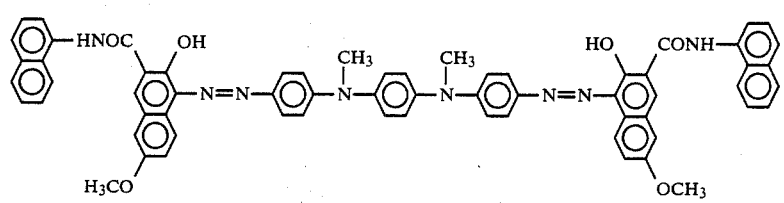 5-15
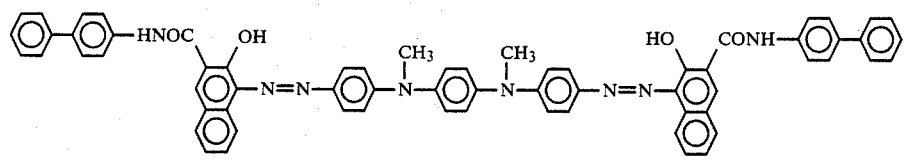 5-16
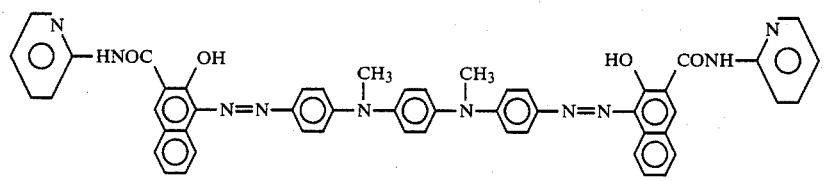 5-17

-continued
Examples of azo pigments represented by the formula (5):
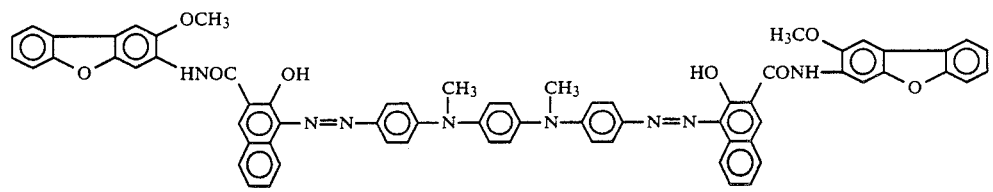 5-18
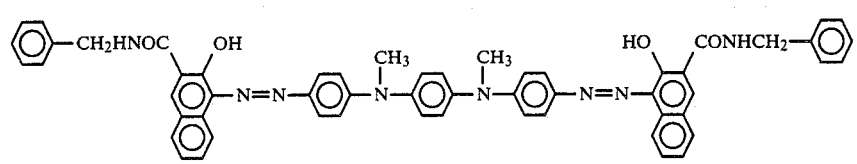 5-19
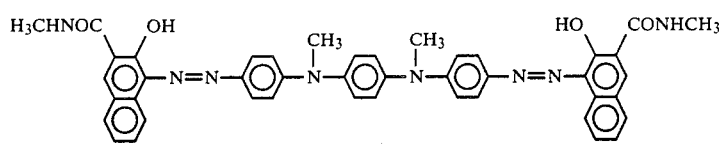 5-20
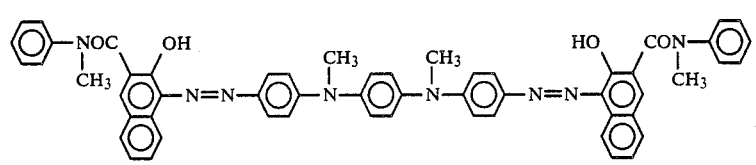 5-21
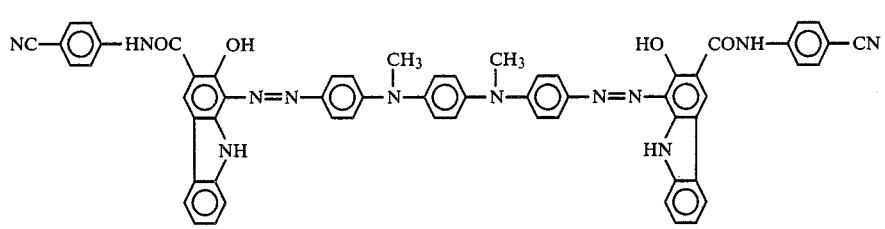 5-22
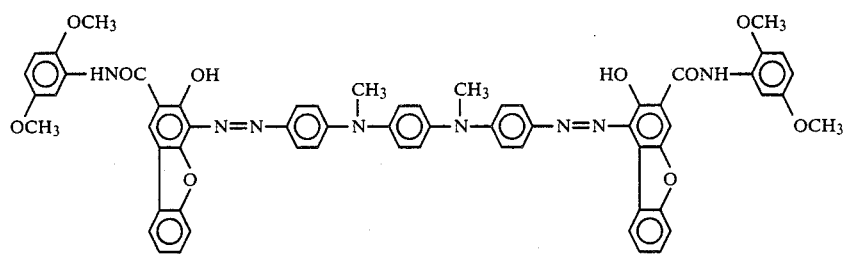 5-23
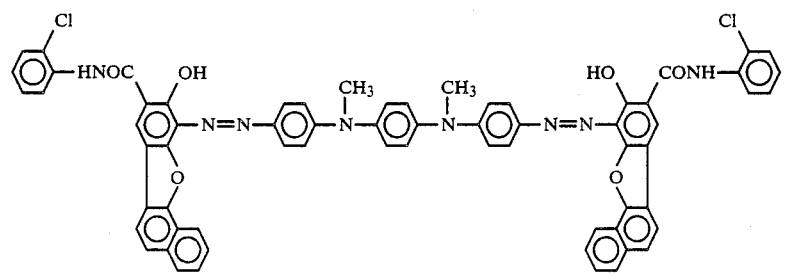 5-24

-continued
Examples of azo pigments represented by the formula (5):
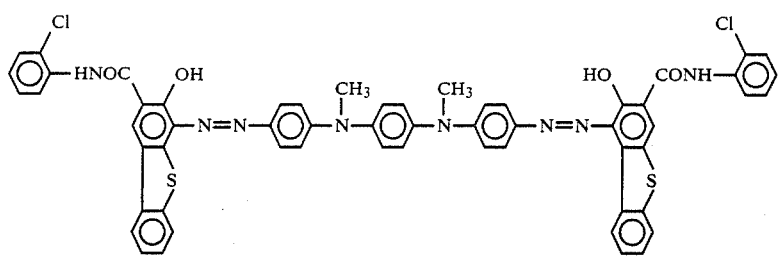 5-25
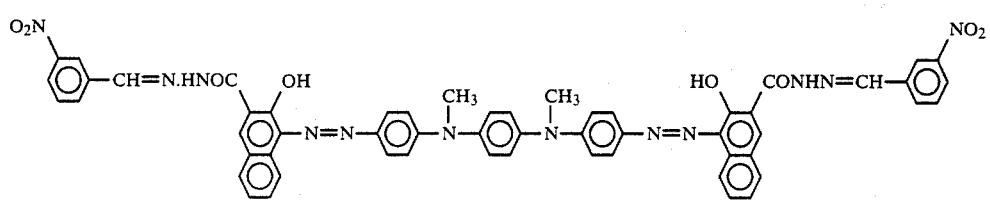 5-26
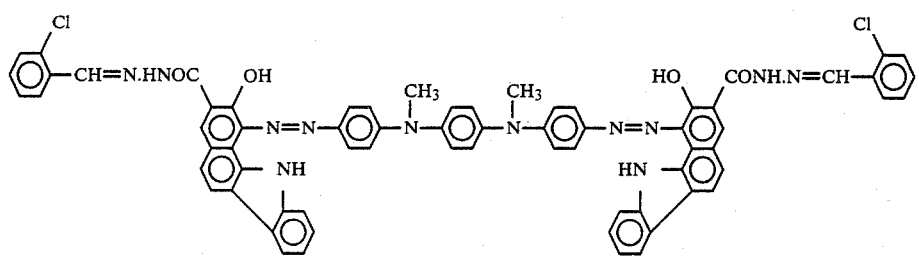 5-27
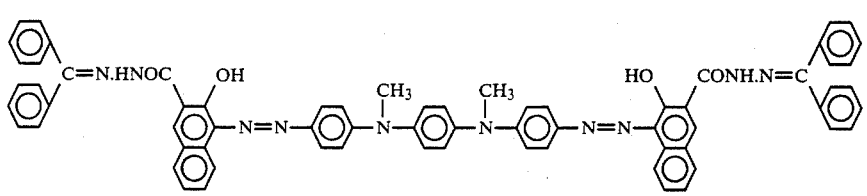 5-28
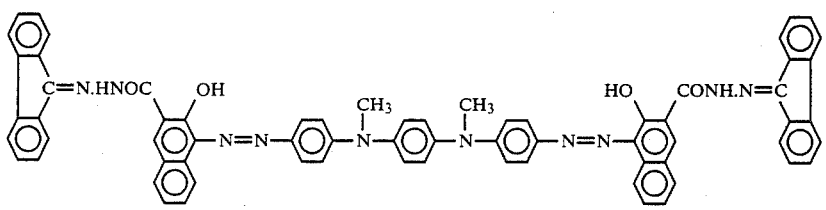 5-29
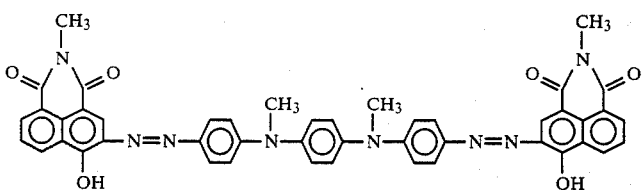 5-30
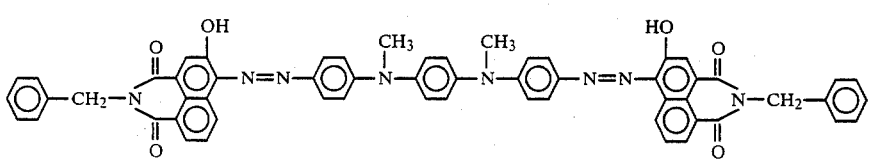 5-31

-continued
Examples of azo pigments represented by the formula (5):
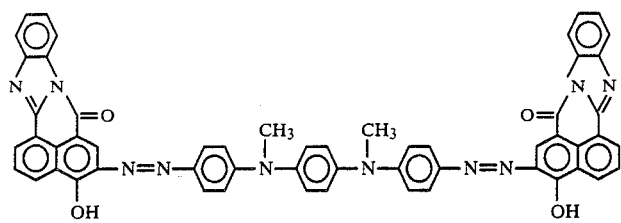
5-32
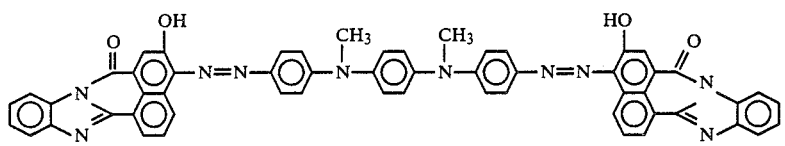
5-33
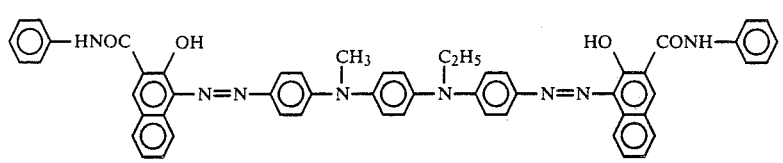
5-34
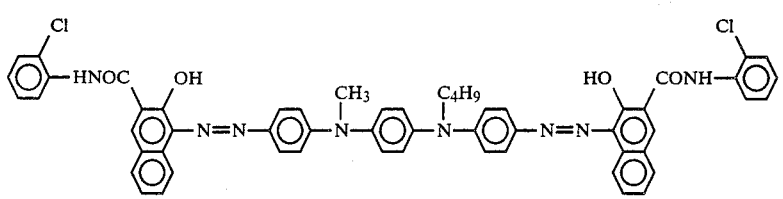
5-35
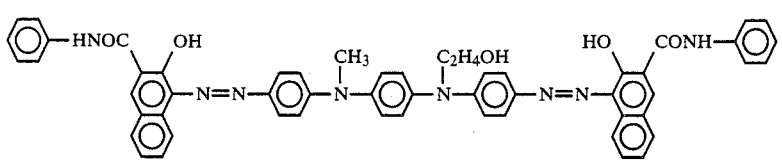
5-36
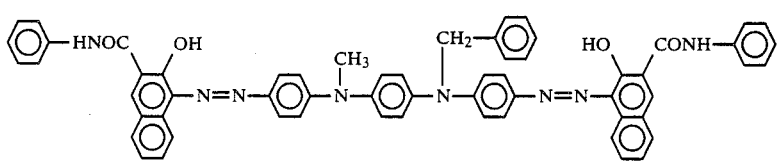
5-37
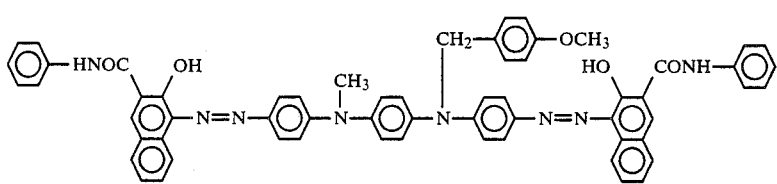
5-38
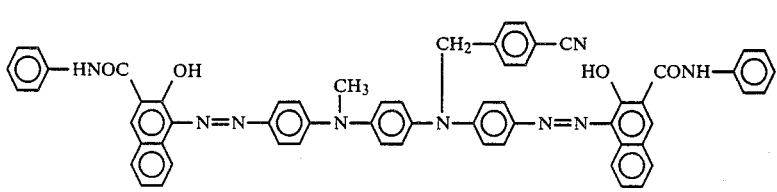
5-39

-continued
Examples of azo pigments represented by the formula (5):
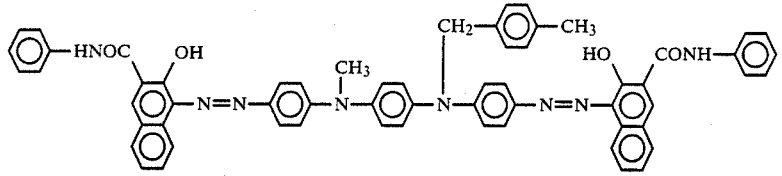
5-40
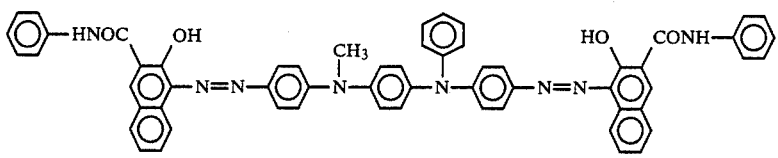
5-41
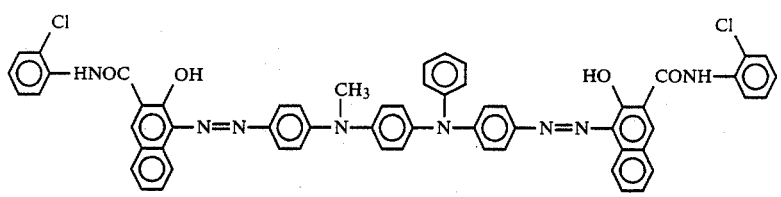
5-42
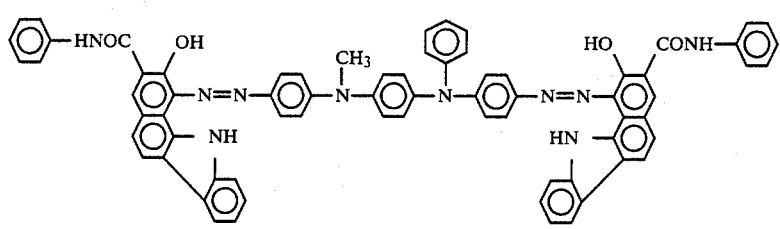
5-43
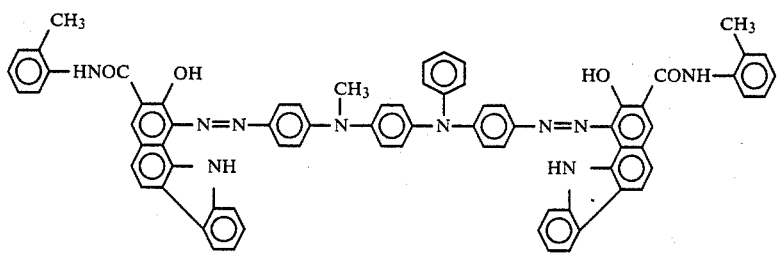
5-44
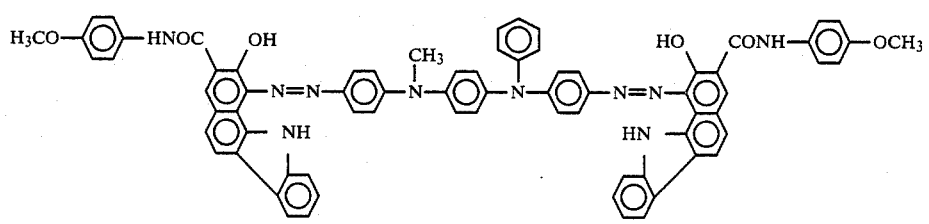
5-45

-continued
Examples of azo pigments represented by the formula (5):
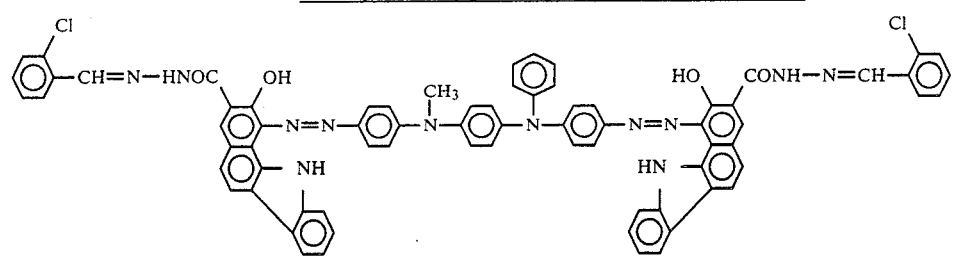 5-46
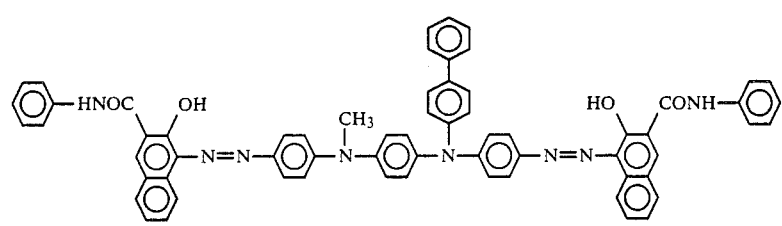 5-47
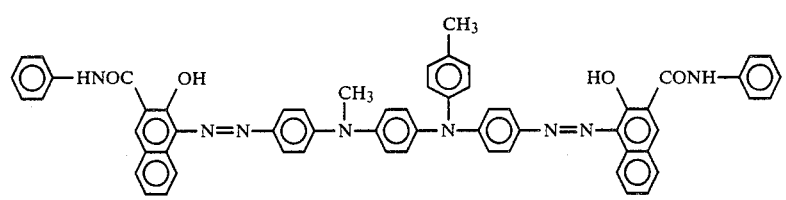 5-48
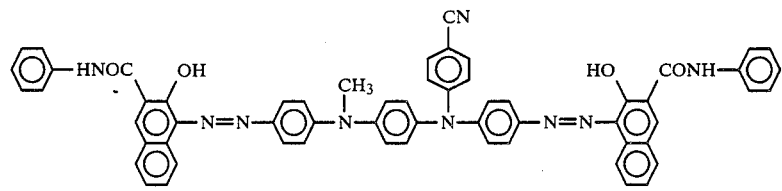 5-49
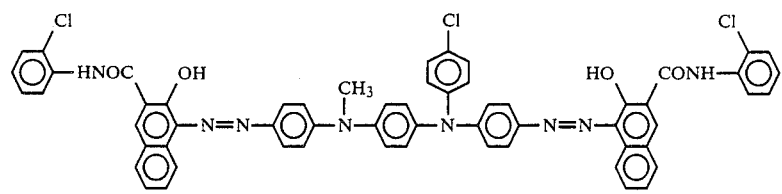 5-50
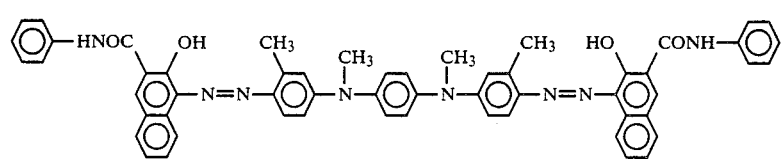 5-51

-continued
Examples of azo pigments represented by the formula (5):
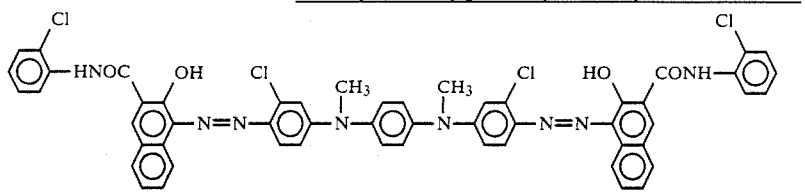 5-52
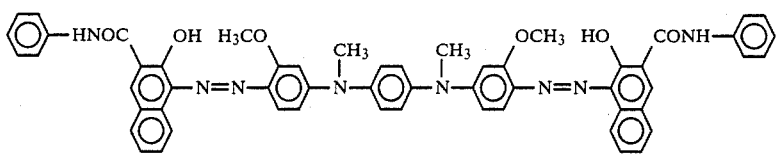 5-53
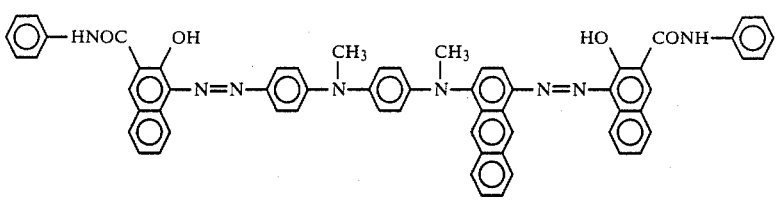 5-54
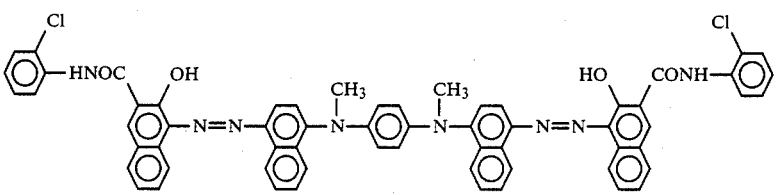 5-55
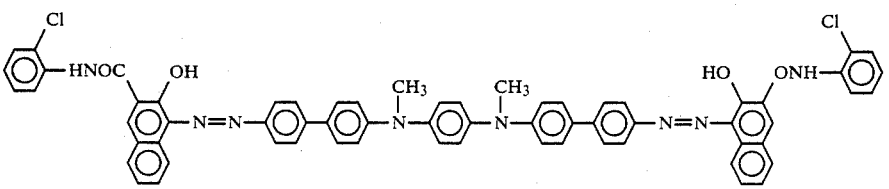 5-56
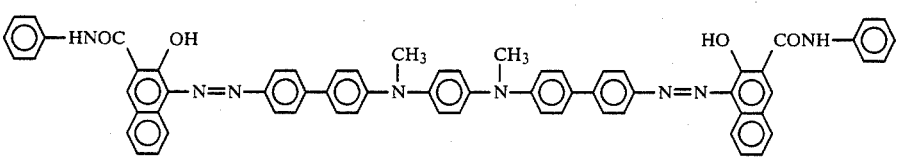 5-57
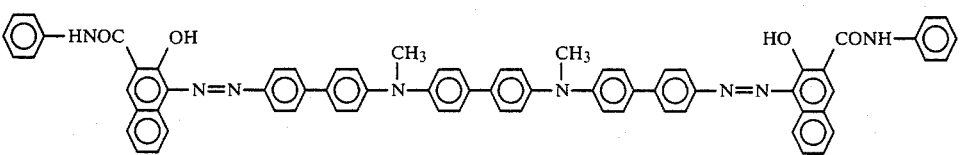 5-58

-continued
Examples of azo pigments represented by the formula (5):
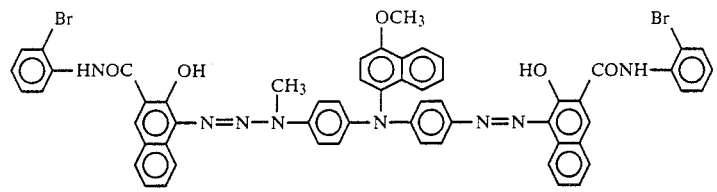
5-59
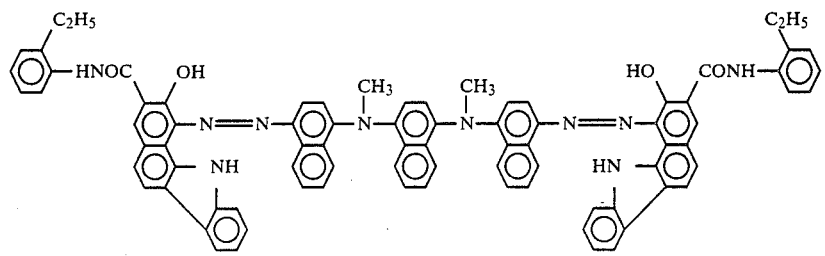
5-60
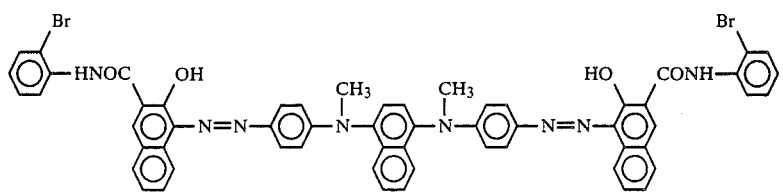
5-61
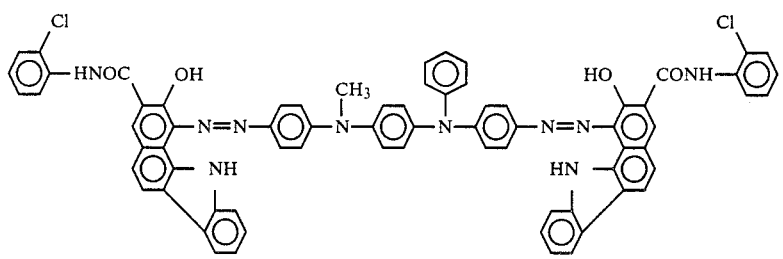
5-62
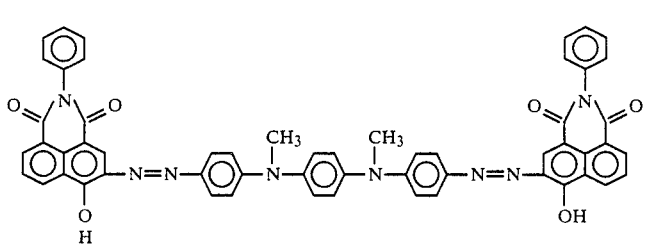
5-63
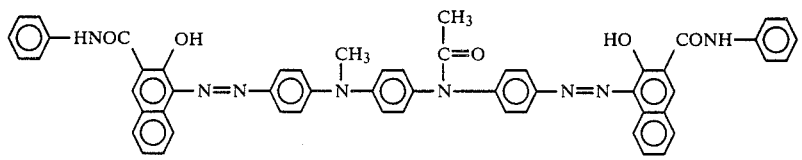
5-64

-continued
Examples of azo pigments represented by the formula (5):
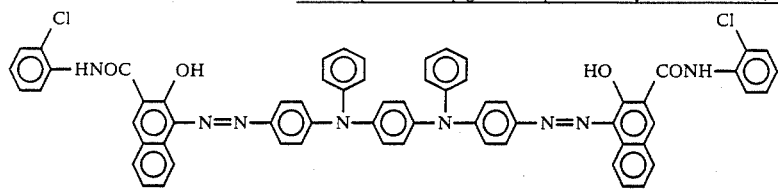
5-65
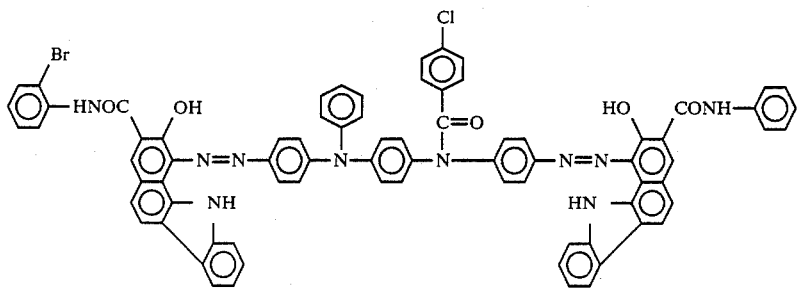
5-66
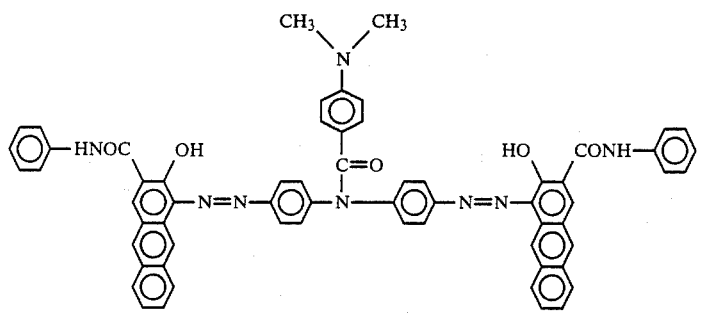
5-67
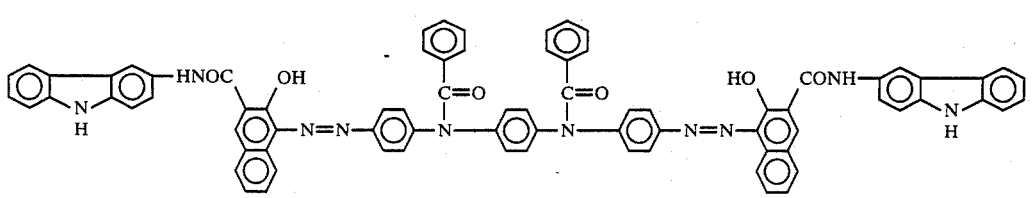
5-68
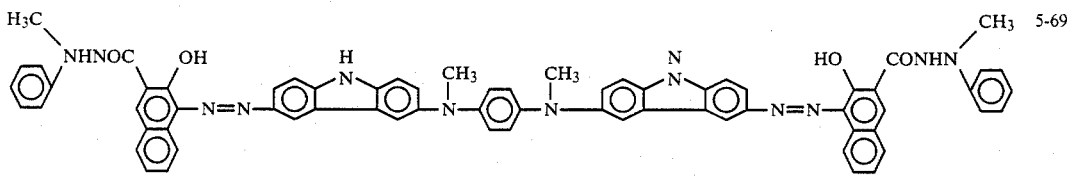
5-69
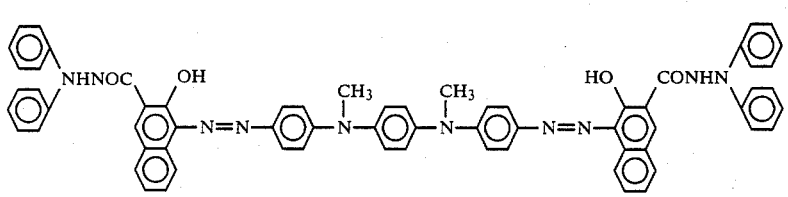
5-70

-continued
Examples of azo pigments represented by the formula (5):
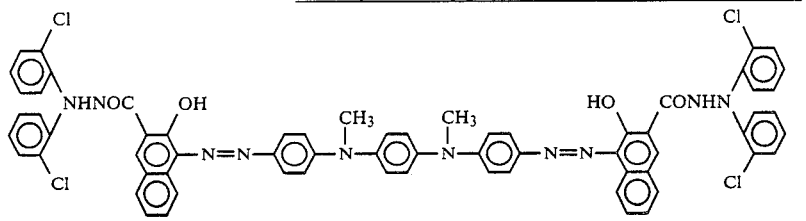 5-71
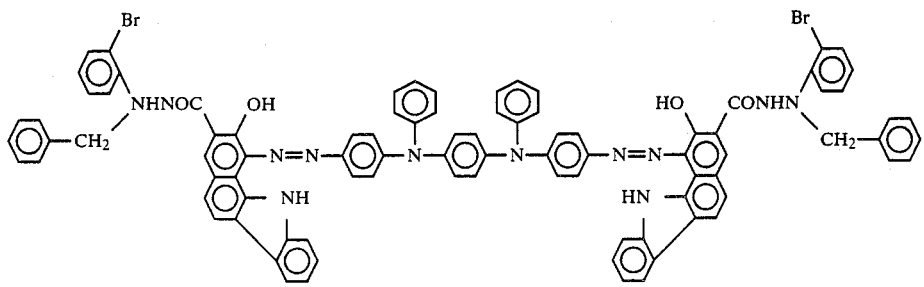 5-72
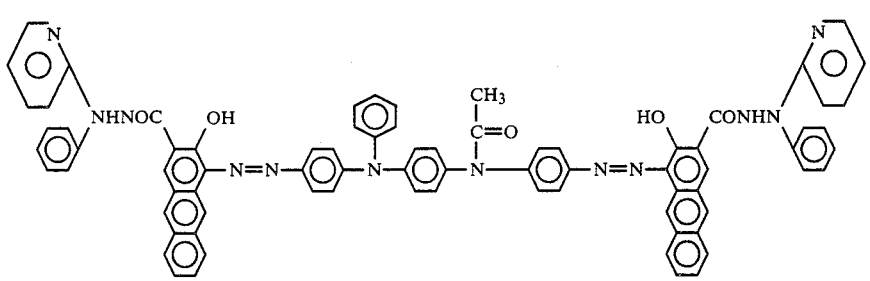 5-73
Examples of azo pigments represented by the formula (6):
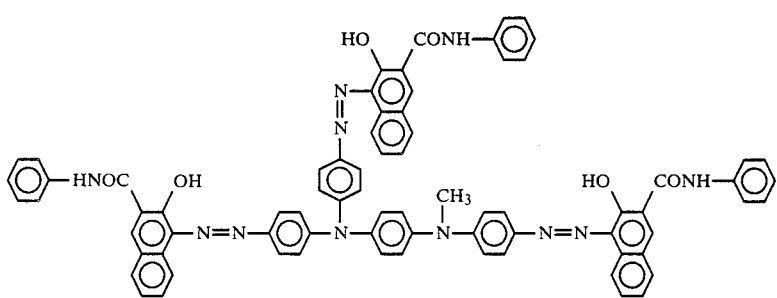 6-1
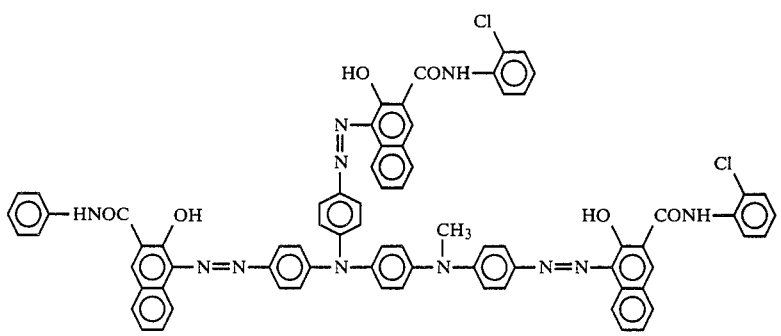 6-2

-continued
Examples of azo pigments represented by the formula (6):
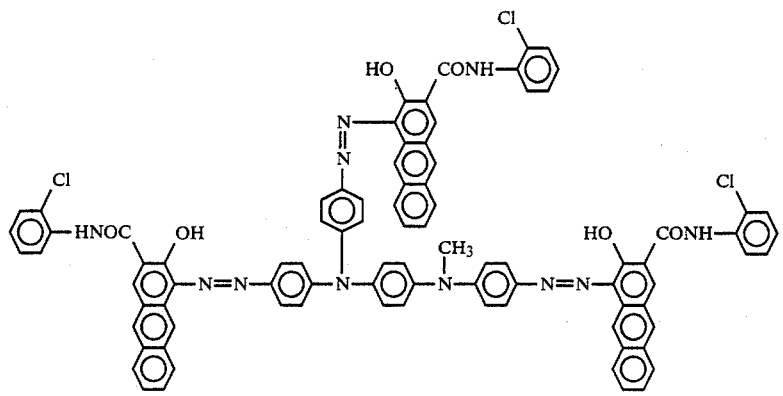
6-3
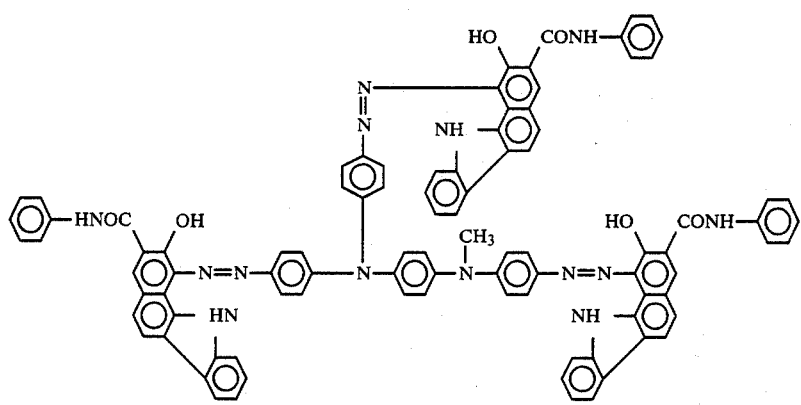
6-4
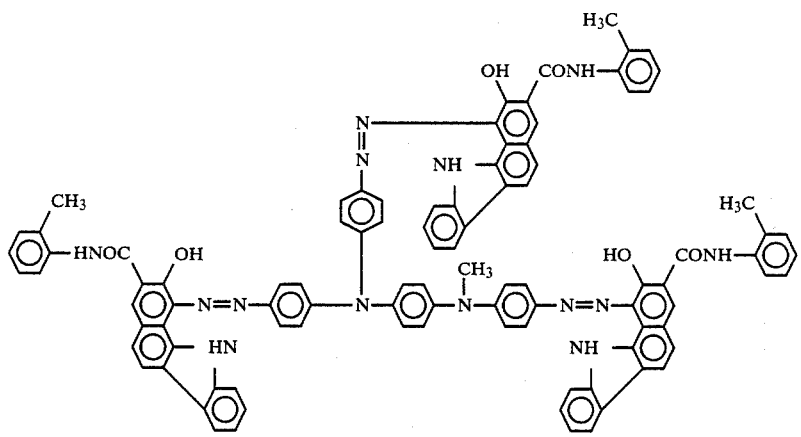
6-5

-continued
Examples of azo pigments represented by the formula (6):
6-6
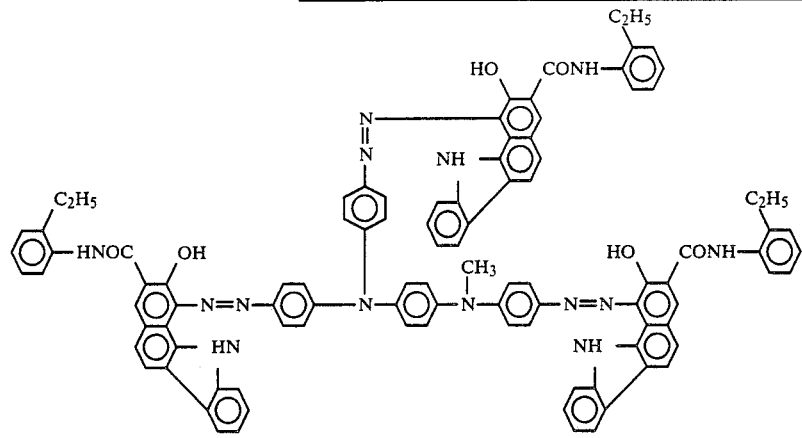
6-7
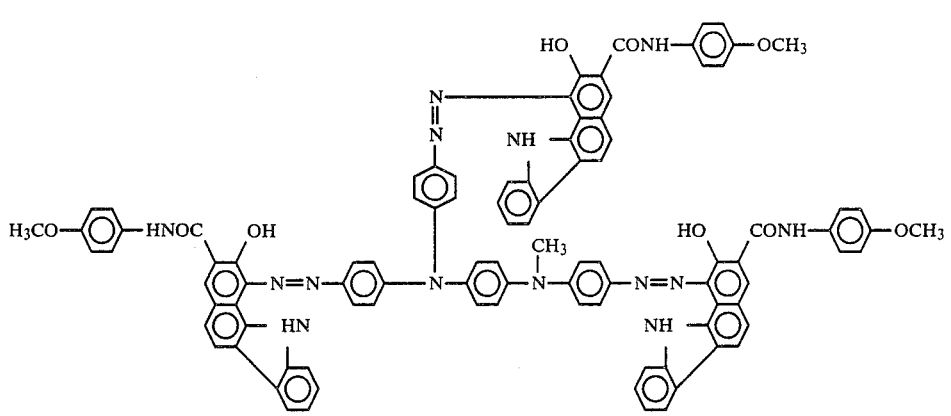
6-8
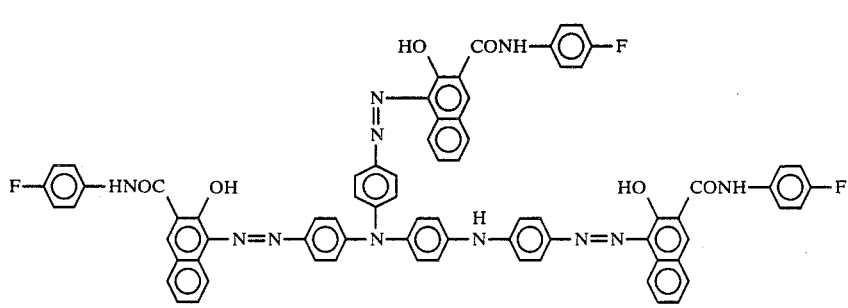
6-9
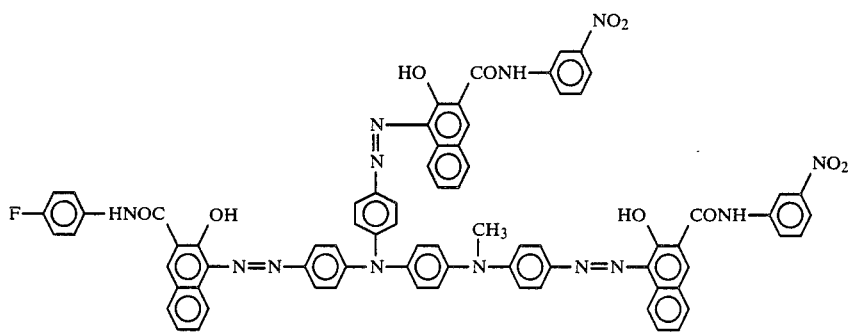

-continued
Examples of azo pigments represented by the formula (6):
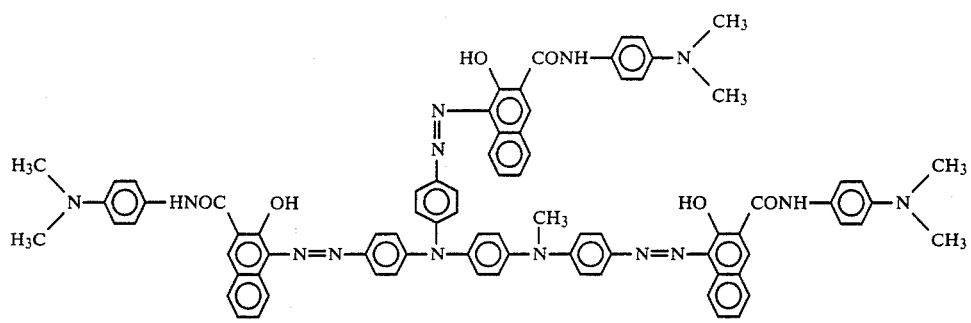
6-10
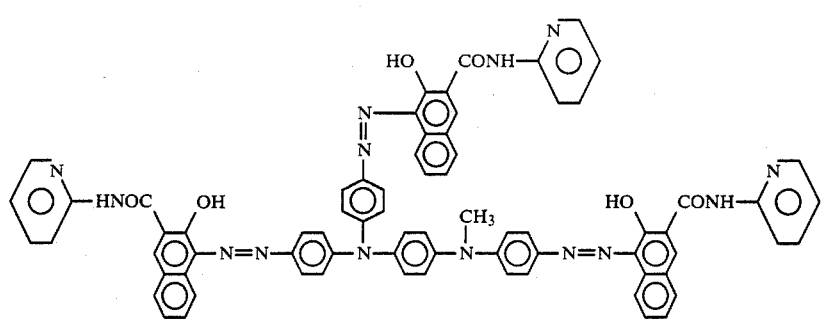
6-11
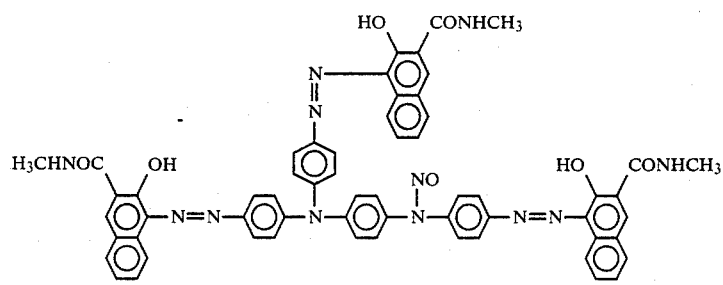
6-12
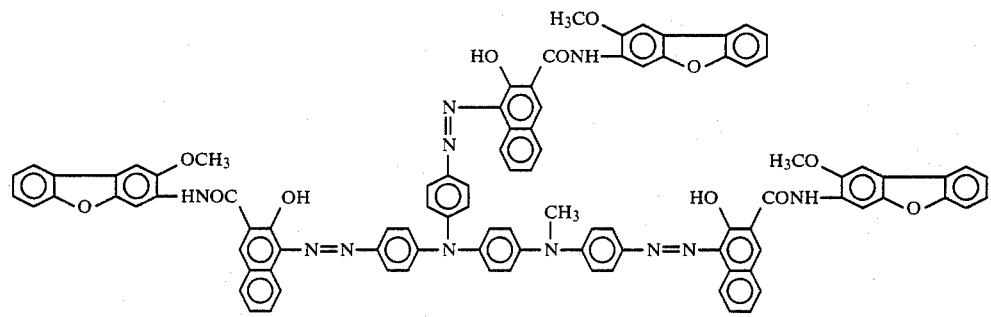
6-13

-continued
Examples of azo pigments represented by the formula (6):
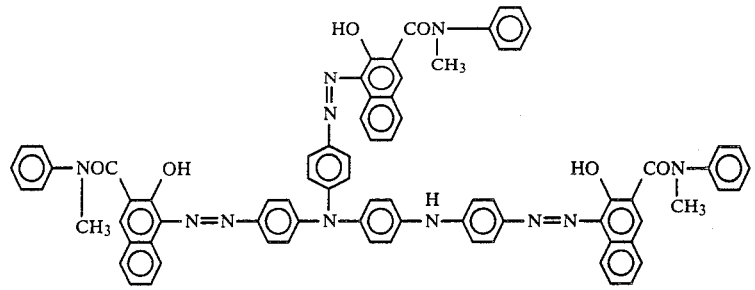
6-14
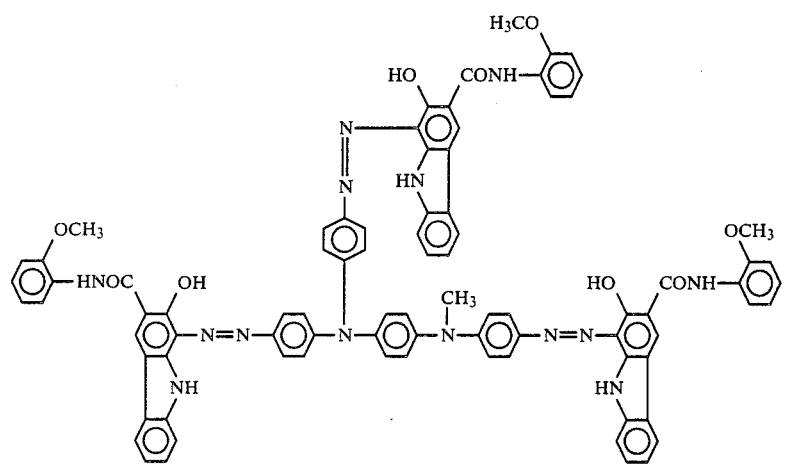
6-15
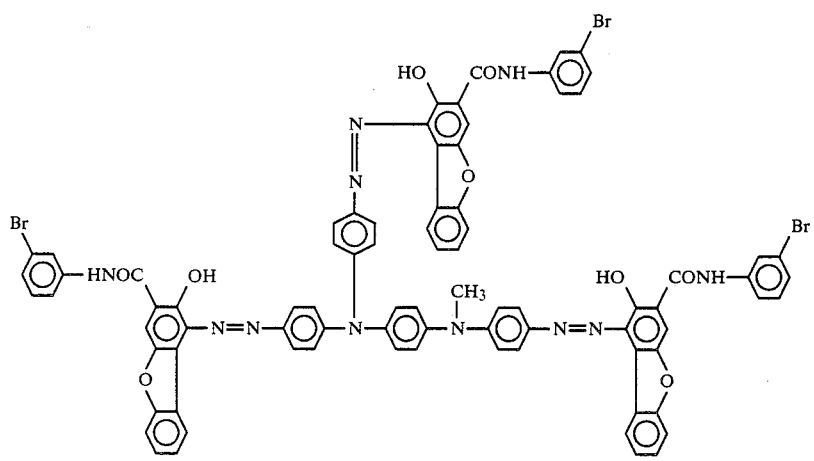
6-16

-continued
Examples of azo pigments represented by the formula (6):
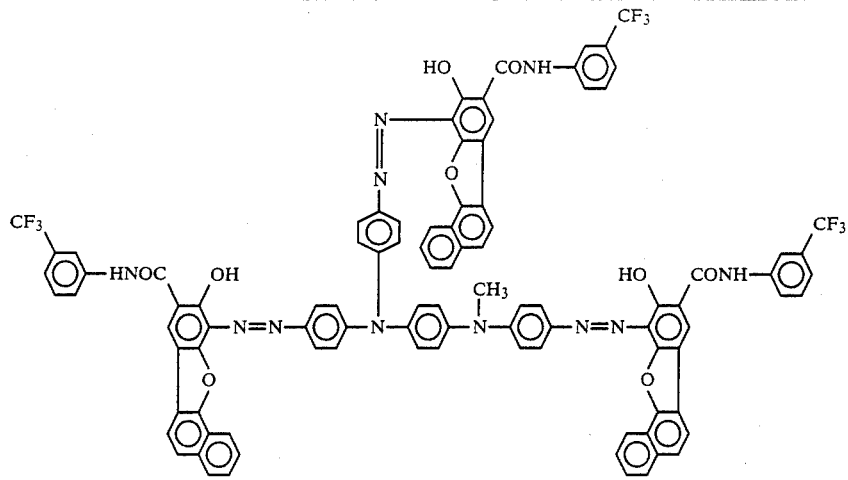
6-17
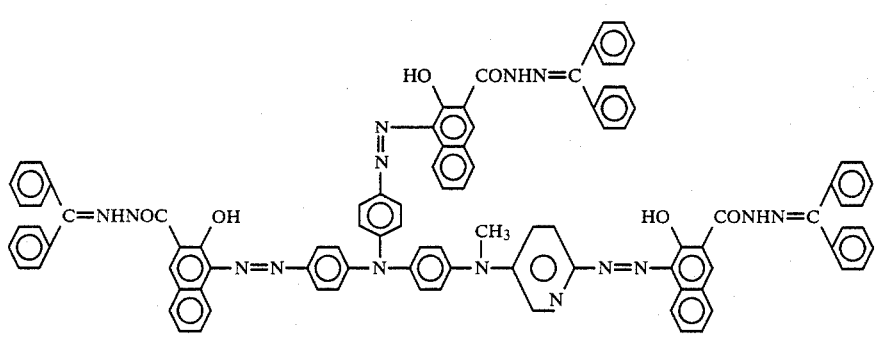
6-18
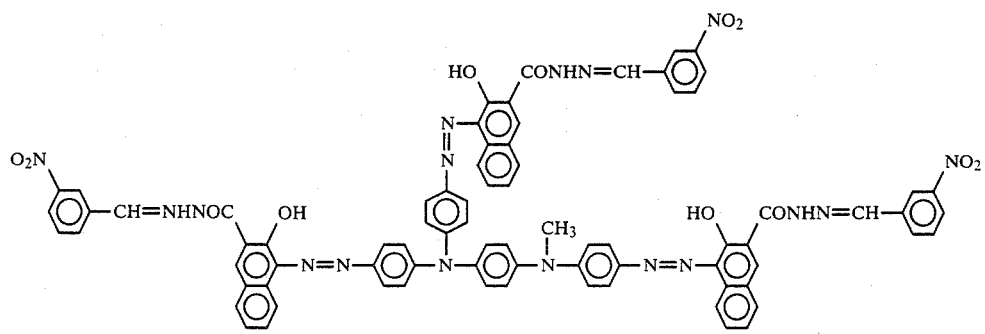
6-19
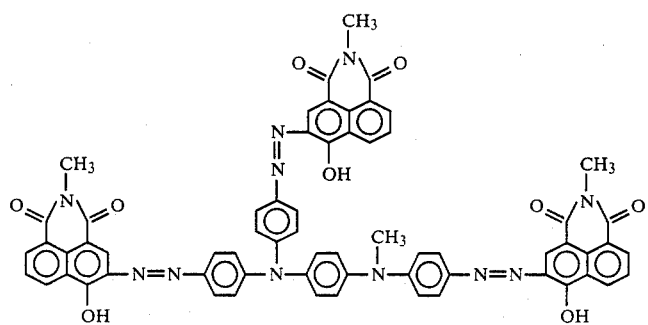
6-20

-continued
Examples of azo pigments represented by the formula (6):
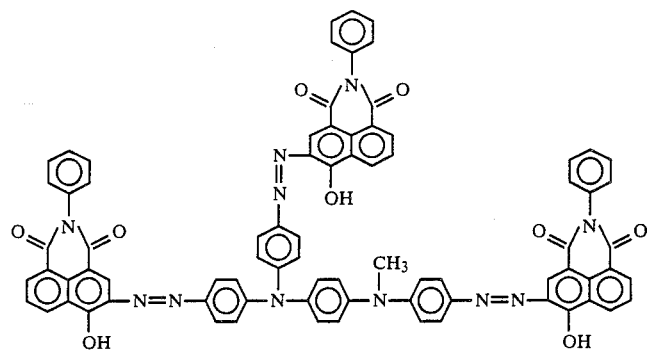
6-21
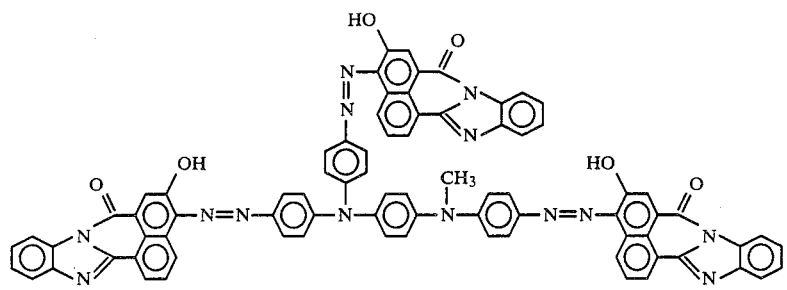
6-22
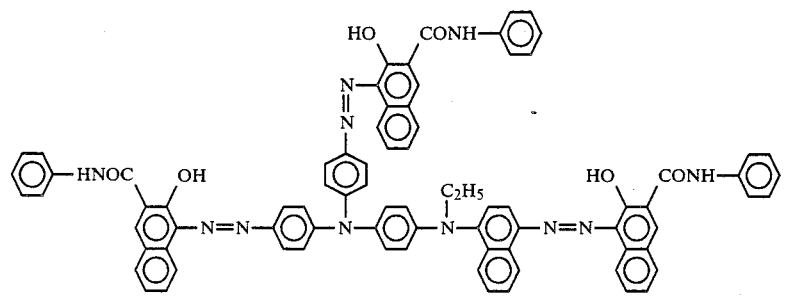
6-23
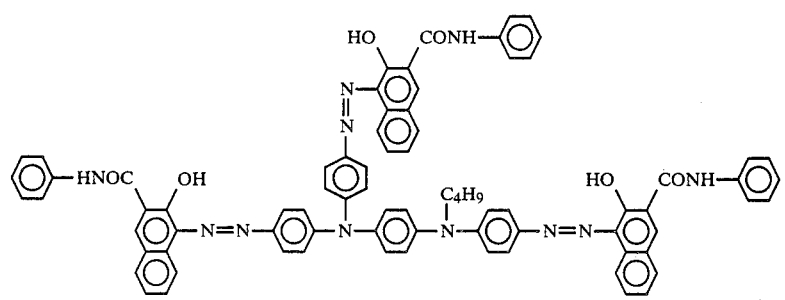
6-24

-continued
Examples of azo pigments represented by the formula (6):
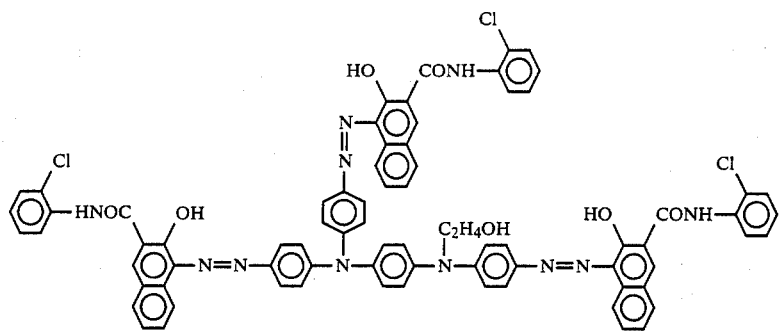
6-25
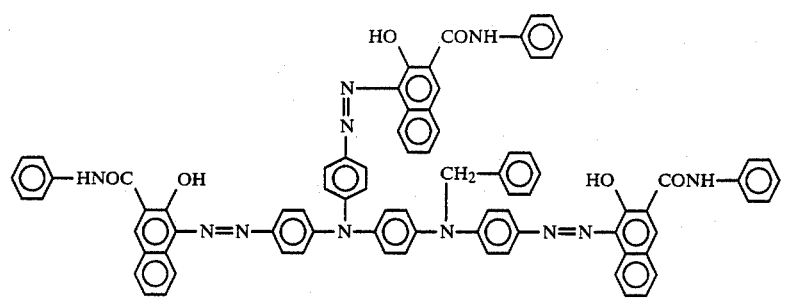
6-26
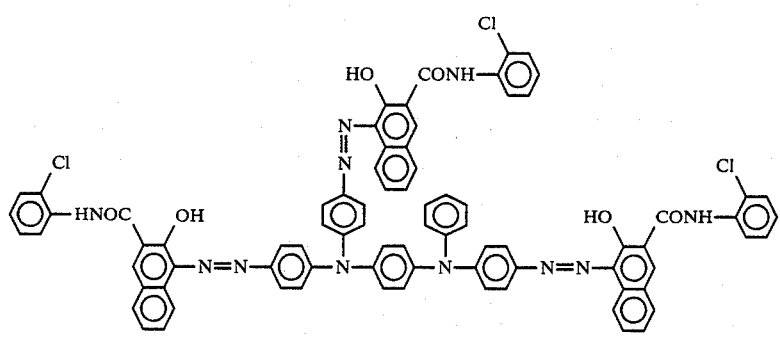
6-27
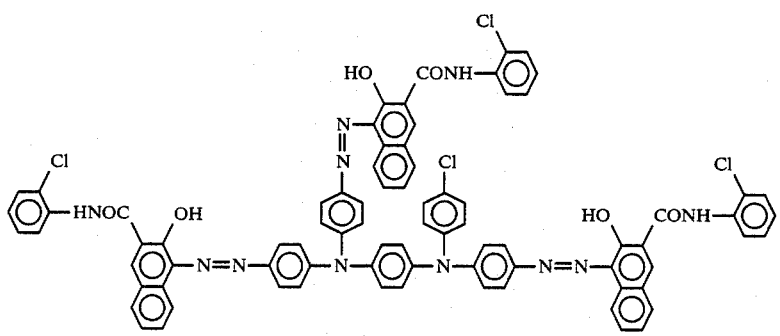
6-28

-continued
Examples of azo pigments represented by the formula (6):
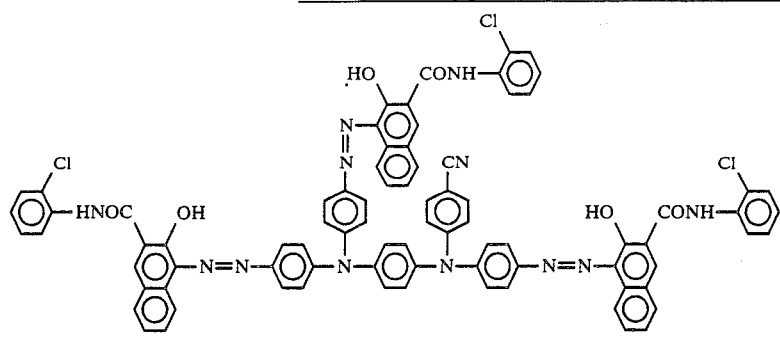
6-29
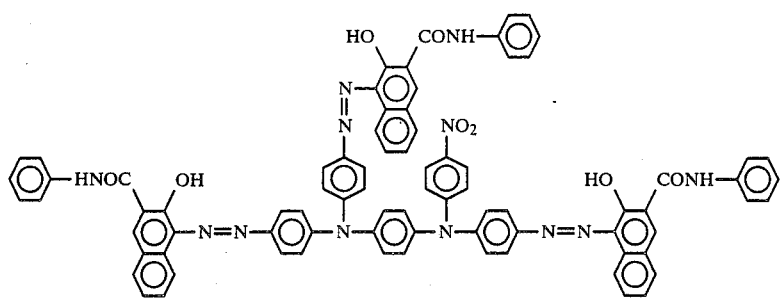
6-30
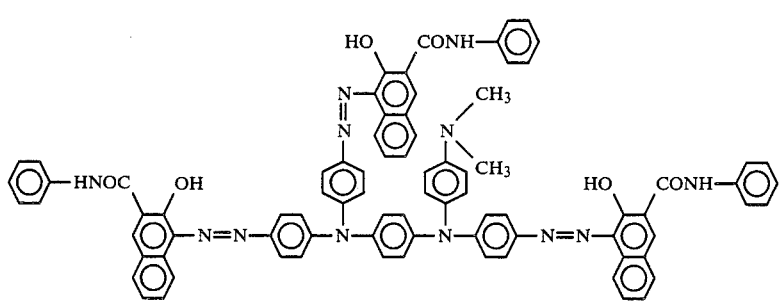
6-31
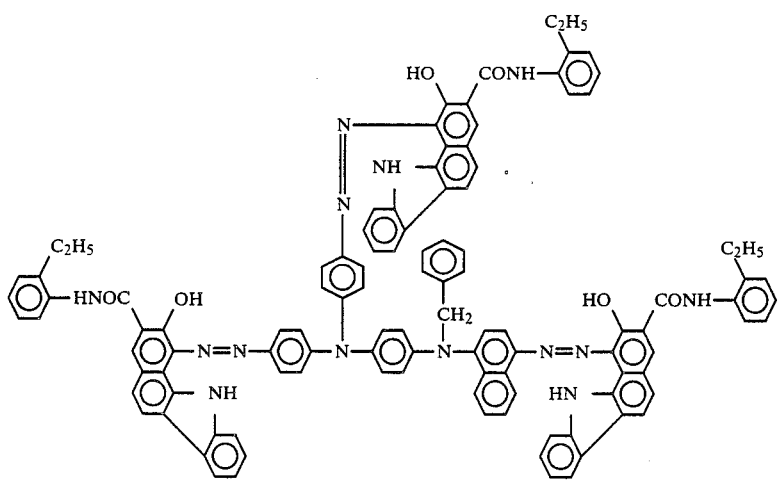
6-32

-continued
Examples of azo pigments represented by the formula (6):
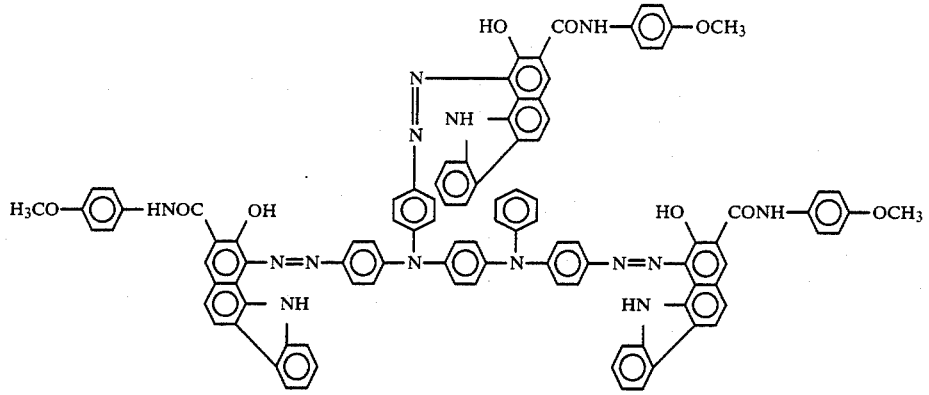
6-33
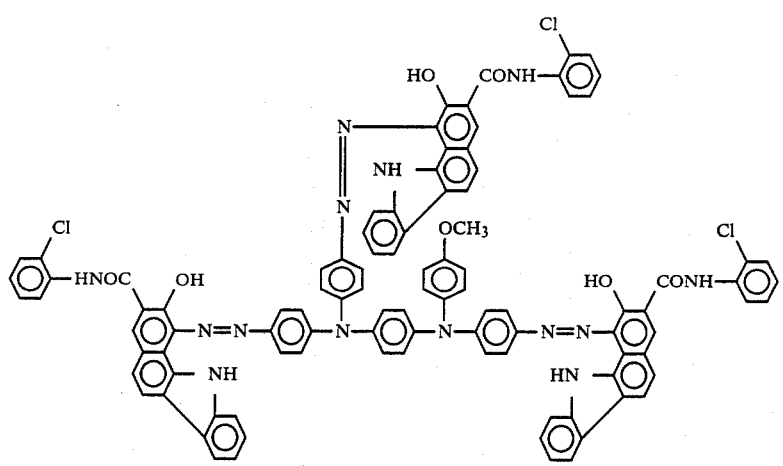
6-34
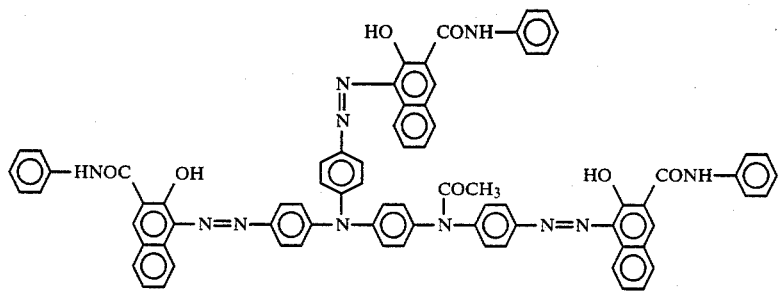
6-35
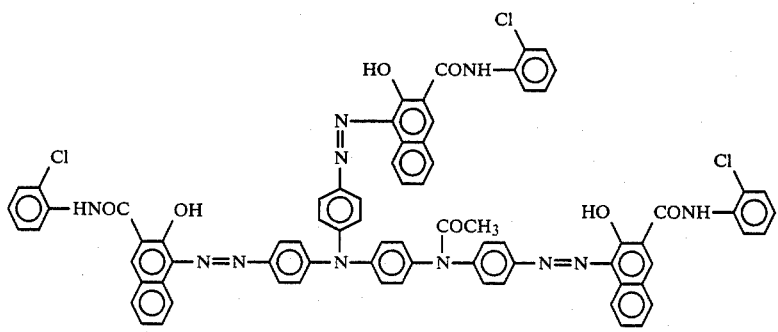
6-36

-continued
Examples of azo pigments represented by the formula (6):
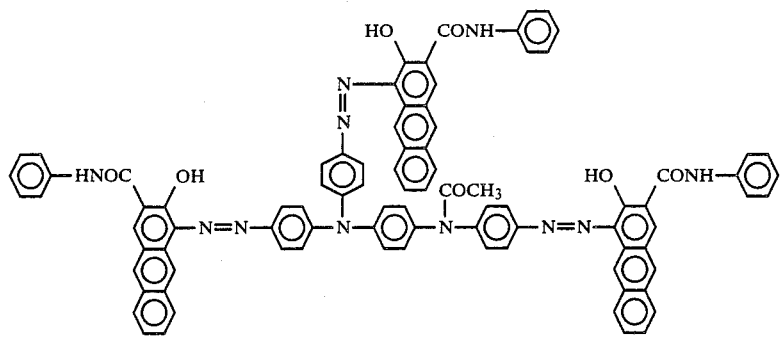
6-37
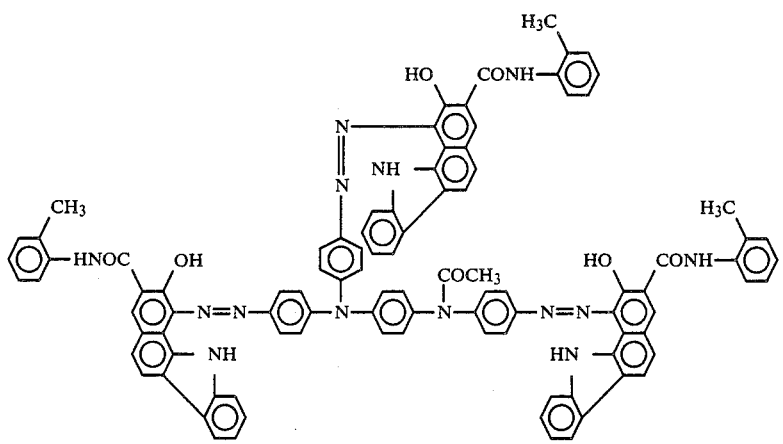
6-38
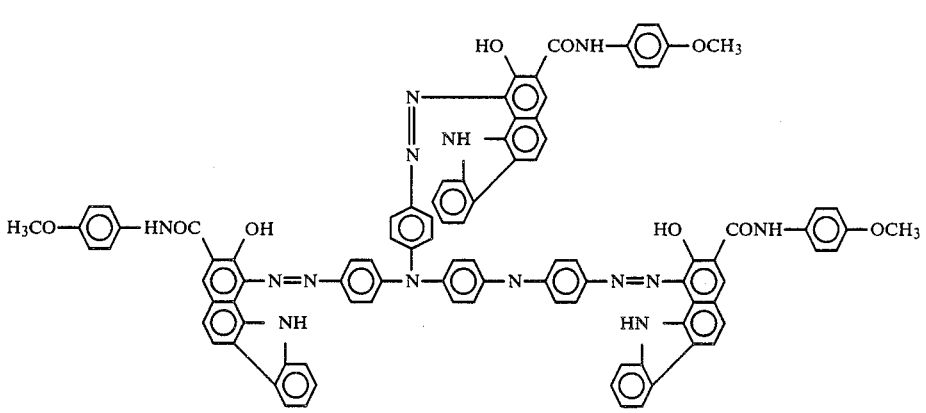
6-39

-continued
Examples of azo pigments represented by the formula (6):
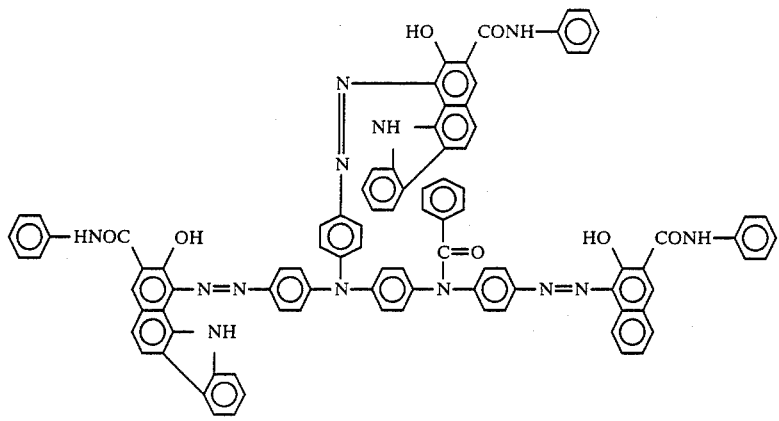
6-40
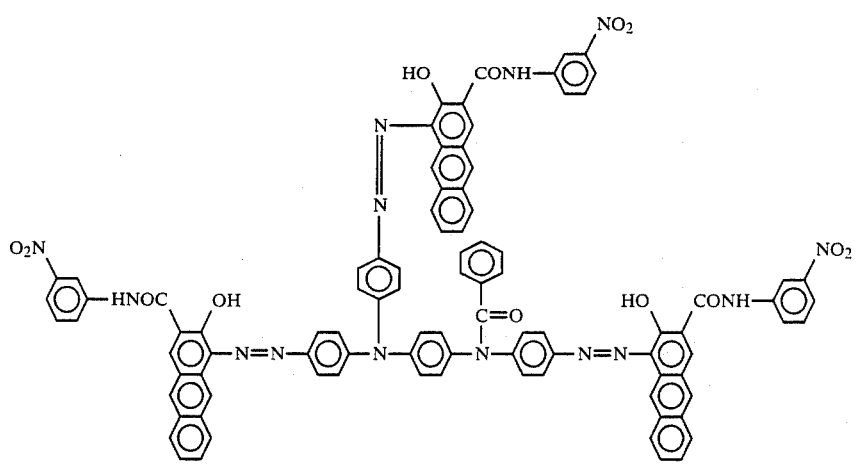
6-41
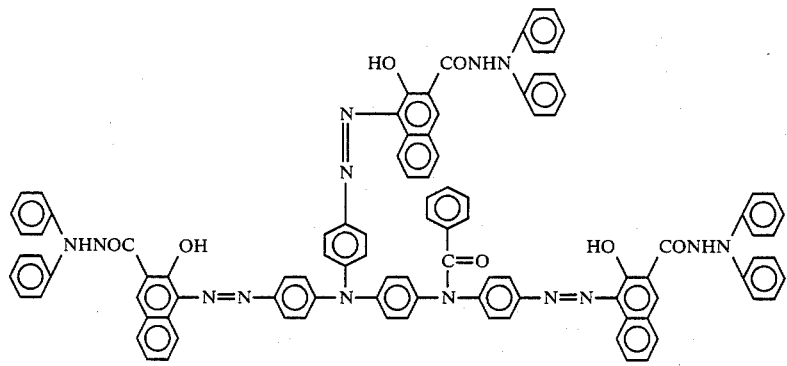
6-42

-continued
Examples of azo pigments represented by the formula (6):
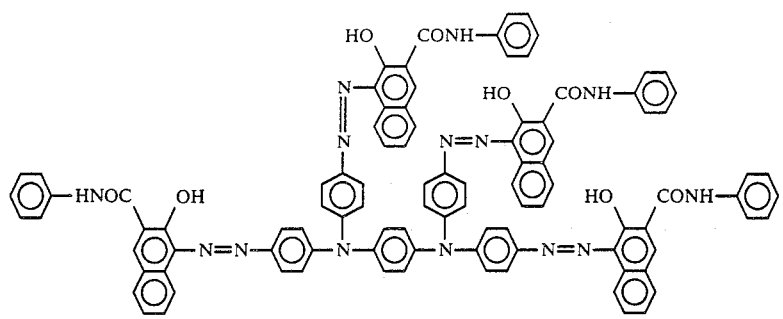
6-43
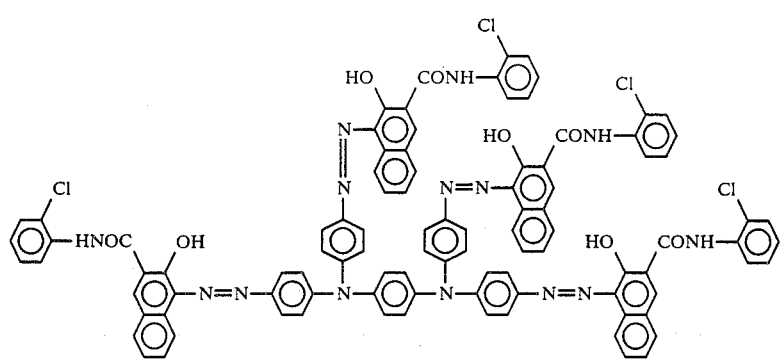
6-44
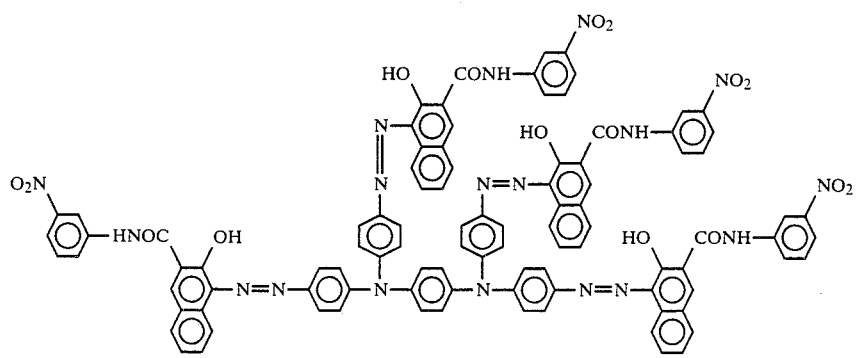
6-45
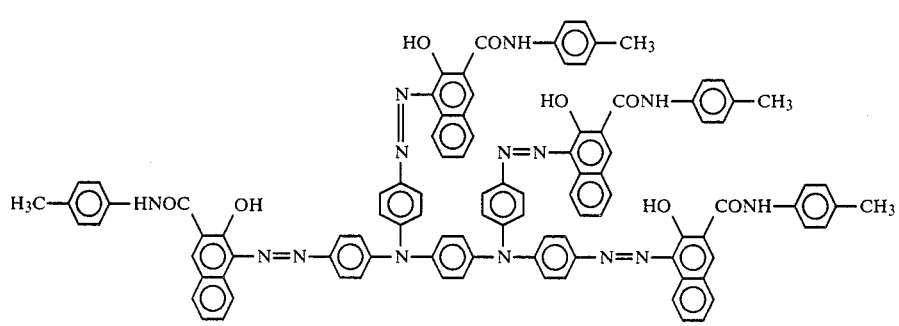
6-46

-continued
Examples of azo pigments represented by the formula (6):
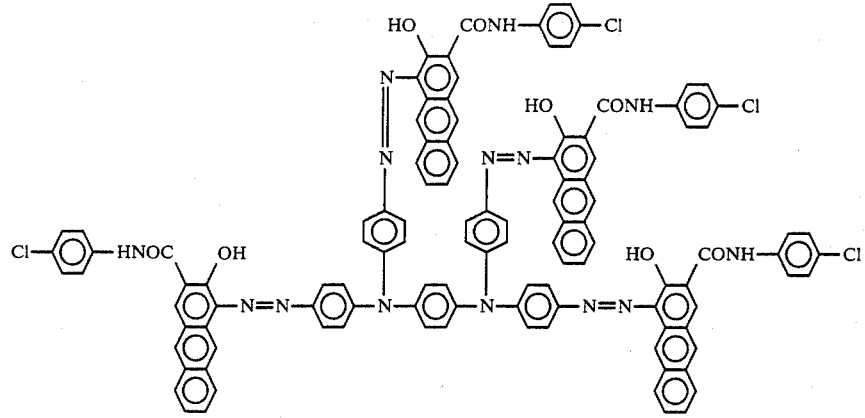
6-47
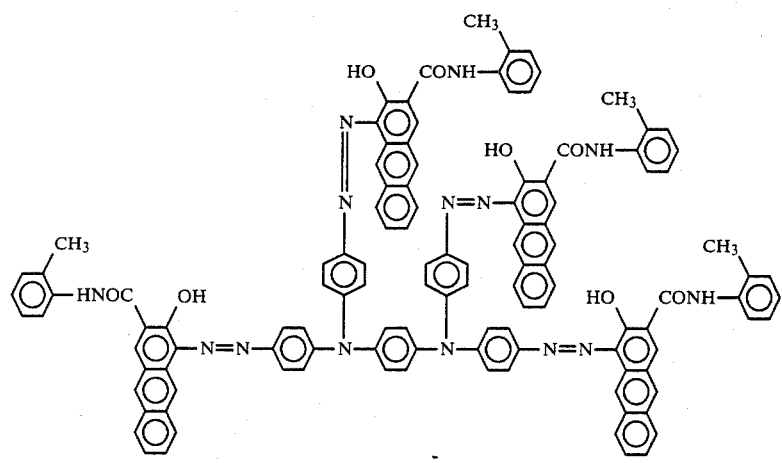
6-48
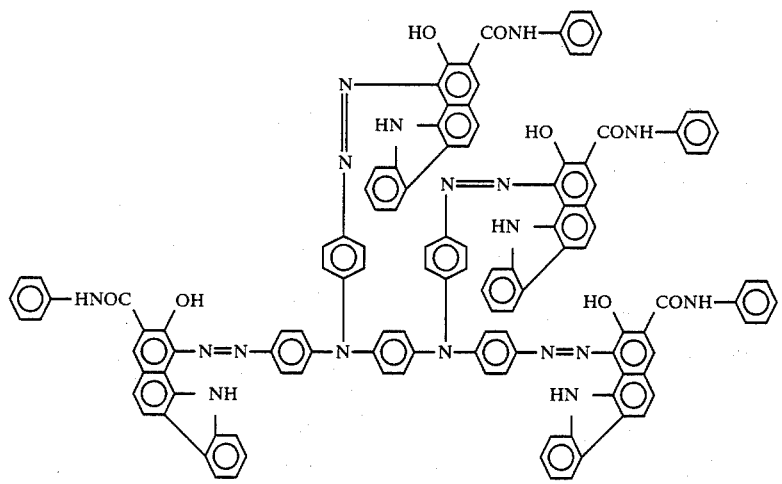
6-49

-continued
Examples of azo pigments represented by the formula (6):
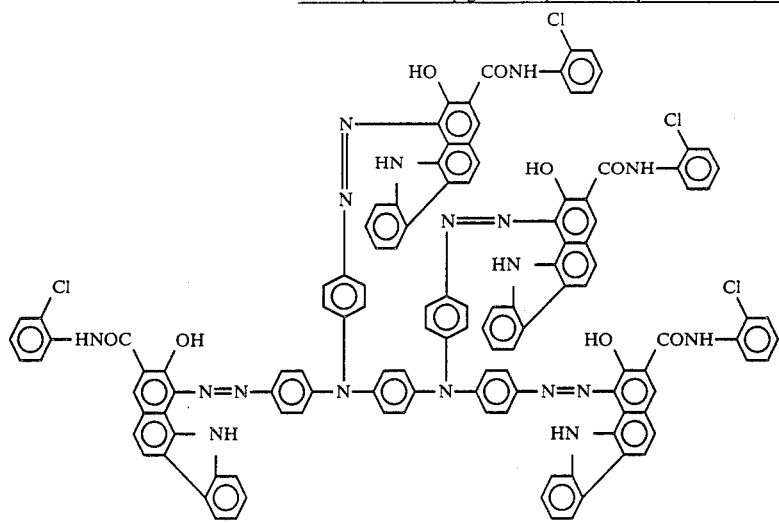
6-50
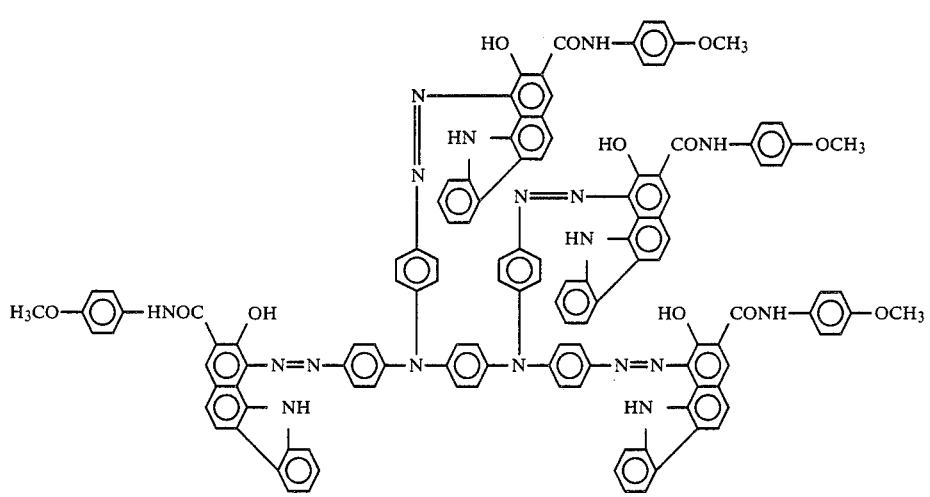
6-51
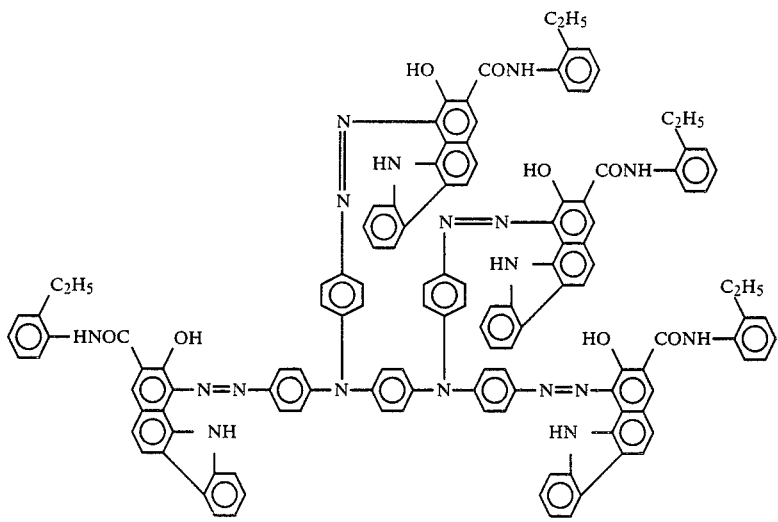
6-52

-continued
Examples of azo pigments represented by the formula (6):
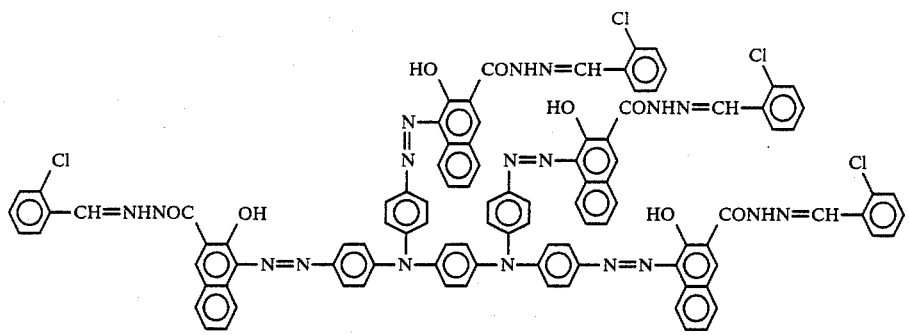
6-53
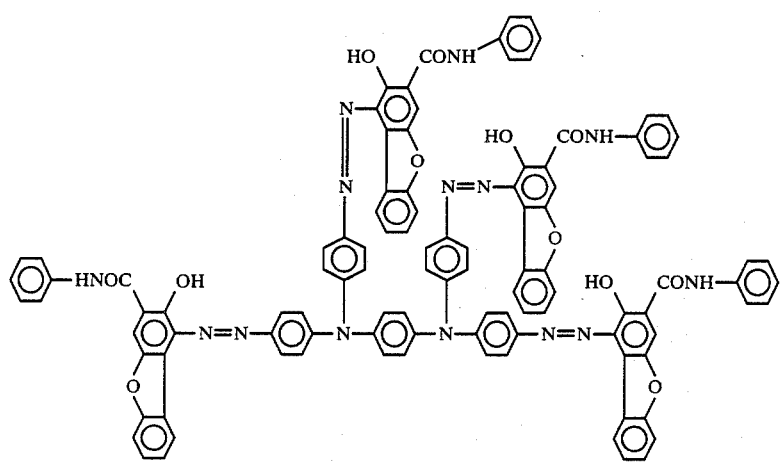
6-54
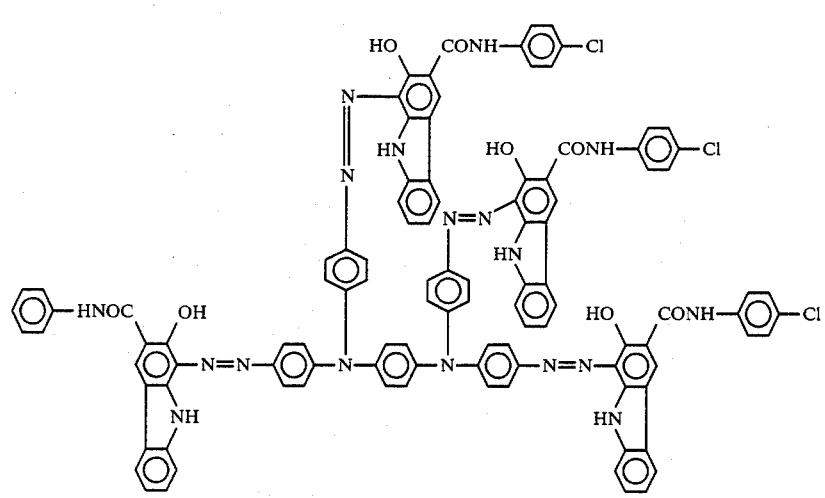
6-55

-continued
Examples of azo pigments represented by the formula (6):
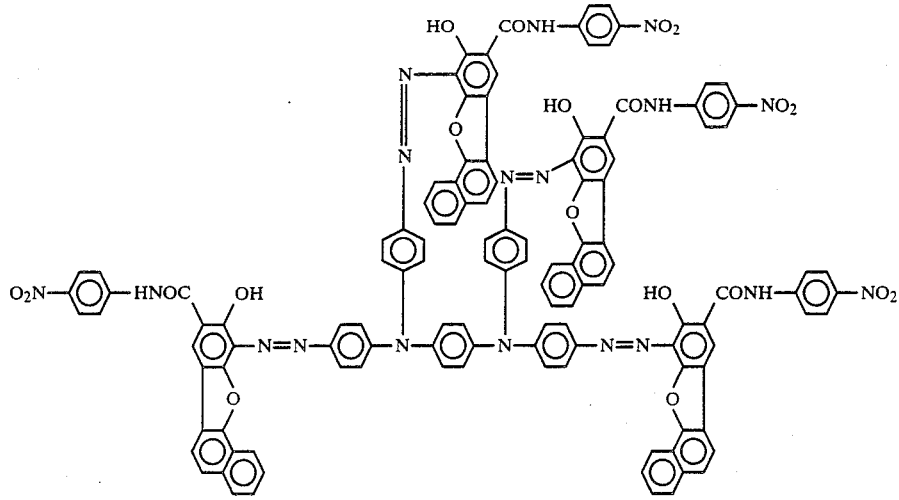
6-56
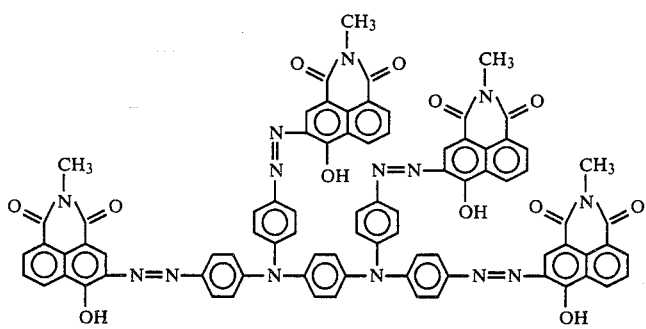
6-57
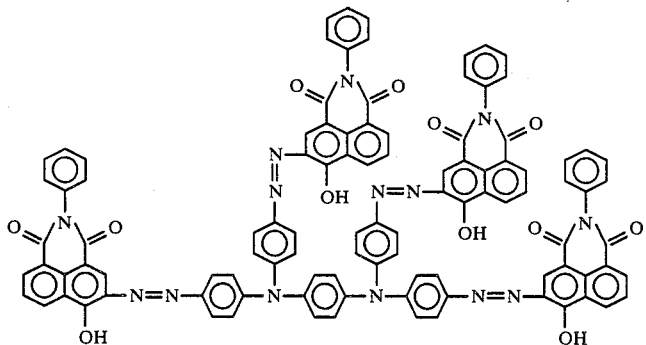
6-58

-continued
Examples of azo pigments represented by the formula (6):
6-59
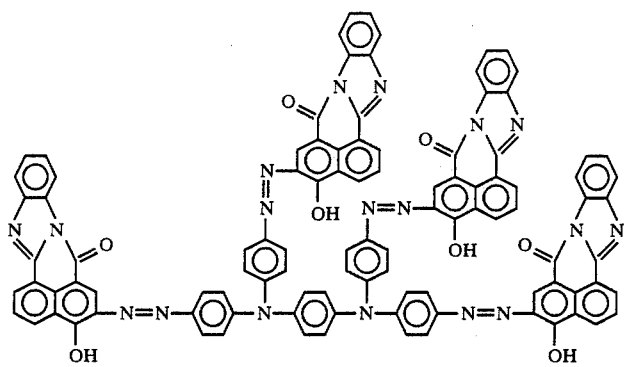
6-60
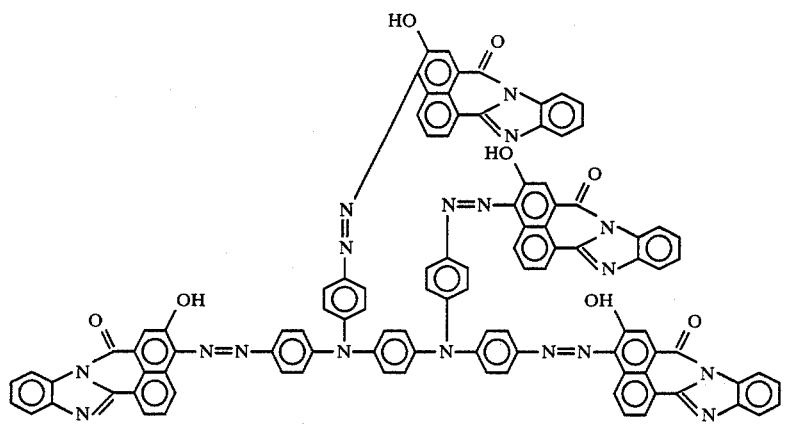
6-61
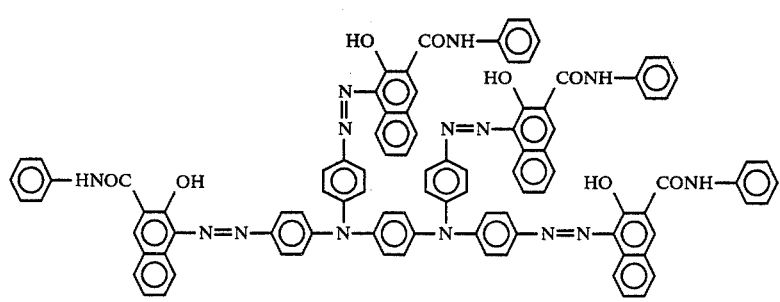
6-62
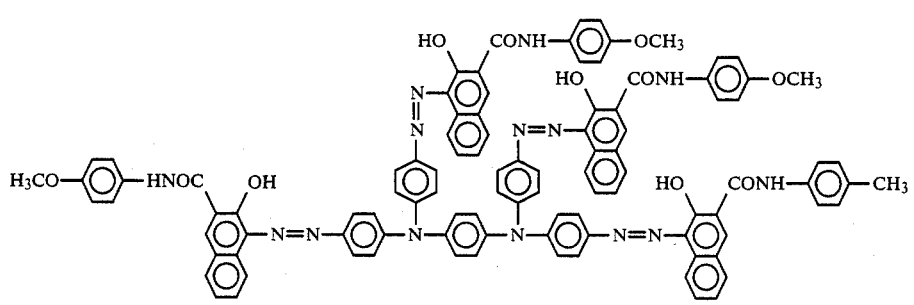

-continued
Examples of azo pigments represented by the formula (6):
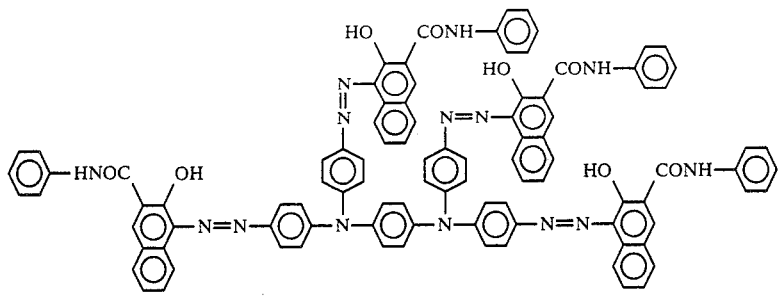
6-63
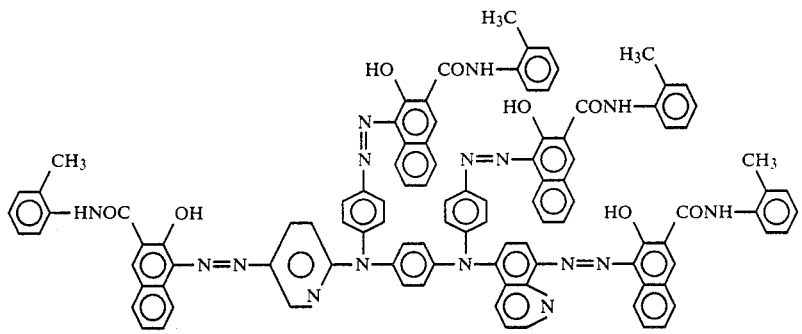
6-64
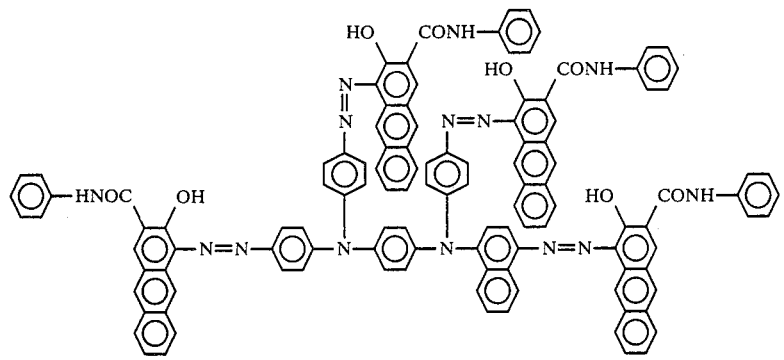
6-65
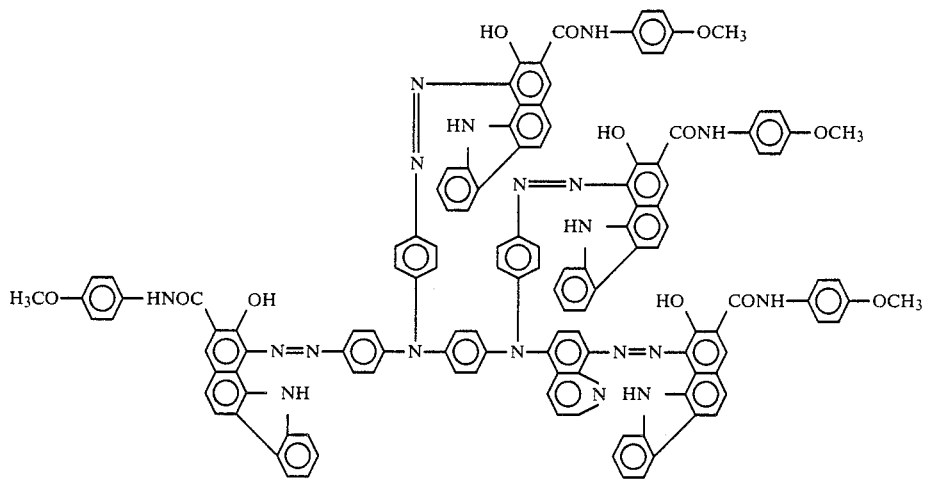
6-66
What is claimed is:
1. A photosensitive member for electrophotography comprising a photosensitive layer containing an azo pigment selected from those represented by the following formulas (1)–(6):

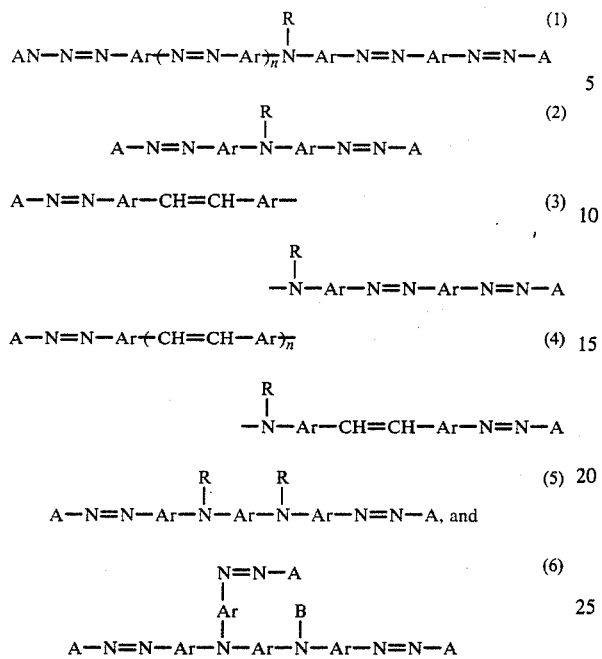

$$AN=N-Ar(-N=N-Ar)_n\overset{R}{N}-Ar-N=N-Ar-N=N-A \quad (1)$$

$$A-N=N-Ar-\overset{R}{N}-Ar-N=N-A \quad (2)$$

$$A-N=N-Ar-CH=CH-Ar- \quad (3)$$

$$-\overset{R}{N}-Ar-N=N-Ar-N=N-A$$

$$A-N=N-Ar(-CH=CH-Ar)_n \quad (4)$$

$$-\overset{R}{N}-Ar-CH=CH-Ar-N=N-A \quad (5)$$

$$A-N=N-Ar-\overset{R}{N}-Ar-\overset{R}{N}-Ar-N=N-A, \text{ and} \quad$$

$$\begin{matrix} & N=N-A \\ & | \\ & Ar & B \\ & | & | \\ A-N=N-Ar-N-Ar-N-Ar-N=N-A \end{matrix} \quad (6)$$

wherein R is alkyl, aralkyl, or acyl, each capable of having a substituent; Ar is an arylene or heterocyclic group; each capable of having a substituent; A is a coupler residue group having a phenolic OH group; B is hydrogen, nitroso, or an alkyl, aralkyl, aryl or acyl group capable of having a substituent; and n is 0 or 1; said azo pigment being (i) in a charge generation layer of a functionally separated photosensitive layer comprising said charge generation layer and a charge transportation layer or (ii) admixed with a charge transporting binder material; wherein said charge transporting binder material is a charge transporting binder or a mixture of a charge transporting substance and a binder.

2. A photosensitive member according to claim 1, wherein the group A is a group selected from those represented by the following formulas (7)-(13):

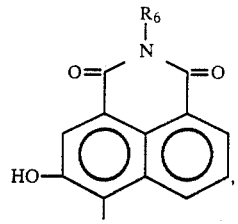

(7)

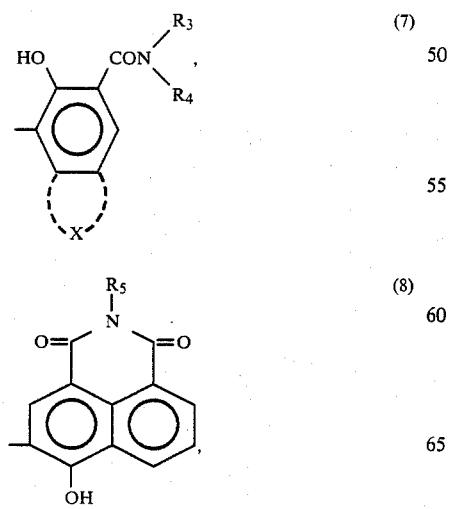

(8)

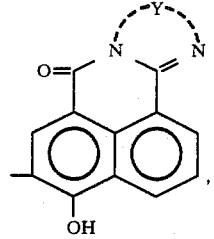

-continued (9)

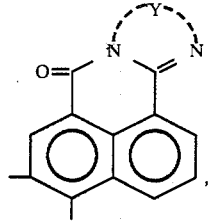

(10)

(11)

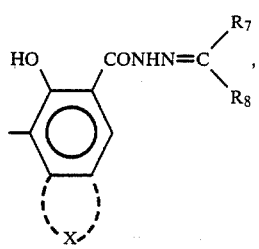

(12)

and

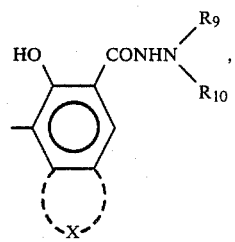

(13)

wherein X is a residue group forming a polycyclic aromatic or heterocyclic ring through condensation with a benzene ring; $R_3$ and $R_4$ are respectively hydrogen, an alkyl, aralkyl, aryl or heterocyclic group capable of having a substituent or may be such groups as to form a cyclic amino group is combination with each other and a nitrogen atom; $R_5$ and $R_6$ are respectively an alkyl, aralkyl or aryl group capable of having a substituent; Y is a divalent aromatic group or a nitrogen-containing divalent heterocyclic group; $R_7$ and $R_8$ are respectively an aryl or heterocyclic group capable of having a substituent; $R_9$ and $R_{10}$ are respectively hydrogen, or an alkyl, aralkyl, aryl or heterocyclic group capable of having a substituent.

3. A photosensitive member according to claim 1, wherein said photosensitive layer is functionally separated into a charge generation layer and a charge transportation layer, said charge generation layer containing an azo pigment selected from those represented by the formulas (1)–(6).

4. A photosensitive member according to claim 2, wherein said photosensitive layer is functionally separated into a charge generation layer and a charge transportation layer, said charge generation layer containing the pigment having the group A selected from those represented by the formulas (7)–(13).

5. A photosensitive member according to claim 2, wherein in the formula (7), the $R_3$ is hydrogen and $R_4$ is a substituted phenyl represented by the formula:

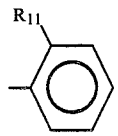

wherein $R_{11}$ is halogen, nitro, cyano, or trifluoromethyl group.

6. A photosensitive member according to claim 3 or 4, wherein the charge transportation layer comprises an electron transporting substance.

7. A photosensitive member according to claim 3 or 4, wherein the charge transportation layer comprises a hole transporting substance.

8. A photosensitive member according to claim 7, wherein the hole transporting substance is selected from hydrazones and pyrazolines.

9. A photosensitive member according to claim 1, wherein in the formula (6), B is —AR—N=N—A and Ar and A are respectively the same as defined.

10. A photosensitive member according to claim 10, wherein in the formula (1), R is alkyl or aryl, each capable of having a substituent.

11. A photosensitive member according to claim 10, wherein in the formula (1), R is methyl or phenyl.

12. A photosensitive member according to claim 1, wherein in the formulas (2), (3) and (5), R is an alkyl capable of having a substituent.

13. A photosensitive member according to claim 12, wherein in the formulas (2), (3) and (5), R is methyl.

14. A photosensitive member according to claim 1, wherein in the formula (4), R is an alkyl capable of having a substituent.

15. A photosensitive member according to claim 14, wherein in the formula (4), R is methyl or ethyl.

16. A photosensitive member according to claim 1, wherein in the formula (6), R is alkyl, aryl, acyl, or —Ar—N=N—A, each capable of having a substituent.

17. A photosensitive member according to claim 16, wherein in the formula (6), R is methyl, phenyl, acetyl or

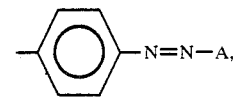

wherein A is

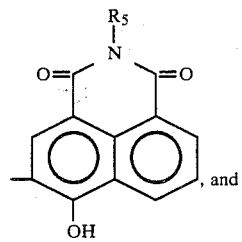

$R_5$ is an alkyl, aralkyl or aryl capable of having a substituent.

* * * * *

UNITED STATES PATENT AND TRADEMARK OFFICE
CERTIFICATE OF CORRECTION

PATENT NO. : 4,743,523  Page 1 of 11
DATED : May 10, 1988
INVENTOR(S) : MASATAKA YAMASHITA, ET AL.

It is certified that error appears in the above-identified patent and that said Letters Patent is hereby corrected as shown below:

AT [30] IN FOREIGN APPLICATION PRIORITY DATA

"Apr. 26, 1985   [JP]   Japan   ..... 60-690452" should read --Apr. 26, 1985   [JP]   Japan   ..... 60-90452--.

AT [57] IN THE ABSTRACT

Line 20, "acyl each" should read --acyl, each--.
Line 22, "group each" should read --group, each--.
Line 22, "Ar" should read --A--.

COLUMN 2

Line 4, "of" should read --to--.
Line 18, "in" should be deleted.
Line 50, "substituent," should read --substituent;--.

COLUMN 3

Line 9, "substituted" should read --substituent--.
Line 17, "acryl" should read --acyl--.

COLUMN 5

Line 12, "alkoxyl" should read --alkoxy--.
Line 49, "include;" should read --include:--.
Line 57, "include;" should read --include:--.

UNITED STATES PATENT AND TRADEMARK OFFICE
CERTIFICATE OF CORRECTION

PATENT NO. : 4,743,523
DATED : May 10, 1988
INVENTOR(S) : MASATAKA YAMASHITA, ET AL.

It is certified that error appears in the above-identified patent and that said Letters Patent is hereby corrected as shown below:

COLUMN 6

Line 17, "be example" should read --for example--.
Line 68, "was obtained" should be deleted.
Line 46, "Into 2" should read --Into a 2--.

COLUMN 7

Line 23, "Into 500" should read --Into a 500--.

COLUMN 8

Line 4, "Into 500" should read --Into a 500--.
Line 23, "Seprately," should read --Separately--.
Line 39, "uner" should read --under--.
Line 54, "Into 500" should read --Into a 500--.

COLUMN 9

Line 33, "Into 500" should read --Into a 500--.
Line 68, "produce" should read --product--.

COLUMN 10

Line 15, "Into 500" should read --Into a 500--.

COLUMN 11

Line 2, "disazo-pigment" should read --diazo-pigment--.
Line 4, "Into 500" should read --Into a 500--.
Line 23, "3°-20° C." should read --3°-10° C.--.
Line 36, "was then" should read --was--.

UNITED STATES PATENT AND TRADEMARK OFFICE
CERTIFICATE OF CORRECTION

PATENT NO. : 4,743,523
DATED : May 10, 1988
INVENTOR(S) : MASATAKA YAMASHITA, ET AL.

It is certified that error appears in the above-identified patent and that said Letters Patent is hereby corrected as shown below:

COLUMN 12

Line 60, "ligrosin" should read --ligroin,--.

COLUMN 13

Lines 1-2, "quienscent" should read --quiescent--.

COLUMN 14

Line 2, "sulfide." should read --sulfide can be used.--.
Line 36, "then" should read --tin--.

COLUMN 16

Line 20, "mixture" should read --the mixture--.
Line 30, "member" should read --members--.
Line 40, "1/2nd" should read --1/2--.

COLUMN 17

Line 31, "or" should read --on--.
Line 34, "conona" should read --corona--.
Line 42, "-600" should read ---600 V--.
Line 44, "1000" should read --5000--.

COLUMN 18

Line 30, "10-thick" should read --10 μ thick--.
Line 39, "3.0" should read --3.9--.
Lines 49-50, "repectivie" should read --repetitive--.
Line 67, "member" should read --members--.

UNITED STATES PATENT AND TRADEMARK OFFICE
CERTIFICATE OF CORRECTION

PATENT NO. : 4,743,523

DATED : May 10, 1988

INVENTOR(S) : MASATAKA YAMASHITA, ET AL.

It is certified that error appears in the above-identified patent and that said Letters Patent is hereby corrected as shown below:

COLUMN 19

Line 18, "laye" should read --layer--.

COLUMN 20

Line 23, "path" should read --part--.
    Line 49, "prevented" should read --prepared--.

COLUMN 21

Line 55, "measure" should read --measured--.

COLUMN 23

Line 28, "or" should read --on--.

COLUMN 24

Line 56, "measure" should read --measured--.

COLUMN 26

Line 19, "or" should read --on--.

COLUMN 27

Line 55, "measure" should read --measured--.

COLUMN 29

Line 18, "Table 2-2." should read --Table 5-2.--.

UNITED STATES PATENT AND TRADEMARK OFFICE
CERTIFICATE OF CORRECTION

PATENT NO. : 4,743,523
DATED : May 10, 1988
INVENTOR(S) : MASATAKA YAMASHITA, ET AL.

It is certified that error appears in the above-identified patent and that said Letters Patent is hereby corrected as shown below:

COLUMN 30

Line 11, "Durability characteristics:" should be inserted.
Line 38, "measure" should read --measured--.

COLUMN 32

Line 45, "g/cm$^2$" should read --g/m$^2$--.

COLUMN 34

Line 51, "CONH-⌬" should read --CONH-⌬ 1-1--.

Line 62, " CONH-⌬ Cl" should read -- COHN-⌬ Cl 1-2--.

COLUMN 75

Formula 2-63, "HNOC-⌬" should read --HNOC-⌬-OH--.

COLUMN 82

Formula 3-6, "-N=N-⌬-N=N-"

should read ---N=N-⌬-N=N---.

Formula 3-7, "29-⌬" should read --H-N-⌬--.

UNITED STATES PATENT AND TRADEMARK OFFICE
CERTIFICATE OF CORRECTION

PATENT NO. : 4,743,523
DATED : May 10, 1988
INVENTOR(S) : MASATAKA YAMASHITA, ET AL.

It is certified that error appears in the above-identified patent and that said Letters Patent is hereby corrected as shown below:

COLUMNS 81-82

Formula 3-9, " 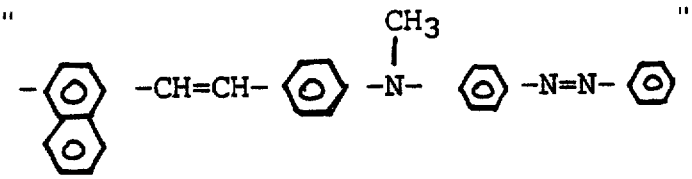 "

should read

-- 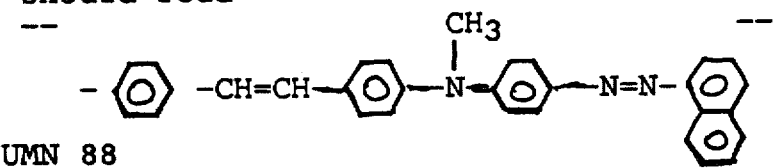 --

COLUMN 88

Formula 3-25, " 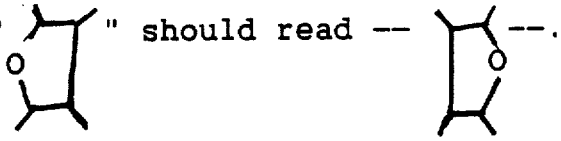 " should read -- 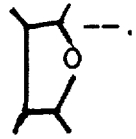 --.

COLUMN 142

Formula 5-56, " 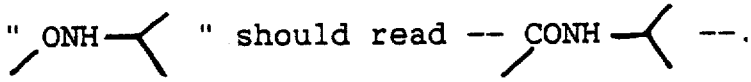 " should read -- 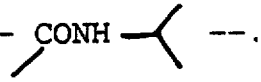 --.

COLUMN 146

Formula 5-69, " 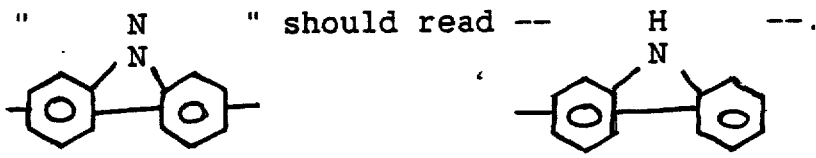 " should read -- 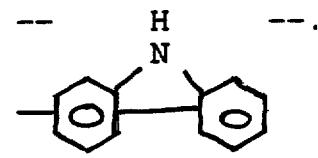 --.

UNITED STATES PATENT AND TRADEMARK OFFICE
CERTIFICATE OF CORRECTION

PATENT NO. : 4,743,523
DATED : May 10, 1988
INVENTOR(S) : MASATAKA YAMASHITA, ET AL.

It is certified that error appears in the above-identified patent and that said Letters Patent is hereby corrected as shown below:

COLUMN 149-150

Formula 6-4, " 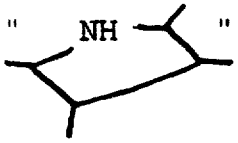 " should read -- 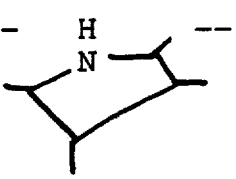 --
(both occurrences).

Formula 6-5, " 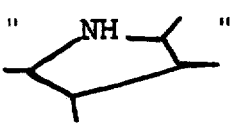 " should read -- 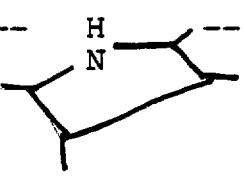 --
(both occurrences).

COLUMNS 151-152

Formula 6-6, " 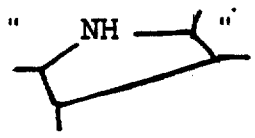 " should read -- 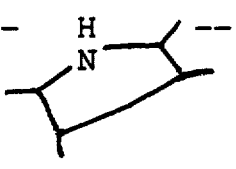 --
(both occurrences).

Formula 6-7, " 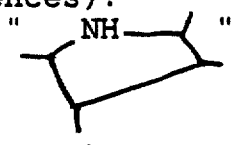 " should read -- 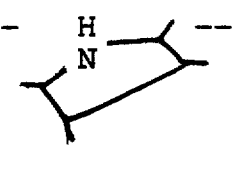 --
(both occurrences).

UNITED STATES PATENT AND TRADEMARK OFFICE
CERTIFICATE OF CORRECTION

PATENT NO. : 4,743,523

DATED : May 10, 1988

INVENTOR(S) : MASATAKA YAMASHITA, ET AL.

It is certified that error appears in the above-identified patent and that said Letters Patent is hereby corrected as shown below:

COLUMN 163

Formula 6-32, " 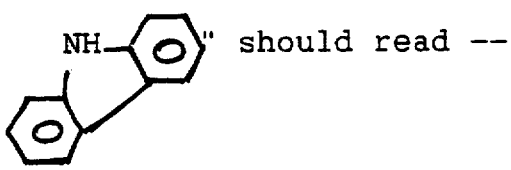 " should read -- 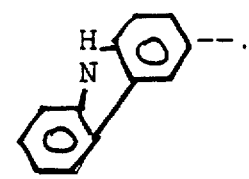 --.

COLUMN 165

Formula 6-33, " 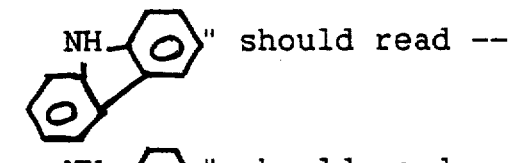 " should read -- 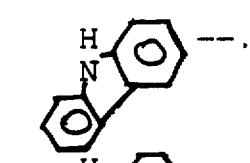 --.

Formula 6-34, " 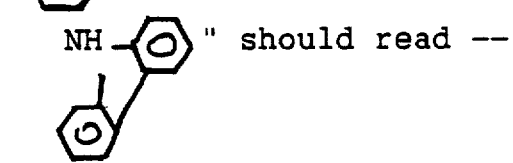 " should read -- 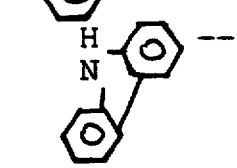 --.

COLUMN 167

Formula 6-38, " 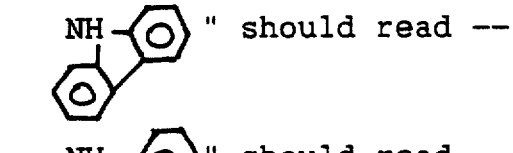 " should read -- 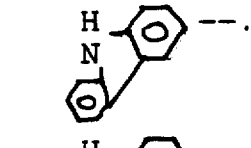 --.

Formula 6-39, " 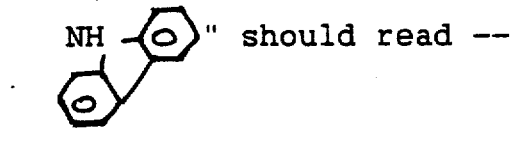 " should read -- 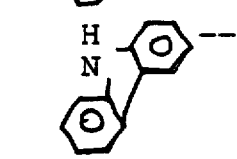 --.

UNITED STATES PATENT AND TRADEMARK OFFICE
CERTIFICATE OF CORRECTION

PATENT NO. : 4,743,523
DATED : May 10, 1988
INVENTOR(S) : MASATAKA YAMASHITA, ET AL.

It is certified that error appears in the above-identified patent and that said Letters Patent is hereby corrected as shown below:

COLUMN 167 (continued)

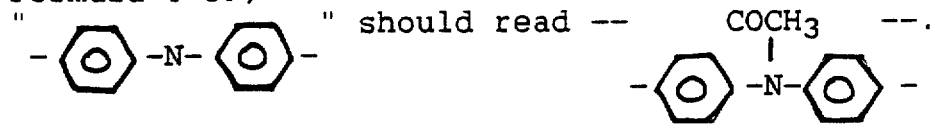

Formula 6-39,

COLUMN 169

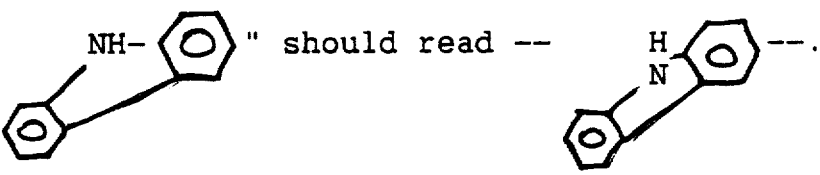

Formula 6-40,

COLUMN 181

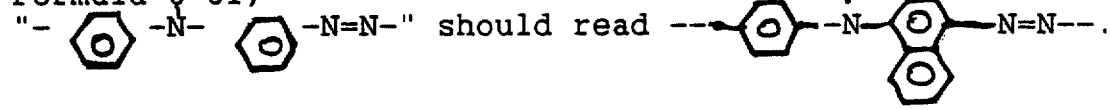

Formula 6-61,

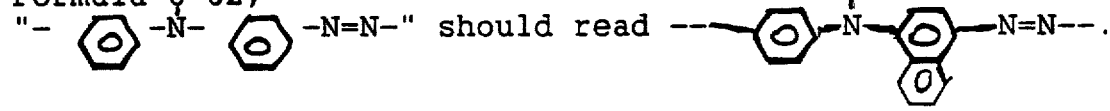

Formula 6-62,

UNITED STATES PATENT AND TRADEMARK OFFICE
CERTIFICATE OF CORRECTION

PATENT NO. : 4,743,523
DATED : May 10, 1988
INVENTOR(S) : MASATAKA YAMASHITA, ET AL.

It is certified that error appears in the above-identified patent and that said Letters Patent is hereby corrected as shown below:

COLUMN 183

Formula 6-63, "  "

should read

-- 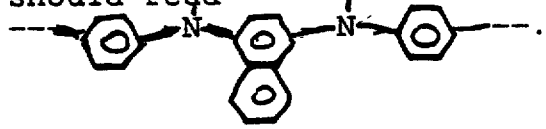 --.

COLUMN 185

Lines 1-4,
"
$$AN-N=N-Ar \xleftarrow{} N=N-Ar \xrightarrow{}_n \overset{R}{\underset{|}{N}}-Ar-N=N-Ar-N=N-A \qquad (1)"$$

should read $$-- \qquad A-N=N-Ar \xleftarrow{} N=N-Ar \xrightarrow{}_n \overset{R}{\underset{|}{N}}-Ar-N=N-Ar-N=N-A \qquad (1)--.$$

Line 31, "group;" should read --group,--.

COLUMN 186

Line 58, "is" should read --in--.

UNITED STATES PATENT AND TRADEMARK OFFICE
CERTIFICATE OF CORRECTION

PATENT NO. : 4,743,523

DATED : May 10, 1988

INVENTOR(S) : MASATAKA YAMASHITA, ET AL.

It is certified that error appears in the above-identified patent and that said Letters Patent is hereby corrected as shown below:

COLUMN 187

Line 38, "claim 10," should read --claim 1,--.

Signed and Sealed this

Fourteenth Day of March, 1989

Attest:

DONALD J. QUIGG

Attesting Officer     Commissioner of Patents and Trademarks